US011187546B2

(12) United States Patent
Rolf et al.

(10) Patent No.: US 11,187,546 B2
(45) Date of Patent: Nov. 30, 2021

(54) BLOOM FILTER ROUTE ENCODING

(71) Applicant: HERE Global B.V., Eindhoven (NL)

(72) Inventors: Daniel Rolf, Berlin (DE); Raul Cajias, Berlin (DE)

(73) Assignee: Here Global B.V., Eindhoven (NL)

(*) Notice: Subject to any disclaimer, the term of this patent is extended or adjusted under 35 U.S.C. 154(b) by 335 days.

(21) Appl. No.: 16/419,689

(22) Filed: May 22, 2019

(65) Prior Publication Data
US 2020/0370903 A1 Nov. 26, 2020

(51) Int. Cl.
G01C 21/34 (2006.01)
G06F 16/22 (2019.01)
G06F 16/9537 (2019.01)
G06F 16/29 (2019.01)
G01C 21/20 (2006.01)

(52) U.S. Cl.
CPC ......... *G01C 21/3453* (2013.01); *G01C 21/20* (2013.01); *G06F 16/2255* (2019.01); *G06F 16/29* (2019.01); *G06F 16/9537* (2019.01)

(58) Field of Classification Search
CPC . G01C 21/3453; G01C 21/20; G06F 16/2255; G06F 16/9537; G06F 16/29
USPC ....................................................... 701/430
See application file for complete search history.

(56) References Cited

U.S. PATENT DOCUMENTS

| | | |
|---|---|---|
| 8,116,974 B2 | 2/2012 | Cummings |
| 9,171,464 B2 | 10/2015 | Khetan et al. |
| 9,239,246 B2 | 1/2016 | Jones |
| 9,916,760 B1 | 3/2018 | Balasubramanian et al. |
| 9,933,269 B2 | 4/2018 | Maischberger et al. |
| 10,317,222 B2 | 7/2019 | Maischberger et al. |
| 10,371,540 B2 | 8/2019 | Kluge |
| 10,520,326 B2 | 12/2019 | Sun et al. |
| 10,563,990 B1 | 2/2020 | Gupta et al. |
| 11,047,699 B2 * | 6/2021 | Rolf ........................ G06F 16/29 |

(Continued)

FOREIGN PATENT DOCUMENTS

| | | |
|---|---|---|
| CN | 101635114 A | 1/2010 |
| CN | 105677686 A | 6/2016 |

(Continued)

OTHER PUBLICATIONS

European Patent Office, Extended European Search Report for Application No. 20164269.1 dated Sep. 14, 2020, 9 pages.

(Continued)

*Primary Examiner* — Gertrude Arthur Jeanglaude
(74) *Attorney, Agent, or Firm* — Alston & Bird LLP

(57) ABSTRACT

A route is determined comprising a list of route segments to be traveled from the network version starting segment to the network version target segment. Map version agnostic information identifying each segment of the list of route segments is accessed from the network version of the digital map. A map version agnostic identifier is generated for each route segment of the list of route segments based on the accessed map version agnostic information. The map version agnostic identifier for each route segment is coded using at least one coding function to generate at least one coded map version agnostic identifier for each route segment. A bloom filter is generated based on the coded map version agnostic identifiers for each route segment. The bloom filter is provided such that a mobile apparatus receives the bloom filter.

20 Claims, 16 Drawing Sheets

(56) References Cited

U.S. PATENT DOCUMENTS

| | | |
|---|---|---|
| 2009/0099726 A1 | 4/2009 | Kim et al. |
| 2011/0106429 A1 | 5/2011 | Poppen et al. |
| 2011/0112760 A1 | 5/2011 | Serbanescu et al. |
| 2011/0238464 A1 | 9/2011 | Dasgupta |
| 2012/0098677 A1 | 4/2012 | Geelen |
| 2012/0330548 A1 | 12/2012 | Poppen |
| 2013/0163467 A1 | 6/2013 | Tesov |
| 2013/0294702 A1 | 11/2013 | Baselau et al. |
| 2014/0278081 A1 | 9/2014 | Iwuchukwu |
| 2015/0112592 A1 | 4/2015 | Smith |
| 2015/0168170 A1 | 6/2015 | Schilling et al. |
| 2016/0091321 A1 | 3/2016 | Chintakindi et al. |
| 2016/0097653 A1 | 4/2016 | Khetan et al. |
| 2016/0313130 A1 | 10/2016 | Baselau et al. |
| 2016/0313132 A1 | 10/2016 | Larroy |
| 2016/0370192 A1 | 12/2016 | Maischberger et al. |
| 2016/0370193 A1 | 12/2016 | Maischberger et al. |
| 2017/0016730 A1 | 1/2017 | Gawrilow |
| 2017/0120761 A1 | 5/2017 | Kapadia et al. |
| 2017/0318360 A1 | 11/2017 | Tran et al. |
| 2018/0033301 A1 | 2/2018 | Riou et al. |
| 2018/0216949 A1 | 8/2018 | Kluge |
| 2018/0259356 A1 | 9/2018 | Rolf et al. |
| 2019/0161084 A1 | 5/2019 | Greenwood et al. |
| 2020/0011676 A1 | 1/2020 | Ye et al. |
| 2020/0249033 A1 | 8/2020 | Gelhar |

FOREIGN PATENT DOCUMENTS

| | | |
|---|---|---|
| CN | 110070753 A | 7/2019 |
| WO | WO 2017/207143 A1 | 12/2017 |
| WO | WO 2018/234127 A1 | 12/2018 |
| WO | WO 2019/037959 A1 | 2/2019 |

OTHER PUBLICATIONS

European Patent Office, Extended European Search Report for Application No. 20164262.6 dated Sep. 18, 2020, 8 pages.

Bloom Filter—Wikipedia [online] [retrieved from the Internet Sep. 1, 2020] <URL: https://en.wikipedia.org/w/index.php?title=Bloom_filter&oldid=895163114>. (May 2, 2019) 19 pages.

Bando et al., "Flashtrie: Hash-based Prefix-Compressed Trie for IP Route Lookup Beyond 100gbps", 2010 Proceedings IEEE INFOCOM, San Diego, CA, 2010, pp. 1-9.

Binary Tree Structure—Wikipedia [online] [Retrieved Mar. 11, 2021]. Retrieved from the Internet: <URL: https://en.wikipedia.org/w/index.php?title=Binary_tree&oldid=957589766>. (dated May 19, 2020), 9 pages.

Lang et al., "Tree-Encoded Bitmaps", Proceedings of the 2020 ACM SIGMOD International Conference on Management of Data (Jun. 2020), 17 pages.

Ni et al., "Cloud-based Privacy-preserving Parking Navigation through Vehicular Communications", International Conference on Security and Privacy in Communication Systems (Jun. 2017), 19 pages.

Non-Final Office Action for U.S. Appl. No. 16/419,511 dated Feb. 18, 2021.

Notice of Allowance for U.S. Appl. No. 16/419,560 dated Mar. 4, 2021.

Zhang et al. "Succinct Range Filters", ACM SIGMOD Record, vol. 48, No. 1 (Mar. 2019), 8 pages.

Poornimakkani, et al., A Cloud Based End-To-End Smart Parking Solution Powered By IOT, International Research Journal of Engineering and Technology (IRJET), vol. 5, Issue 3, Mar. 2018, pp. 3559-3565.

Jiang et al., Design Of A Multiple Bloom-Filter For Distributed Navigation Routing, IEEE Transactions On Systems, Man, and Cybernetcs: Systems, Feb. 2014, vol. 44, Issue 2, pp. 1-8. DOI: 10.1109/TSMC.2013.2242884.

Ni et al., Privacy-Preserving Smart Parking Navigation Supporting Efficient Driving Guidance Retrieval, Feb. 20, 2018, [online], [retrieved from the Internet Jun. 10, 2019], <URL: https://engine.lib.uwaterloo.ca/ojs-2.2/index.php/pptvt/article/view/707/255> (14 pages).

Kayaturan, Representing Shortest Paths In Graphs Using Bloom Filters ithout False Positives and Applications to Routing In Computer Networks, A Thesis Submitted for the Degree of Doctor of Philosophy, Department of Mathematical Sciences, University of Essex, Oct. 2017, 178 pages.

Tomtom Real Time Traffic Information, [online], [retrieved from the Internet Jun. 10, 2019] <URL: https://www.tomtom.com/lib/img/REAL_TIME_TRAFFIC_WHITEPAPER.pdf> (21 pages).

Non-Final Office Action for U.S. Appl. No. 16/419,645 dated Mar. 26, 2021.

Choosumrong et al., "Implementation of Dynamic Cost Based Routing for Navigation Under Real Road Conditions using FOSS4G and OpenStreetMap", Proceedings of GIS-IDEAS 2010, Hanoi, Vietnam (Dec. 9-11, 2010), pp. 53-58.

Wang et al., "Research on a Clustering Data De-Duplication Mechanism Based on Bloom Filter", 2010 International Conference on Multimedia Technology, Ningbo, China (2010), pp. 1-5.

Hua et al., "A Multi-Attribute Data Structure with Parallel Bloom Filters for Network Services", High Performance Computing—HiPC 2006, 13th International Conference, Bangladore, India (Dec. 18-21, 2006), 12 pages.

Non-Final Office Action for U.S. Appl. No. 16/419,511 dated Apr. 16, 2021.

Notice of Allowance for U.S. Appl. No. 16/419,540 dated Apr. 29, 2021.

Notice of Allowance for U.S. Appl. No. 16/419,511 dated Jun. 11, 2021.

Notice of Allowance for U.S. Appl. No. 16/419,645 dated Jul. 14, 2021.

Notice of Allowance for U.S. Appl. No. 16/419,610 dated Aug. 16, 2021.

Non-Final Office Action for U.S. Appl. No. 16/419,579 dated Oct. 1, 2021.

* cited by examiner

BLOOM FILTER ROUTE ENCODING

TECHNOLOGICAL FIELD

Example embodiments relate generally to the encoding a route segment set defined by a route and/or decoding a route from a starting location to a target location. An example embodiment relates generally to the encoding of a route segment set and/or decoding of a route in a map version agnostic manner.

BACKGROUND

Generally, a mobile apparatus may submit a route request to a server and the server may generate the route and provide the route to the mobile apparatus. For example, the mobile apparatus may identify a starting segment and a target segment based on map information/data of a digital map stored by the mobile apparatus and provide the starting segment and the target segment to the server. The server receives the starting segment and the target segment, generates a route therebetween based on map information/data of a digital map stored by the server, and provides a list of segment identifiers to the mobile apparatus, where the segment identifiers correspond to the map information/data of the digital map stored by the server. However, problems can occur when the digital map stored by the mobile apparatus and the digital map stored by the server are different versions of the digital map. One solution is for the server to simply maintain multiple versions of the digital map. However, this solution is not viable for a digital map that updates regularly as the amount of memory needed to store and maintain all of the multiple versions of the digital map by the server is quite large.

BRIEF SUMMARY OF SOME EXAMPLE EMBODIMENTS

Various embodiments provide for the encoding of a route segment set and decoding of routes corresponding to the route segment set in a map version agnostic manner. As used herein, map version agnostic information/data is map information/data that is independent of a particular version of the digital map. For example, map version agnostic information/data is map information/data that is not expected to change between a first version of the digital map and a second version of the digital map. Various embodiments provide for the transmission of an encoded route segment set in a bandwidth efficient manner. In various embodiments, a route segment set is a set of segments of a route. For example, a route is an ordered set of segments and the route segment set is a set consisting of the segments in the ordered set of segments. However, the route segment set may not include any information/data regarding the ordering of the segments of the route. Various embodiments provide for encoding a route segment set using map version agnostic identifiers that are encoded into a bloom filter, such that the encoded route segment set may be transmitted as a bit array. In various embodiments, the encoding may be performed such that the resulting bloom filter is the smallest bloom filter that is satisfied by route segments of the route segment set being encoded (e.g., the members of the bloom filter are coded map version agnostic identifiers configured to identify the route segments of the route segment set being encoded) and that is not satisfied by adjacent segments of the route (e.g., coded map version agnostic identifiers configured to identify adjacent segments are not members of the bloom filter). As used herein, an adjacent segment is a segment that intersections a route, but that is not part of the route. For example, an adjacent segment is associated with an intersection or node that is also associated with a route segment of the route segment set. However, the adjacent segment is not a member of the route segment set.

For example, a mobile apparatus may have a mobile version of a digital map stored in memory of the mobile apparatus. The mobile apparatus may provide a route request including information identifying a starting location and a target location for a route. The information identifying the starting location and target location for the route is map version agnostic, in various embodiments. For example, the starting location may be provided as the midpoint and z-level of a mobile version segment corresponding to the current location/position of the mobile apparatus and/or a user provided origin. The midpoint of a segment is the coordinate pair (e.g., latitude and longitude) of the point that is approximately halfway down the segment, where the ends of the road segment are defined by intersections or nodes. For example, the midpoint of a segment is a point in the middle of the segment between the two intersections that define the ends of the segment. The z-level of a segment describes the relative location of roads that are stacked. For most segments, the z-level is 0 (e.g., unstacked and/or on ground level), however, for tunnels the z-level might be negative and for stacked roads/bridges z-level might be positive. For example, the target location for the route may be provided as the midpoint and z-level of a mobile version segment corresponding to a user provided destination of the route and/or a predicted destination of the route.

For example, a network apparatus may have a network version of the digital map stored in memory of the network apparatus. The network apparatus may receive the route request provided by the mobile apparatus and identify a network version starting segment corresponding to the starting location and a network version target segment corresponding to the target location. The network apparatus may then determine a route from the network version starting segment to the network version target segment using the network version of the digital map. In various embodiments, the route may be determined as an ordered list or set of route segments to be traversed from the network version starting segment to the network version target segment. For example, the ordered list or set of route segments may comprise an ordered list of segment identifiers that identify the route segments in the network version of the digital map. The route segments of the ordered list or set of route segments define a route segment set.

The network apparatus may then encode the route segment set by determining, generating, and/or accessing map version agnostic identifiers for each of the route segments of the route segment set. For example, the map version agnostic identifier for a route segment may be a particular element and/or particular combination of elements of map version agnostic map information/data corresponding to the route segment. In various embodiments, map version agnostic map information/data is map information/data that is not expected to change between map versions of the digital map. For example, the map version agnostic map information/data may include a road name, segment length, a direction of travel of a segment, a functional class of a segment, speed limit, segment midpoint, and/or the like. The map version agnostic identifiers for each of the route segments may then be coded and added to a bloom filter.

A bloom filter is a space-efficient probabilistic data structure that is used to test whether an element is a member of a set. False positive matches are possible, but false negatives are not. In other words, a query of a bloom filter returns either "possibly in set" or "definitely not in set." An empty bloom filter is a bit array of m bits all set to 0. One or more coding functions (e.g., k coding functions) are defined and used to map or code a set element to one of the m array positions. For example, to add a set element to the bloom filter, each of the k coding functions are used to identify k array positions. The k identified array positions are set to 1. To query the bloom filter to test whether a test element is in the set, the test element is coded using each of the k coding functions to determine k array positions corresponding to the test element. If any of the k array positions corresponding to the test element are 0, the test element is definitely not in the set. If all of the k array positions corresponding to the test element are in the set, then it is possible that the test element is a member of the set encoded by the bloom filter.

In an example embodiment, the network apparatus initiates the bloom filter with a size that is relatively small (e.g., the number of route segments in the route segment set) such that the probability of false positives is arbitrarily high. The bloom filter may then be tested to determine if a query of the bloom filter provides a false positive for any of the adjacent segments of the route. If a query of the bloom filter provides a false positive for any of the adjacent segments, the larger bloom filter may be generated based on coding the map version agnostic identifiers of each of the route segments using the k coding functions or a different set of coding functions to generate a bloom filter of m+1 bits. The testing process may be repeated until a query of the bloom filter does not return any false positives for the adjacent segments of the route.

The network apparatus may then provide a route response in response to the route request comprising the bloom filter such that the mobile apparatus receives the route response. The mobile apparatus may then use the bloom filter and the mobile version of the digital map to decode the route. The mobile apparatus may then provide the route (e.g., via a user interface), control a vehicle such that the vehicle traverses the route, and/or use the route and/or other information/data provided in the route response to perform one or more navigation functions. Some non-limiting examples of navigation functions include providing a route (e.g., via a user interface), localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like. Thus, the route, while determined using the network version of the digital map may then be decoded using the mobile version of the digital map such that differences between the network version and the mobile version of the digital map may be tolerated. Additionally, the bandwidth used to provide the route response is minimized by encoding the route segment set using the smallest bit array that does not provide any false positives for any of the adjacent segments of the route.

Various embodiments of the present invention therefore provide technical solutions to the technical problems of the bandwidth efficient communication of routes between apparatuses that have access to different versions of a digital map.

Various embodiments provide for the determining and encoding (e.g., by a network apparatus) route segment sets for shortest distance routes, shortest expected travel time routes, multiple way point routes, routes with additional traffic information/data, routes to points of interest (POIs) identified in a POI search, parking cruise routes, and/or the like. Various embodiments provide for the decoding and use (e.g., by a mobile apparatus) of shortest distance routes, shortest expected travel time routes, multiple way point routes, routes with additional traffic information/data, routes to POIs identified in a POI search, parking cruise routes, and/or the like.

In an example embodiment, a route is determined from a network version starting segment to a network version target location based on map data of a network version of a digital map. The route comprises a list of route segments to be traveled from the network version starting segment to the network version target segment. The route is determined by a network apparatus comprising at least one processor, a memory storing the network version of the digital map, and a communication interface. Map version agnostic information identifying each segment of the list of route segments is accessed from the network version of the digital map. A map version agnostic identifier is generated for each route segment of the list of route segments based on the accessed map version agnostic information. The map version agnostic identifier for each route segment is coded using at least one coding function to generate at least one coded map version agnostic identifier for each route segment. A bloom filter is generated based on the coded map version agnostic identifiers for each route segment. The bloom filter is provided such that a mobile apparatus receives the bloom filter.

According to a first aspect, a method is provided. In an example embodiment, the method comprises determining a route from a network version starting segment to a network version target location based on map data of a network version of a digital map. The route comprises a list of route segments to be traveled from the network version starting segment to the network version target segment. The route is determined by a network apparatus comprising at least one processor, a memory storing the network version of the digital map, and a communication interface. The method further comprises accessing map version agnostic information identifying each segment of the list of route segments from the network version of the digital map; generating a map version agnostic identifier for each route segment of the list of route segments based on the accessed map version agnostic information; coding the map version agnostic identifier for each route segment using at least one coding function to generate at least one coded map version agnostic identifier for each route segment; generating a bloom filter based on the coded map version agnostic identifiers for each route segment; and providing the bloom filter such that a mobile apparatus receives the bloom filter.

In an example embodiment, the route is determined in response to receiving a route request providing information identifying the starting location and the target location. In an example embodiment, the information identifying the starting location and the target location are map version agnostic. In an example embodiment, the information identifying the starting location is a geolocation of a point along a mobile version starting segment corresponding to an origin and the information identifying the target location is a geolocation of a point along a mobile version target segment corresponding to a destination. In an example embodiment, generating the bloom filter comprises generating at least one coded map version agnostic identifier for at least one adjacent segment using the at least one coding function; and determining whether the at least one coded map version agnostic identifier for the at least one adjacent segment satisfies the bloom filter, wherein an adjacent segment intersects the route and is not a route segment. In an example, embodiment, generating the bloom filter further comprises, responsive to determining that an adjacent segment satisfies the bloom filter, increasing the size of the bloom filter until there are no adjacent segments that satisfy the bloom filter. In an example embodiment, the map version agnostic information comprises at least one of road name, segment length, a direction of travel of a segment, a functional class of a segment, or speed limit. In an example embodiment, the at least one coding function comprises a hash function.

In an example embodiment, the method further comprises determining a route length of the route by summing a length of each route segment and providing the route length with the bloom filter. In an example embodiment, the route comprises one or more waypoints between the network version starting segment and the network version target segment, the one or more waypoints defining a plurality of legs of the route, and generating the bloom filter comprises generating a bloom filter for each leg of the route. In an example embodiment, the route is determined using a cost minimization route determination algorithm. In an example embodiment, a cost value assigned to a segment for use by the cost minimization route determination algorithm for determining the route corresponds to at least one of a length of the segment or an expected time to traverse the segment. In an example embodiment, the bloom filter is provided such that a mobile apparatus receives the bloom filter, wherein the mobile apparatus is configured to decode a decoded route based on the bloom filter and a mobile version of the digital map and perform one or more navigation functions based on the decoded route.

According to another aspect, an apparatus is provided. In an example embodiment, the apparatus comprises at least one processor, a communications interface configured for communicating via at least one network, and at least one memory storing computer program code and a network version of a digital map. The at least one memory and the computer program code are configured to, with the processor, cause the apparatus to at least determine a route from a network version starting segment to a network version target location based on map data of the network version of the digital map, the route comprising a list of route segments to be traveled from the network version starting segment to the network version target segment; access map version agnostic information identifying each segment of the list of route segments from the network version of the digital map; generate a map version agnostic identifier for each route segment of the list of route segments based on the accessed map version agnostic information; code the map version agnostic identifier for each route segment using at least one coding function to generate at least one coded map version agnostic identifier for each route segment; generate a bloom filter based on the coded map version agnostic identifiers for each route segment; and provide the bloom filter such that a mobile apparatus receives the bloom filter.

In an example embodiment, the route is determined in response to receiving a route request providing information identifying the starting location and the target location. In an example embodiment, the information identifying the starting location and the target location are map version agnostic. In an example embodiment, the information identifying the starting location is a geolocation of a point along a mobile version starting segment corresponding to an origin and the information identifying the target location is a geolocation of a point along a mobile version target segment corresponding to a destination. In an example embodiment, generating the bloom filter comprises generating at least one coded map version agnostic identifier for at least one adjacent segment using the at least one coding function; and determining whether the at least one coded map version agnostic identifier for the at least one adjacent segment satisfies the bloom filter, wherein an adjacent segment intersects the route and is not a route segment. In an example, embodiment, generating the bloom filter further comprises, responsive to determining that an adjacent segment satisfies the bloom filter, increasing the size of the bloom filter until there are no adjacent segments that satisfy the bloom filter. In an example embodiment, the map version agnostic information comprises at least one of road name, segment length, a direction of travel of a segment, a functional class of a segment, or speed limit. In an example embodiment, the at least one coding function comprises a hash function.

In an example embodiment, the at least one memory and the computer program code are further configured to, with the processor, cause the apparatus to at least determine a route length of the route by summing a length of each route segment and provide the route length with the bloom filter. In an example embodiment, the route comprises one or more waypoints between the network version starting segment and the network version target segment, the one or more waypoints defining a plurality of legs of the route, and generating the bloom filter comprises generating a bloom filter for each leg of the route. In an example embodiment, the route is determined using a cost minimization route determination algorithm. In an example embodiment, a cost value assigned to a segment for use by the cost minimization route determination algorithm for determining the route corresponds to at least one of a length of the segment or an expected time to traverse the segment. In an example embodiment, the bloom filter is provided such that a mobile apparatus receives the bloom filter, wherein the mobile apparatus is configured to decode a decoded route based on the bloom filter and a mobile version of the digital map and perform one or more navigation functions based on the decoded route.

According to yet another aspect, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to determine a route from a network version starting segment to a network version target location based on map data of the network version of the digital map, the route comprising a list of route segments to be traveled from the network version starting segment to the network version target segment; access map version agnostic information identifying each segment of the list of route segments from the network version of the digital map; generate a map version agnostic identifier for each route segment of the list of route segments based on the accessed map version agnostic information; code the map version agnostic identifier for each route segment using at least one coding function to generate at least one coded map version agnostic identifier for each route segment; generate a bloom filter based on the coded map version agnostic identifiers for each route segment; and provide the bloom filter such that a mobile apparatus receives the bloom filter.

In an example embodiment, the route is determined in response to receiving a route request providing information identifying the starting location and the target location. In an example embodiment, the information identifying the starting location and the target location are map version agnostic. In an example embodiment, the information identifying the starting location is a geolocation of a point along a mobile version starting segment corresponding to an origin and the information identifying the target location is a geolocation of a point along a mobile version target segment corresponding to a destination. In an example embodiment, generating the bloom filter comprises generating at least one coded map version agnostic identifier for at least one adjacent segment using the at least one coding function; and determining whether the at least one coded map version agnostic identifier for the at least one adjacent segment satisfies the bloom filter, wherein an adjacent segment intersects the route and is not a route segment. In an example, embodiment, generating the bloom filter further comprises, responsive to determining that an adjacent segment satisfies the bloom filter, increasing the size of the bloom filter until there are no adjacent segments that satisfy the bloom filter. In an example embodiment, the map version agnostic information comprises at least one of road name, segment length, a direction of travel of a segment, a functional class of a segment, or speed limit. In an example embodiment, the at least one coding function comprises a hash function.

In an example embodiment, the computer-readable program code portions further comprise executable portions configured, when executed by a processor of an apparatus, to cause the apparatus to determine a route length of the route by summing a length of each route segment and provide the route length with the bloom filter. In an example embodiment, the route comprises one or more waypoints between the network version starting segment and the network version target segment, the one or more waypoints defining a plurality of legs of the route, and generating the bloom filter comprises generating a bloom filter for each leg of the route. In an example embodiment, the route is determined using a cost minimization route determination algorithm. In an example embodiment, a cost value assigned to a segment for use by the cost minimization route determination algorithm for determining the route corresponds to at least one of a length of the segment or an expected time to traverse the segment. In an example embodiment, the bloom filter is provided such that a mobile apparatus receives the bloom filter, wherein the mobile apparatus is configured to decode a decoded route based on the bloom filter and a mobile version of the digital map and perform one or more navigation functions based on the decoded route.

According to yet another aspect, an apparatus is provided. In an example embodiment, the apparatus comprises means for determining a route from a network version starting segment to a network version target location based on map data of a network version of a digital map. The route comprises a list of route segments to be traveled from the network version starting segment to the network version target segment. The apparatus comprises means for accessing map version agnostic information identifying each segment of the list of route segments from the network version of the digital map. The apparatus comprises means for generating a map version agnostic identifier for each route segment of the list of route segments based on the accessed map version agnostic information. The apparatus comprises means for coding the map version agnostic identifier for each route segment using at least one coding function to generate at least one coded map version agnostic identifier for each route segment. The apparatus comprises means for generating a bloom filter based on the coded map version agnostic identifiers for each route segment. The apparatus comprises means for providing the bloom filter such that a mobile apparatus receives the bloom filter.

BRIEF DESCRIPTION OF THE DRAWINGS

Figure 1:
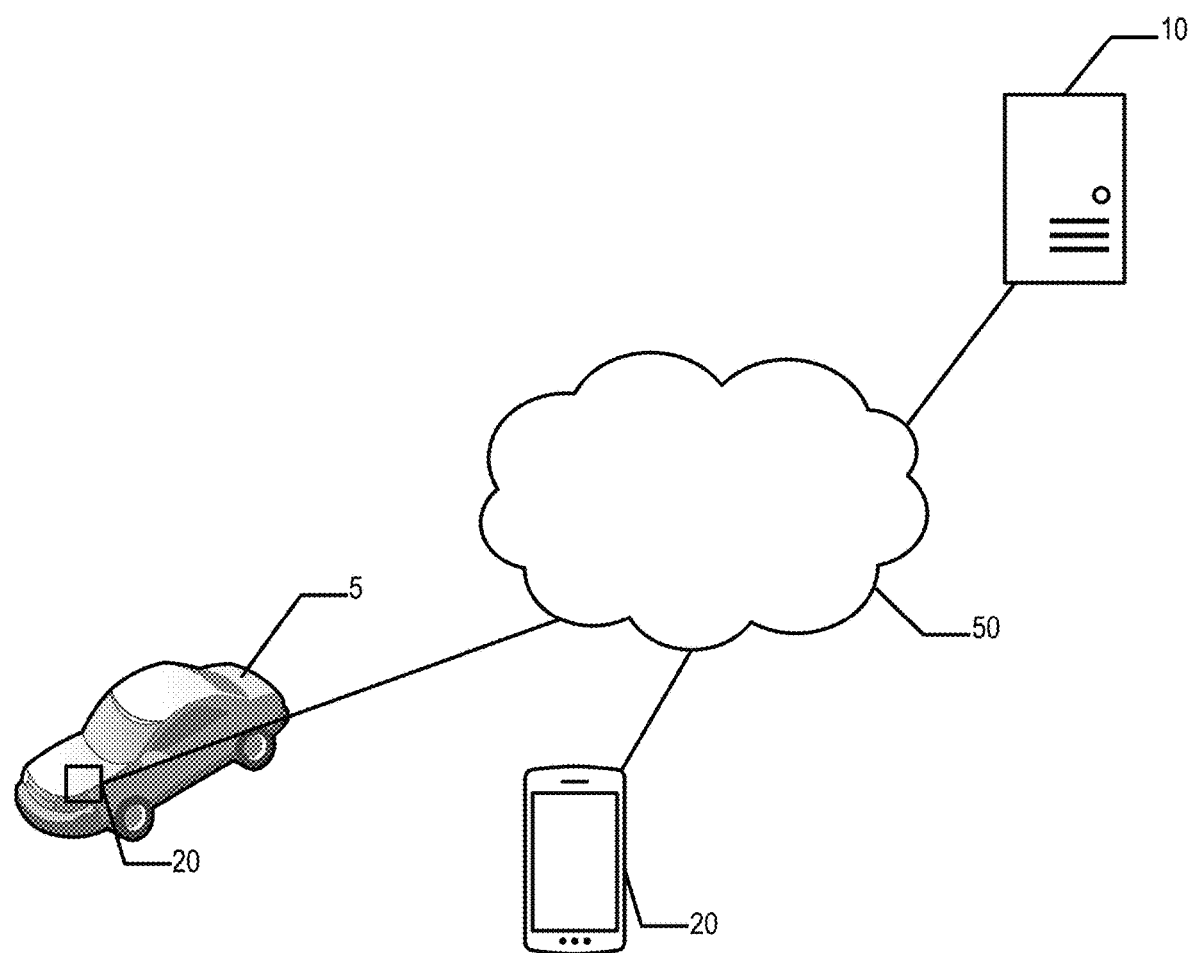
Figure 2A:
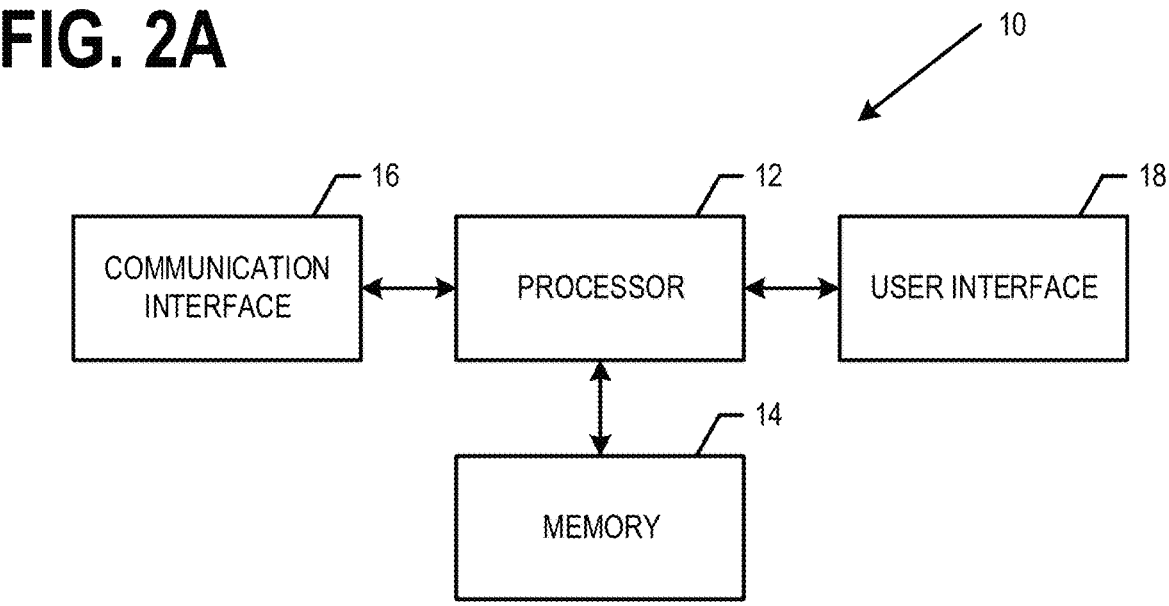
Figure 2B:
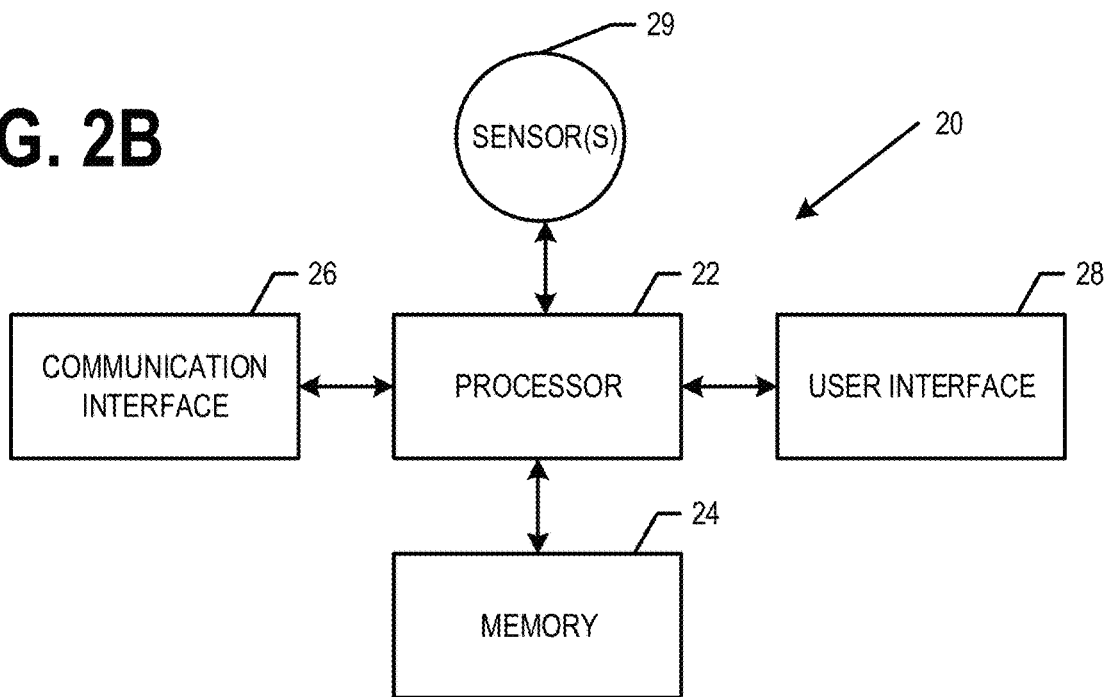
Figure 3:
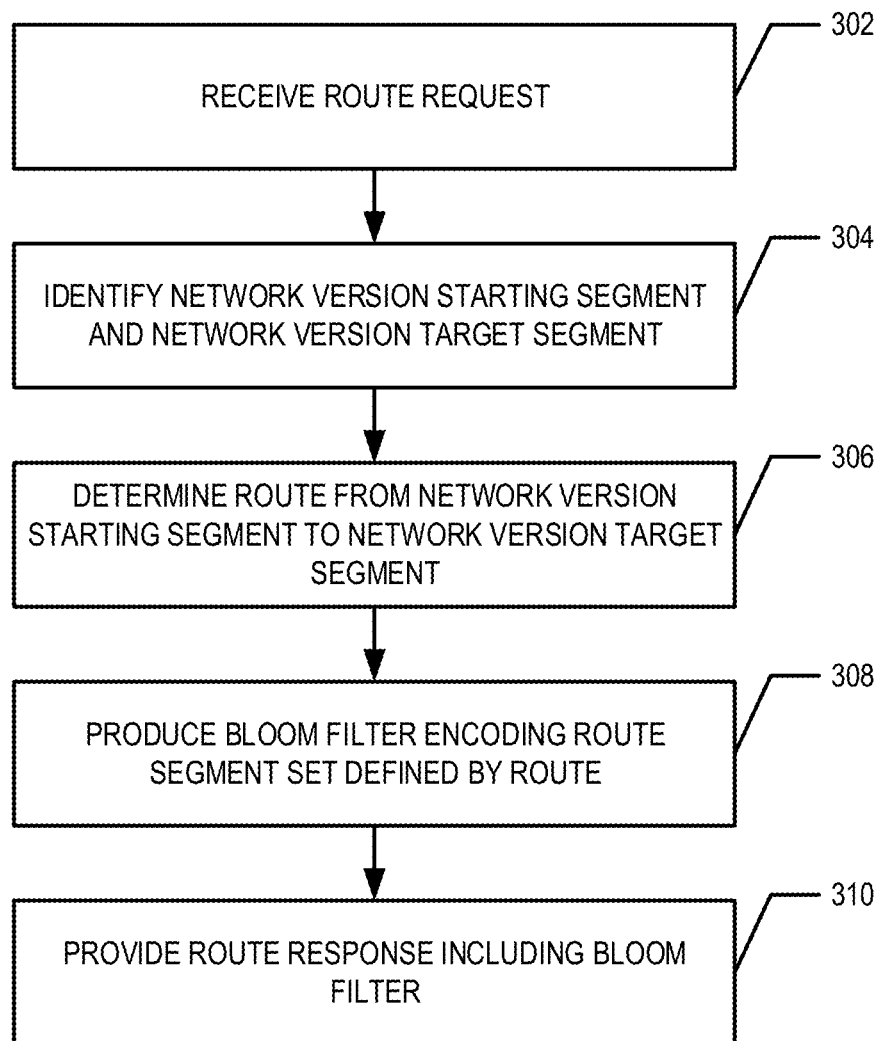
Figure 4:
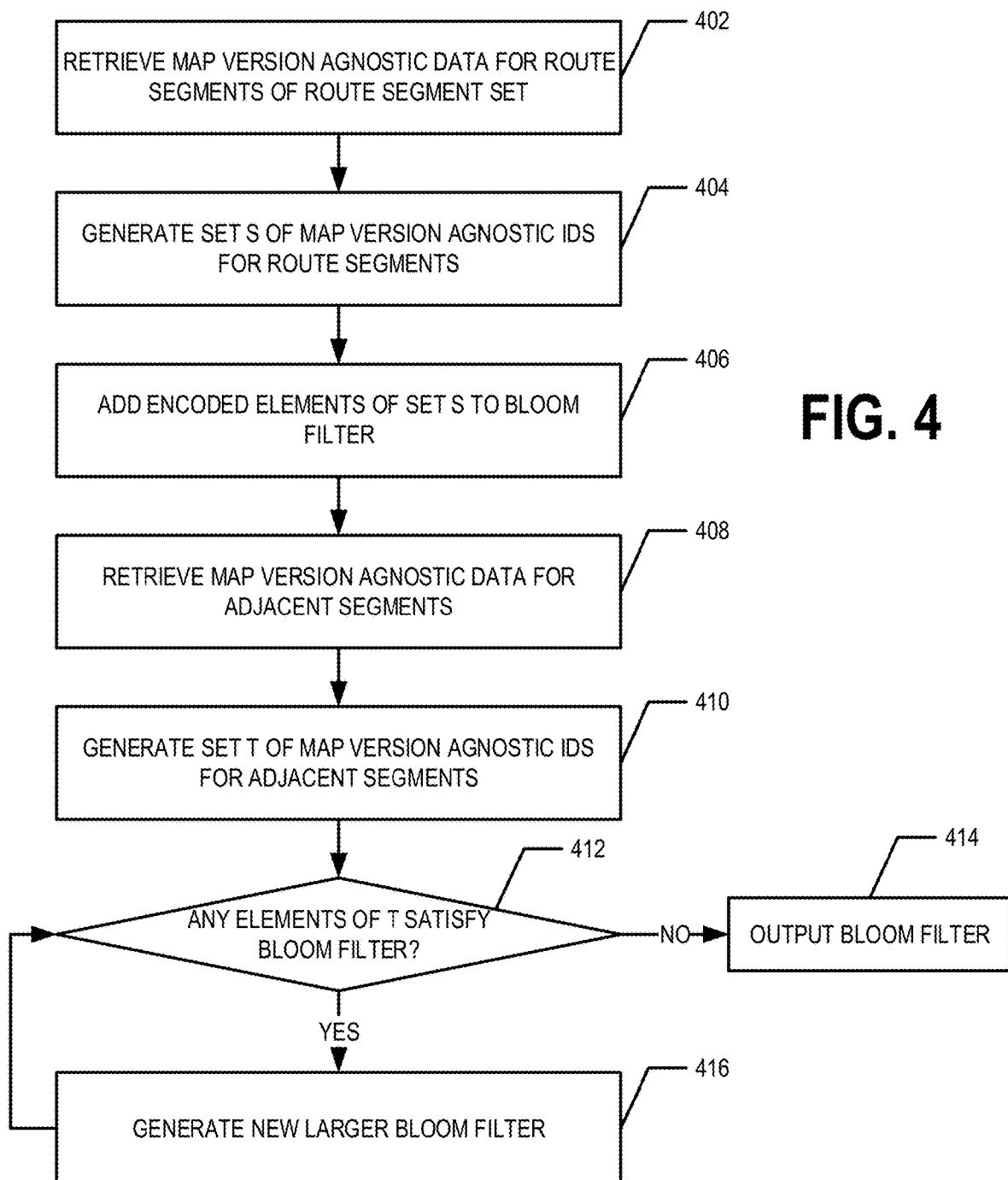
Figure 5:
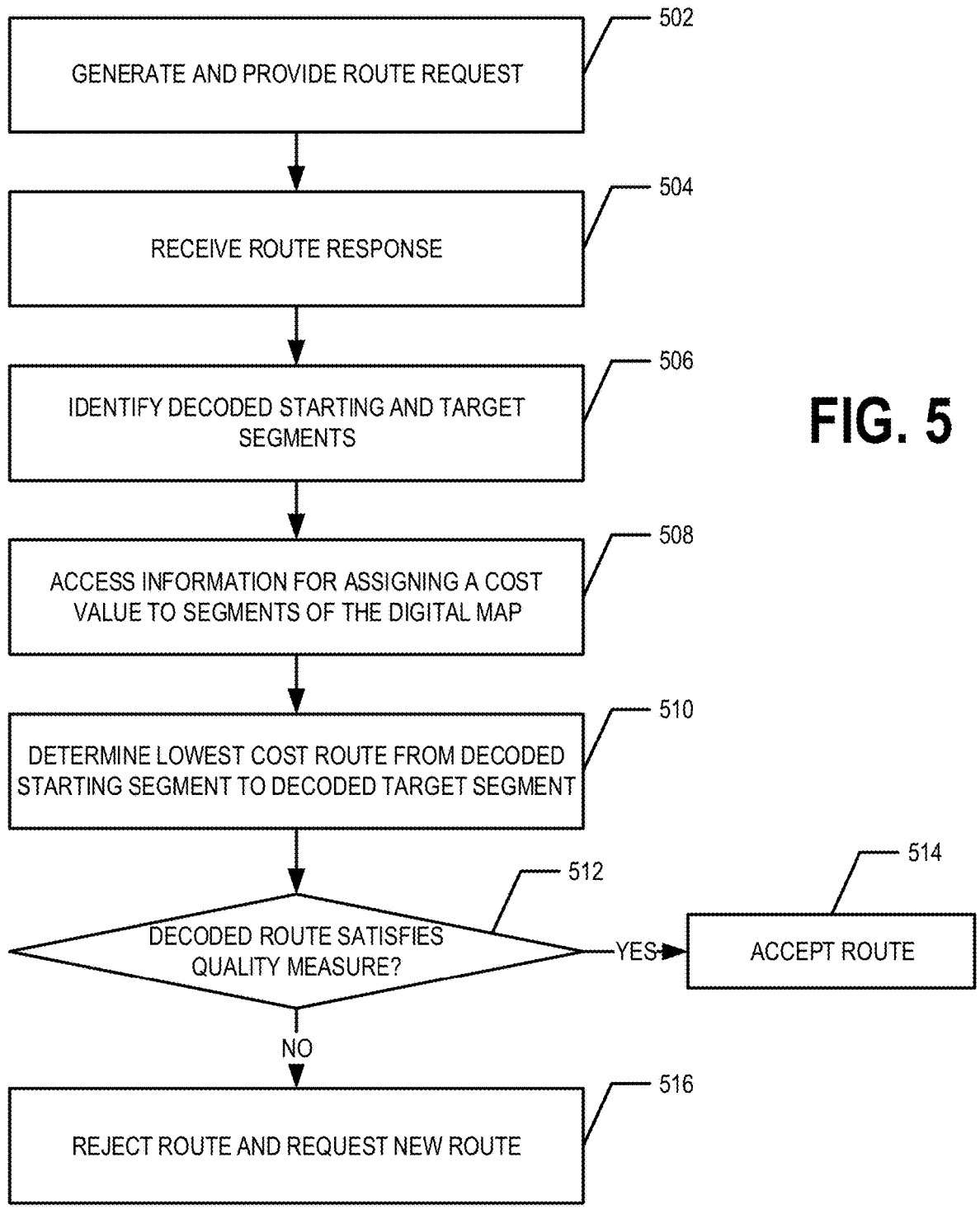
Figure 6B:
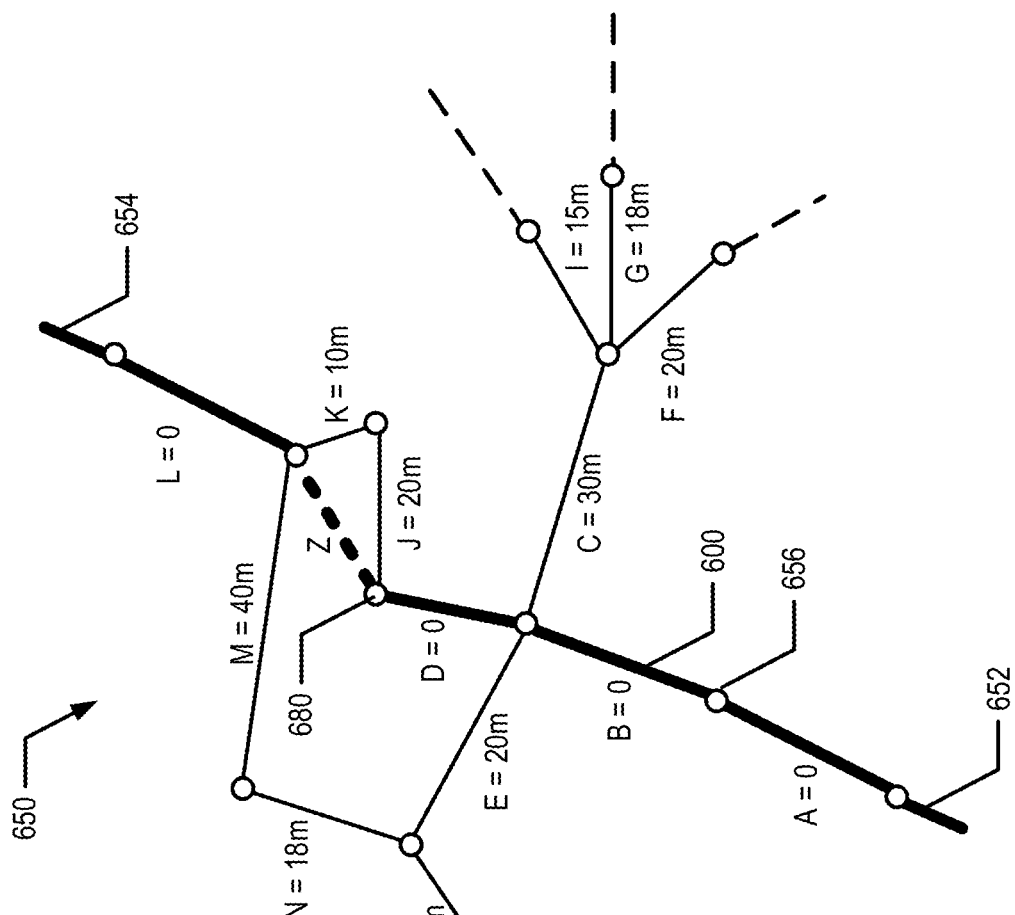
Figure 6A:
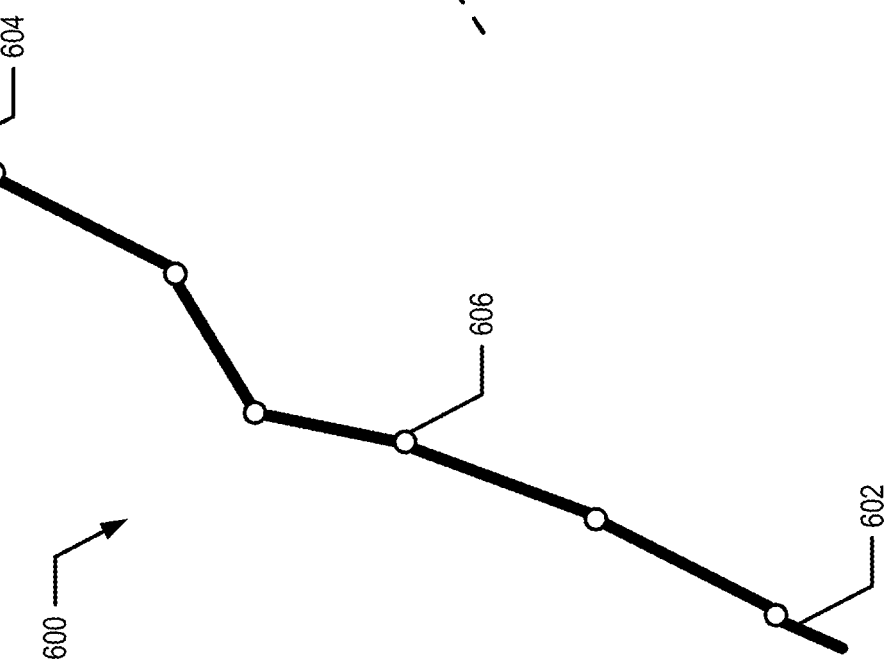
Figure 7:
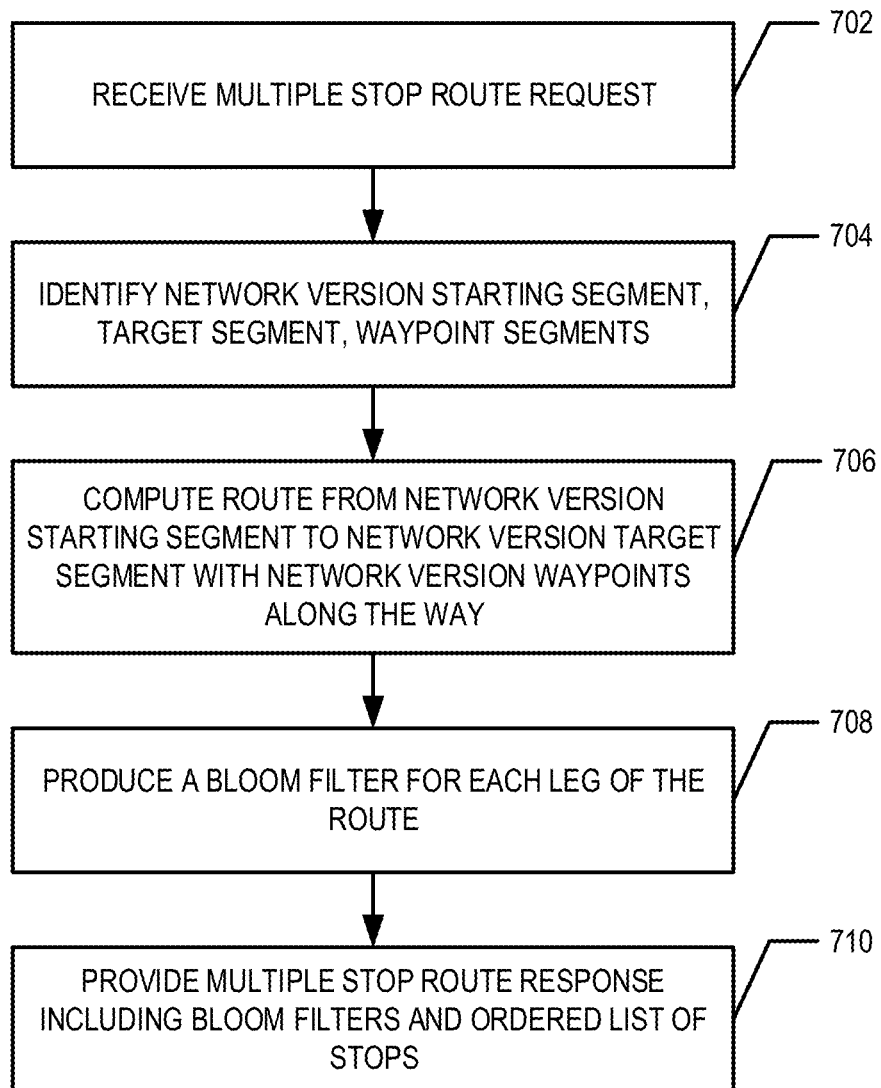
Figure 8:
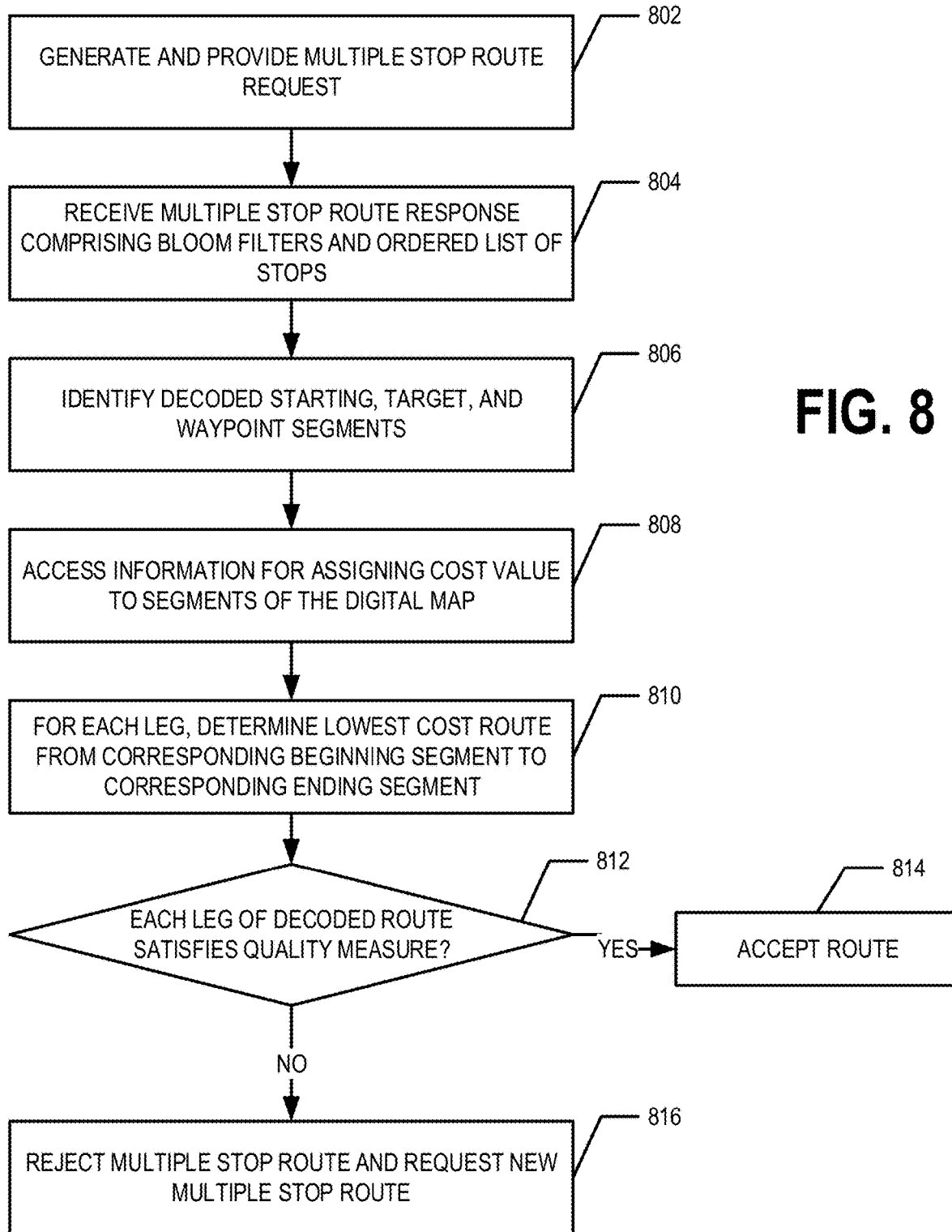
Figure 9:
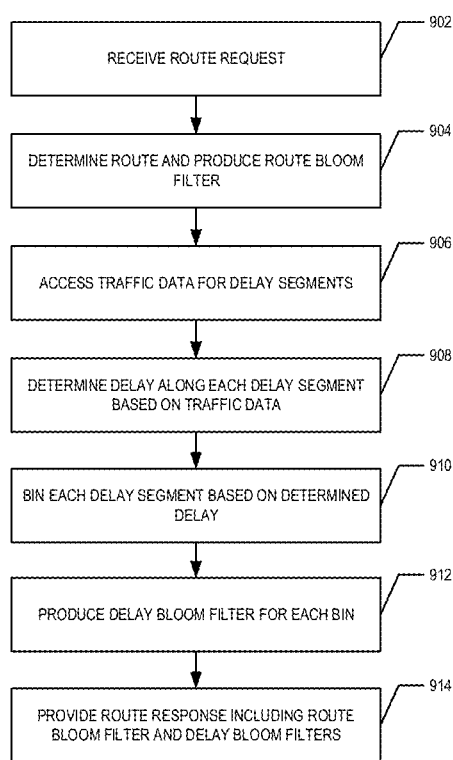
Figure 10:
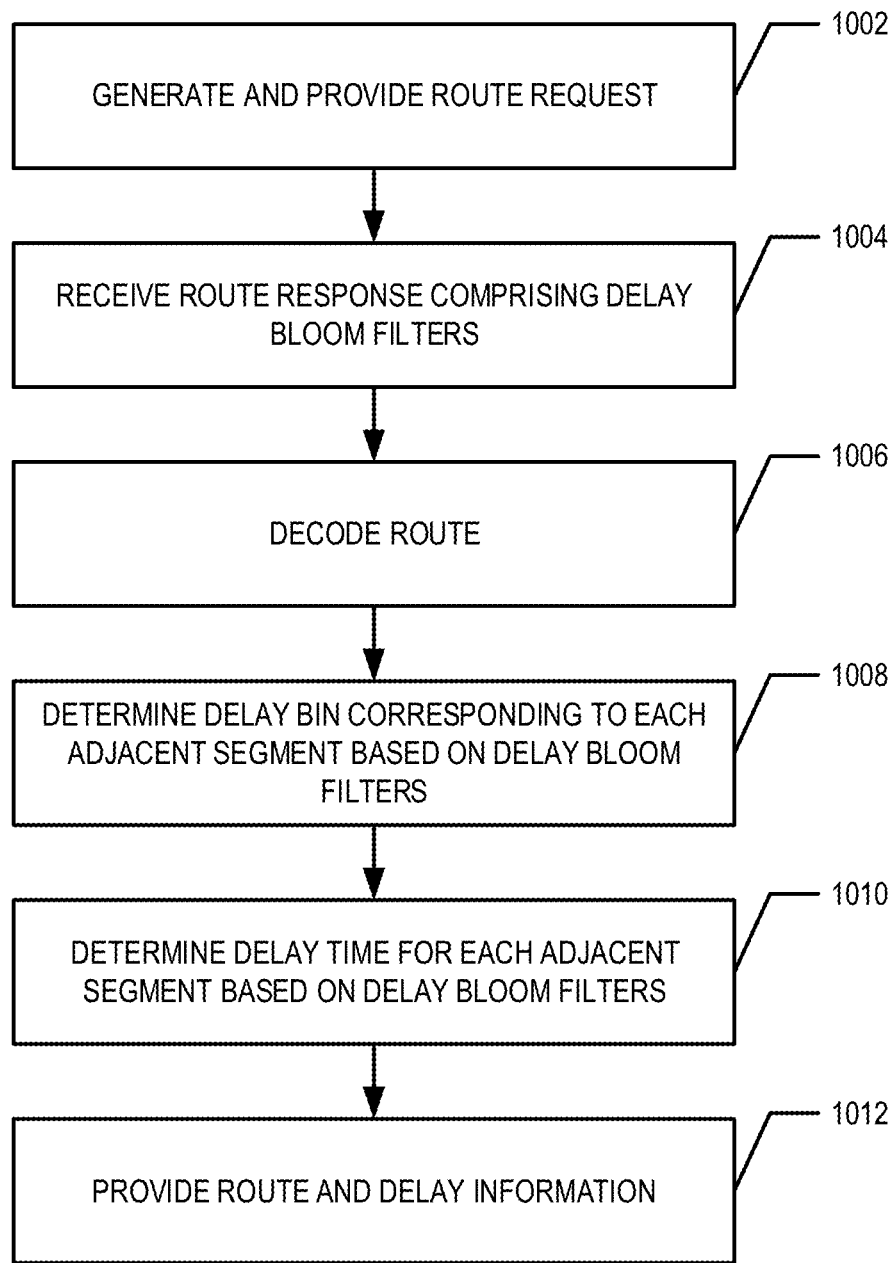
Figure 11:
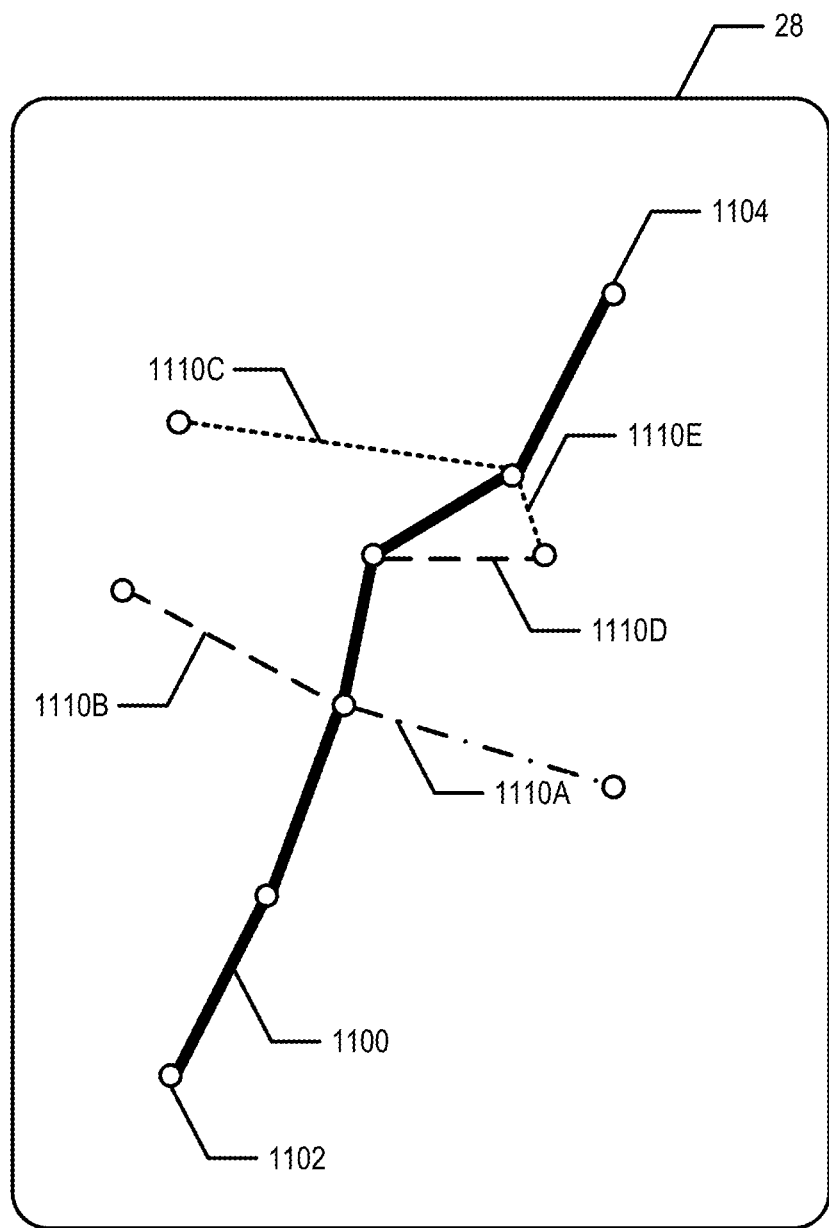
Figure 12:
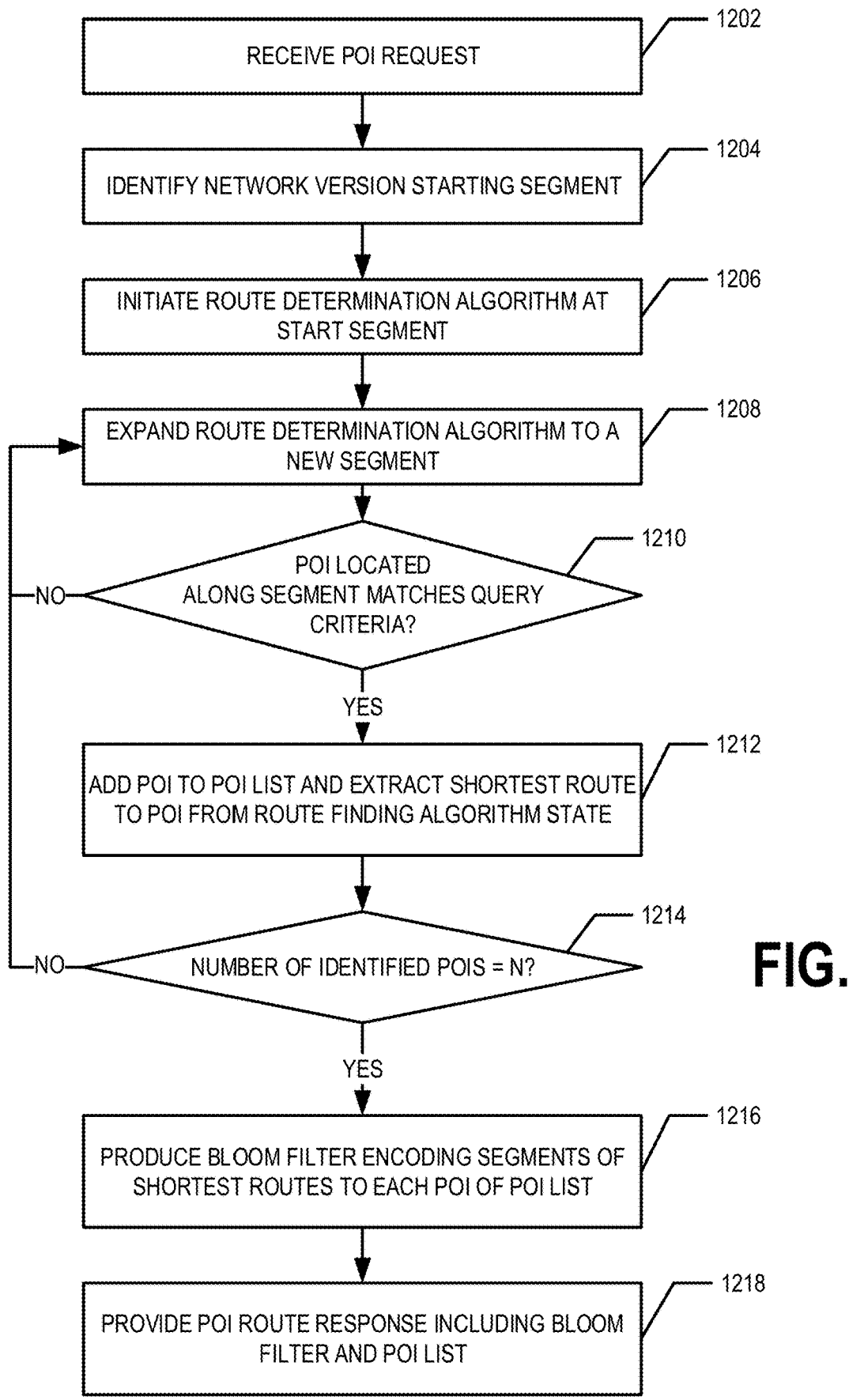
Figure 13:
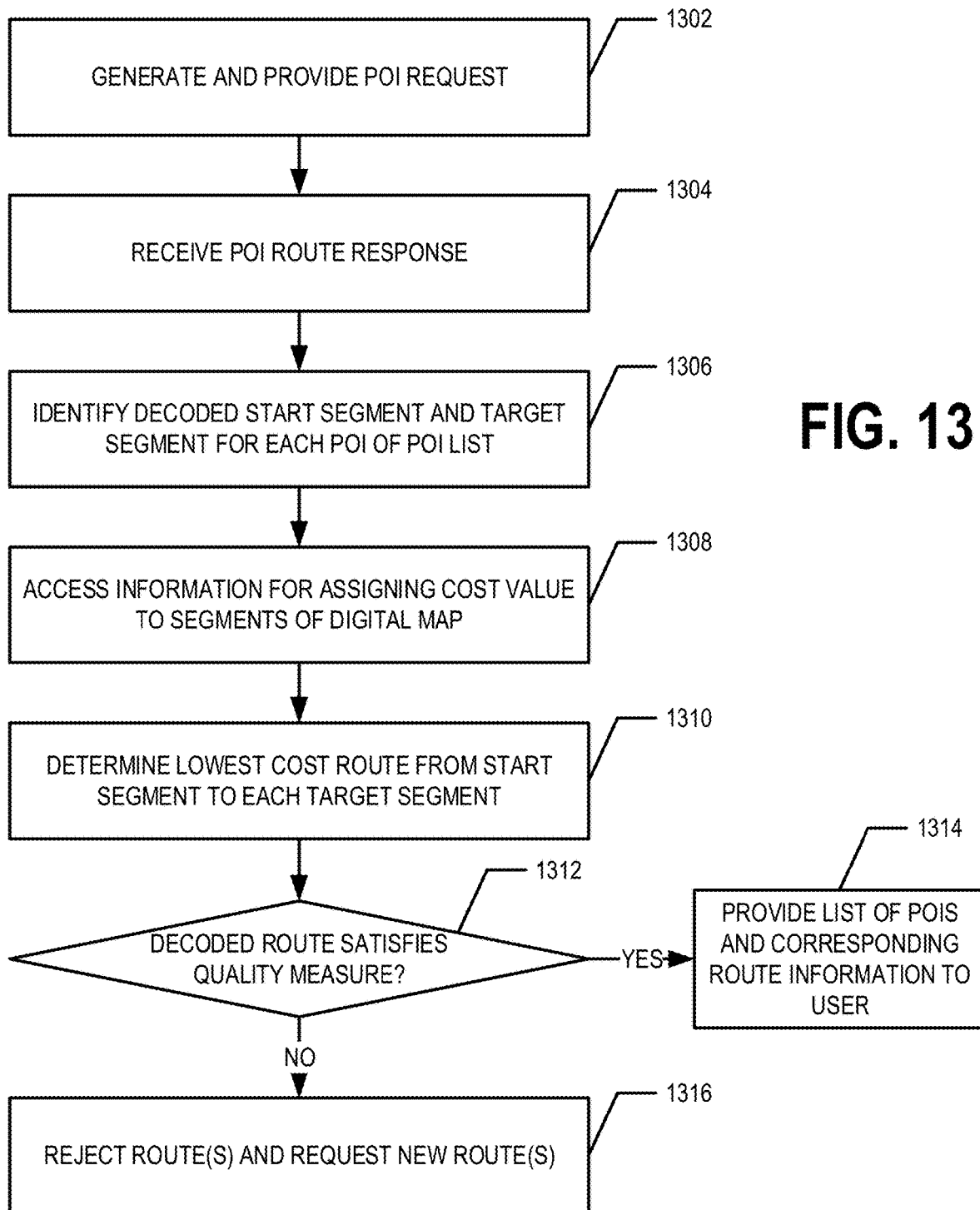
Figure 14:
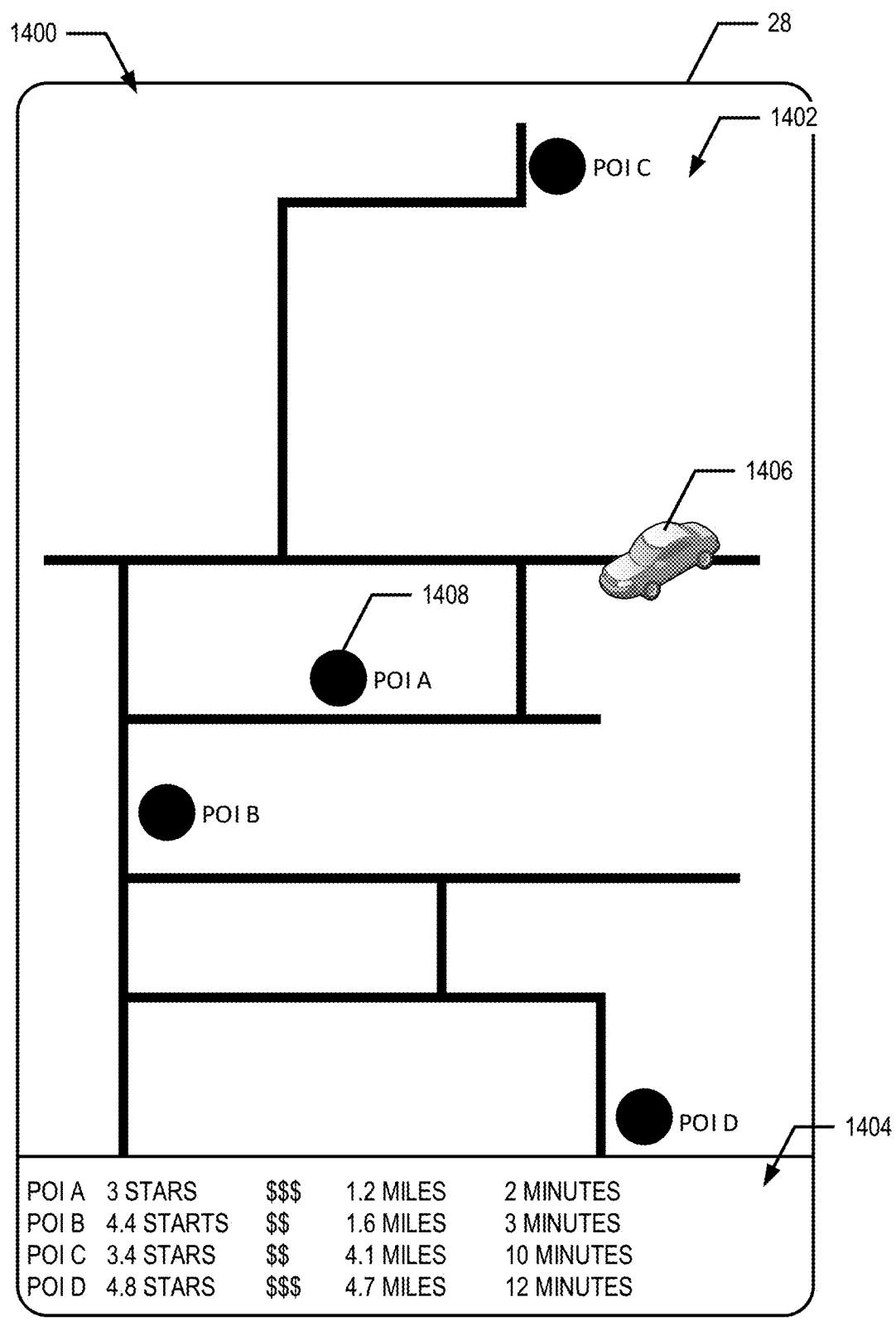
Figure 15:
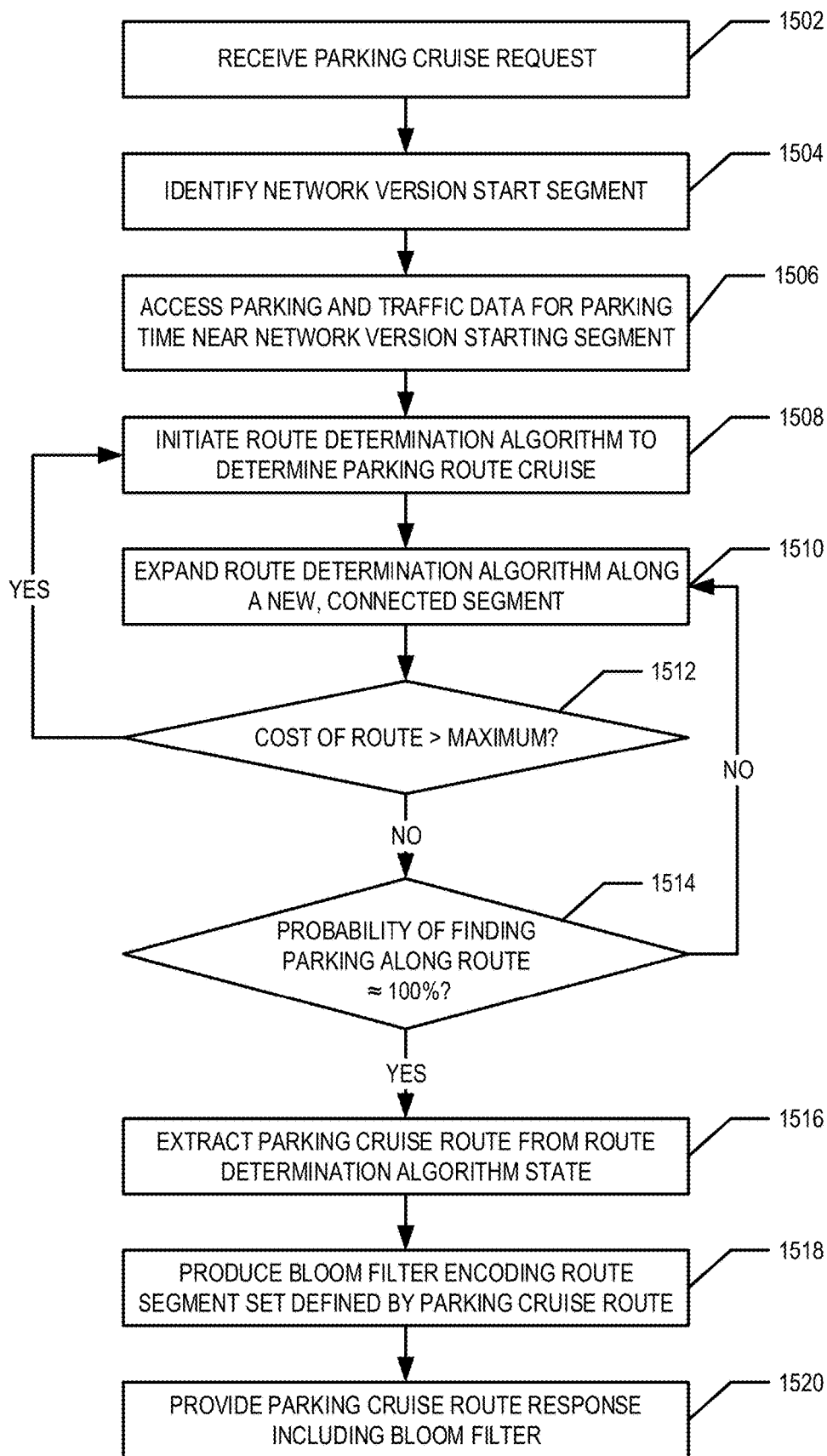
Figure 16:
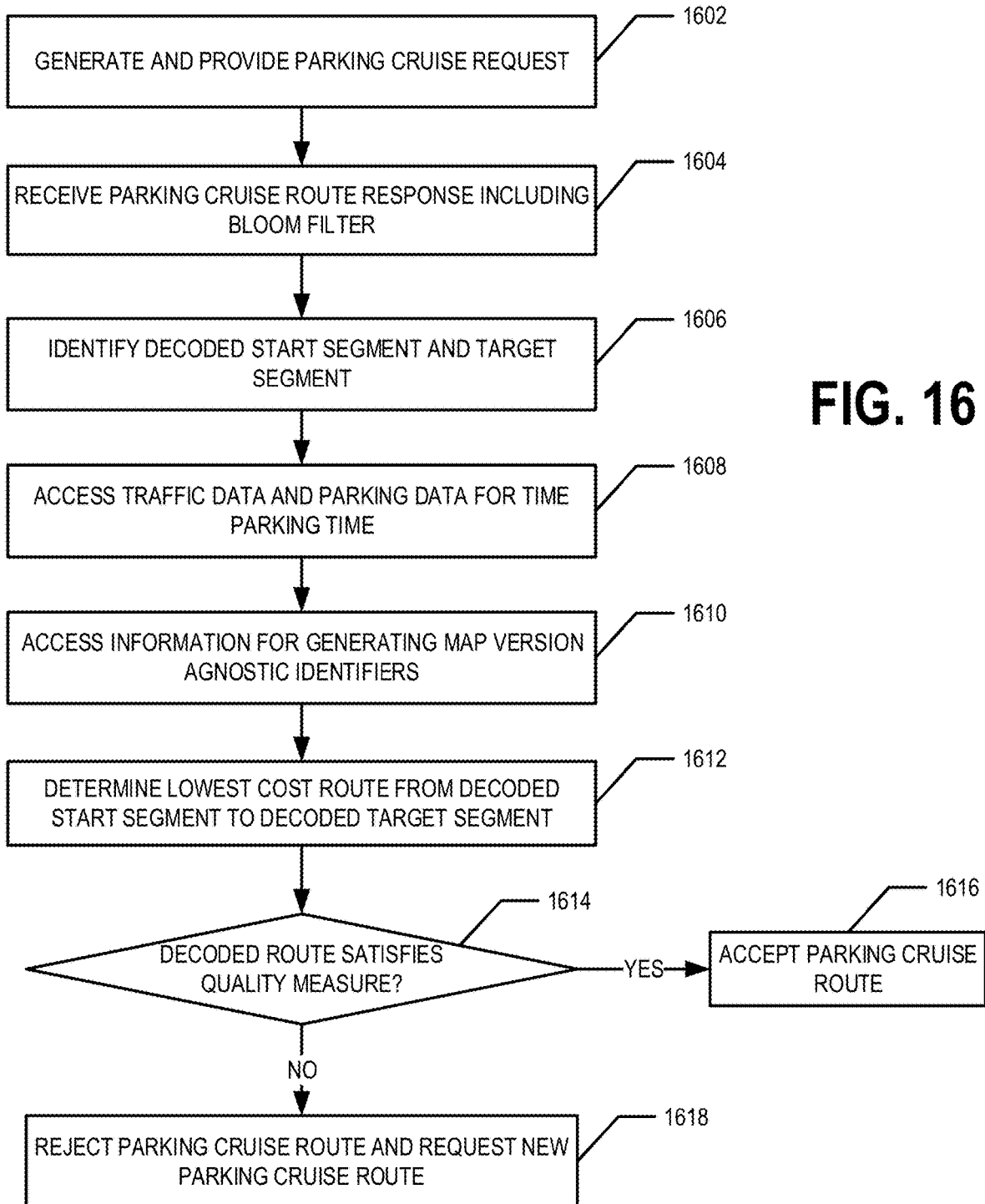

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment;

FIG. 2B is a block diagram of a mobile apparatus that may be specifically configured in accordance with an example embodiment;

FIG. 3 is a flowchart illustrating operations performed, such as by the network apparatus of FIG. 2A to provide a route response, in accordance with an example embodiment;

FIG. 4 is a flowchart illustrating operations performed, such as by the network apparatus of FIG. 2A to produce a bloom filter, in accordance with an example embodiment;

FIG. 5 is a flowchart illustrating operations performed, such as by the mobile apparatus of FIG. 2B to decode a route based on a route segment set encoded by a bloom filter, in accordance with an example embodiment;

FIG. 6A illustrates an example route, in accordance with an example embodiment;

FIG. 6B illustrates a process performed to generate a decoded route based on a bloom filter encoding a route segment set defined by the route shown in FIG. 6A, in accordance with an example embodiment;

FIG. 7 is a flowchart illustrating operations performed, such as by the network apparatus of FIG. 2A to provide a multiple stop route response, in accordance with an example embodiment;

FIG. 8 is a flowchart illustrating operations performed, such as by the mobile apparatus of FIG. 2B to decode legs of a multiple stop route based on a received multiple stop route response, in accordance with an example embodiment;

FIG. 9 is a flowchart illustrating operations performed, such as by the network apparatus of FIG. 2A to provide a route response including additional traffic information/data, in accordance with an example embodiment;

FIG. 10 is a flowchart illustrating operations performed, such as by the mobile apparatus of FIG. 2B to decode and use additional traffic information/data, in accordance with an example embodiment;

FIG. 11 is an example interactive user interface (IUI) of a user interface of a mobile apparatus of FIG. 2B providing a route and corresponding additional traffic information/data, in accordance with an example embodiment;

FIG. 12 is a flowchart illustrating operations performed, such as by the network apparatus of FIG. 2A to provide a POI route response, in accordance with an example embodiment;

FIG. 13 is a flowchart illustrating operations performed, such as by the mobile apparatus of FIG. 2B to provide a user with a results of a POI search, in accordance with an example embodiment;

FIG. 14 is an example POI search result WI of a user interface of a mobile apparatus of FIG. 2B providing results of a POI search, in accordance with an example embodiment;

FIG. 15 is a flowchart illustrating operations performed, such as by the network apparatus of FIG. 2A to provide a parking cruise route response, in accordance with an example embodiment; and FIG. 16 is a flowchart illustrating operations performed, such as by the mobile apparatus of FIG. 2B to decode and use a parking cruise route, in accordance with an example embodiment.

DETAILED DESCRIPTION OF SOME
EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, and computer program products are provided in accordance with various embodiments in order to provide a route segment set encoded in a map version agnostic manner, provide (e.g., transmit) an encoded route segment set in a bandwidth efficient manner, and to generate and use a decoded route based on a route segment set that was encoded in a map version agnostic manner. For example, various embodiments provide for encoding a route segment set using map version agnostic identifiers configured to identify the route segments that make up the route that are encoded into a bloom filter, such that the encoded route segment set may be transmitted as a bit array. In various embodiments, the encoding may be performed such that the resulting bloom filter is the smallest bloom filter that is satisfied by route segments of the route (e.g., the members of the route segment set being encoded such that the members of the bloom filter are coded map version agnostic identifiers of the route segments of the route segment set) and that is not satisfied by adjacent segments of the route (e.g., coded map version agnostic identifiers of adjacent segments are not members of the bloom filter). As used herein, an adjacent segment is a segment that intersects a route, but that is not part of the route.

For example, a mobile apparatus may have a mobile version of a digital map stored in memory of the mobile apparatus. The mobile apparatus may provide a route request including information identifying a starting location and a target location for a route. The information identifying the starting location and target location for the route is map version agnostic, in various embodiments. For example, the starting location may be provided as the midpoint and z-level of a mobile version starting segment corresponding to the current location/position of the mobile apparatus and/or a user provided location. The midpoint of a segment is the coordinate pair (e.g., latitude and longitude) of the point that is approximately halfway down the segment, where the ends of the road segment are defined by intersections or nodes. For example, the midpoint of a segment is a point in the middle of the segment between the two intersections that define the ends of the segment. The z-level of a segment describes the relative location of roads that are stacked. For most segments, the z-level is 0 (e.g., unstacked and/or on ground level), however, for tunnels the z-level might be negative and for stacked roads/bridges z-level might be positive. For example, the target location for the route may be provided as the midpoint and z-level of a mobile version target segment corresponding to a user provided destination of the route and/or a predicted destination of the route.

For example, a network apparatus may have a network version of the digital map stored in memory of the network apparatus. In various situations, the mobile version and the network version may be different versions of the digital map. The network apparatus may receive the route request provided by the mobile apparatus and identify a network version starting segment corresponding to the starting location and a network version target segment corresponding to the target location. The network apparatus may then determine a route from the network version starting segment to the network version target segment using the network version of the digital map. In various embodiments, the network apparatus may determine the route using a best-first algorithm (e.g., Dijkstra's algorithm and/or a modified Dijkstra's algorithm) or another route determination algorithm. In various embodiments, the route determination algorithm is configured to determine a lowest cost route. In various embodiments, the route may be determined as an ordered list or set of route segments of the network version of the digital map to be traversed from the network version starting segment to the network version target segment. For example, the ordered list or set of route segments may comprise an ordered list of segment identifiers that identify the route segments in the network version of the digital map. The route segments of the ordered list or set of route segments define a route segment set. For example, the route segment set is a set having as members only the route segments of the ordered list or set of route segments.

The network apparatus may then encode the route segment set by determining, generating, and/or accessing map version agnostic identifiers for each of the route segments of the route segment set. For example, the map version agnostic identifier for a segment may be a particular element and/or particular combination of elements of map version agnostic map information/data corresponding to the segment. In various embodiments, map version agnostic map information/data is map information/data that is not expected to change between map versions of the digital map. For example, the map version agnostic map information/data may include a road name, segment length, a direction of travel of a segment, a functional class of a segment, speed limit, segment midpoint, and/or the like. A set S is defined that consists of a map version agnostic identifier for each of the route segments of the route segment set. For example, the number of elements in the set S is equal to the number of route segments of the route. Each element of the set S (e.g., the map version agnostic identifiers for each of the route segments) may then be coded using one or more coding functions and added to a bloom filter. The bloom filter may then be used to test one or more coded map version agnostic identifiers to determine if it is possible for the one or more map version agnostic identifiers to be elements of the set S. For example, the bloom filter may be used to test whether one or more segments are route segments of the route (if a segment may be a member of the route segment set).

In general, a bloom filter is a space-efficient probabilistic data structure that is used to test whether an element is a member of a set. False positive matches are possible, but false negatives are not. In other words, a query of a bloom filter returns either "possibly in set" or "definitely not in set." An empty bloom filter is a bit array of m bits all set to 0. One or more coding functions (e.g., k coding functions) are defined and used to map or code a set element to one of the m array positions. For example, to add a set element to the bloom filter, each of the k coding functions are used to identify k array positions. The k identified array positions are set to 1. To query the bloom filter to test whether a test element is in the set, the test element is coded using each of the k coding functions to determine k array positions corresponding to the test element. If any of the k array positions corresponding to the test element are 0, the test element does not satisfy the bloom filter and test element is definitely not in the set. If all of the k array positions corresponding to the test element are in the set, then the test element satisfies the bloom filter and it is possible that the test element is a member of the set encoded to by the bloom filter.

In an example embodiment, the network apparatus initiates the bloom filter with a size m that is relatively small (e.g., the number of route segments in the route segment set or the number of elements in the set S) such that the probability of false positives is arbitrarily high. The bloom filter may then be tested to determine if a query of the bloom filter provides a false positive for any of the adjacent segments of the route. For example, the adjacent segments of the route may be determined, a map version agnostic identifier corresponding to each adjacent segment of the route may be determined, and a set T may be defined that consists of the map version agnostic identifiers corresponding to the adjacent segments of the route. As the set T consists of map version agnostic identifiers of adjacent segments and the set S consists of map version agnostic identifiers of route segments, there is no overlap in the membership of set T and set S (e.g., S∩T=0). The bloom filter may then be tested to see if, when coded using the one or more coding functions, any elements of the set T receive false positives for being elements of the set S. If a query of the bloom filter provides a false positive for any of the adjacent segments (e.g., a coded map version agnostic identifier from set T is found to possibly be a member of set S), a larger bloom filter may be generated based on coding the map version agnostic identifiers of each of the route segments using the k coding functions or a different set of coding functions to generate a bloom filter of m+1 bits. The testing process may be repeated until a query of the bloom filter does not return any false positives for the adjacent segments of the route.

The network apparatus may then provide a route response in response comprising the bloom filter such that the mobile apparatus receives the route response. In various embodiments, the mobile apparatus may then use the bloom filter and the mobile version of the digital map to decode the route. In an example embodiment, the mobile apparatus may use the bloom filter to assign cost values to one or more segments of the mobile version of the digital map. For example, if a first segment identified by a first map version agnostic identifier is found to possibly be a member of the set S (e.g., the coded first map version agnostic identifier satisfies the bloom filter), the cost value assigned to the first segment is a minimal cost value (e.g., zero and/or a smaller cost value than the cost value assigned to the segments that are found to not be members of the set S). If the first segment is found to definitely not be a member of the set S, (e.g., the coded first map version agnostic identifier does not satisfy the bloom filter), the first segment is assigned a cost value based on map information/data corresponding to the first segment (e.g., a length of the first segment, an expected traversal time for the first segment which may be determined based on current or historical traffic information/data, a traffic level indicator for the first segment, and/or the like). The mobile apparatus may then use the determined and/or assigned cost values to decode the route using a best-first algorithm (e.g., Dijkstra's algorithm and/or a modified version of Dijkstra's algorithm) or another cost minimization algorithm based on the mobile version of the digital map.

The mobile apparatus may then provide the route (e.g., via a user interface), control a vehicle such that the vehicle traverses the route, and/or use the route and/or other information/data provided in the route response to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

Thus, the route, while determined using the network version of the digital map may then be decoded using the mobile version of the digital map such that differences between the network version and the mobile version of the digital map may be tolerated. Additionally, the bandwidth used to provide the route response is minimized by encoding the route segment set defined by the route using the smallest bit array that does not provide any false positives for any of the adjacent segments of the route.

Various embodiments provide for the determining and encoding (e.g., by a network apparatus) route segment sets for shortest distance routes, shortest expected travel time routes, multiple way point routes, routes with additional traffic information/data, routes to points of interest (POIs) identified in a POI search, parking cruise routes, and/or the like. Various embodiments provide for the decoding and use (e.g., by a mobile apparatus) of shortest distance routes, shortest expected travel time routes, multiple way point routes, routes with additional traffic information/data, routes to POIs identified in a POI search, parking cruise routes, and/or the like.

FIG. 1 provides an illustration of an example system that can be used in conjunction with various embodiments of the present invention. As shown in FIG. 1, the system may include one or more network apparatuses 10, one or more mobile apparatuses 20, one or more networks 50, and/or the like. In various embodiments, a mobile apparatus 20 may be onboard a vehicle 5. In various embodiments, the mobile apparatus 20 may be an in vehicle navigation system, vehicle control system, a mobile computing device, a mobile data gathering platform, and/or the like. For example, a mobile apparatus 20 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the mobile apparatus 20 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, the mobile apparatus 20 is configured to autonomously drive a vehicle 5 may perform multiple functions that are similar to those performed by a mobile apparatus 20 configured to be an ADAS (e.g., lane keeping, lane change assistance, maintaining a lane, merging, etc.). In some embodiments, a mobile apparatus 20 may be onboard a personal vehicle, commercial vehicle, public transportation vehicle, fleet vehicle, and/or other vehicle. In various embodiments, the mobile apparatus 20 may be a smartphone, tablet, personal digital assistant (PDA), personal computer, desktop computer, laptop, and/or other mobile computing device. In an example embodiment, a mobile apparatus 20 is onboard a vehicle 5 and is used to perform one or more navigation functions corresponding to the vehicle 5 traversing at least a portion of a road network. In an example embodiment, the network apparatus 10 is a server, group of servers, distributed computing system, and/or other computing system. In an example embodiment, the network apparatus 10 is not located onboard a vehicle. For example, the network apparatus 10 may be in communication with one or more mobile apparatuses 20 and/or the like via one or more wired or wireless networks 50.

In an example embodiment, a network apparatus 10 may comprise components similar to those shown in the example network apparatus 10 diagrammed in FIG. 2A. In an example embodiment, the network apparatus 10 is configured to receive route requests generated and provided by one or more mobile apparatuses 20, determine a route based on the route request and possibly additional information/data (e.g., traffic information/data along the route or along segments near the route (e.g., adjacent segments and/or the like), POI information/data, and/or the like), encode the route segment set defined by the route using a bloom filter, and provide a route response including the bloom filter such that the mobile apparatus 20 receives the route response, and/or the like. For example, as shown in FIG. 2A, the network apparatus 10 may comprise a processor 12, memory 14, a user interface 18, a communications interface 16, and/or other components configured to perform various operations, procedures, functions or the like described herein. In various embodiments, the network apparatus 10 stores a network version of a digital map (e.g., in memory 14). In at least some example embodiments, the memory 14 is non-transitory.

In an example embodiment, a mobile apparatus 20 is a mobile computing entity. For example, in various embodiments, a mobile apparatus 20 is onboard a vehicle 5. In an example embodiment, the mobile apparatus 20 may be configured to determine a current location of the mobile apparatus and/or receive user input indicating an origin of a route, receive user input indicating a destination of a route and/or predict a destination, generate and provide a route request, receive a route response, generate a decode route based on a route segment set encoded by a bloom filter and provided as part of the route request, and provide the decoded route to a user and/or to use the decoded route to control the vehicle to traverse the decoded route from the origin to the destination. In an example embodiment, the mobile apparatus 20 is configured to determine location information/data indicating a location (e.g., geolocation such as latitude and longitude and/or the like) of the vehicle 5 and/or mobile apparatus 20.

In an example embodiment, as shown in FIG. 2B, the mobile apparatus 20 may comprise a processor 22, memory 24, a communications interface 26, a user interface 28, one or more sensors 29 (e.g., a location sensor such as a GNSS sensor; IMU sensors; camera(s); image sensors; two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the mobile apparatus 20 to determine the location of the mobile apparatus 20 and/or one or more features of the corresponding vehicle's 5 surroundings and/or monitor the vehicle's 5 operating parameters), and/or other components configured to perform various operations, procedures, functions or the like described herein. In various embodiments, the mobile apparatus 20 stores a mobile version of a digital map (e.g., in memory 24). In at least some example embodiments, the memory 24 is non-transitory.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a mobile apparatus 20 may be in communication with a network apparatus 10 via the network 50. For example, a mobile apparatus 20 may communicate with the network apparatus 10 via a network, such as the Cloud. For example, the Cloud may be a computer network that provides shared computer processing resources and data to computers and other devices connected thereto. For example, the mobile apparatus 20 may be configured to provide one or more route requests via the network 50. For example, the network apparatus 10 may configured to receive one or more route requests and provide corresponding route responses via the network 50. For example, a mobile apparatus 20 may be configured to receive a route response via the network 50.

Certain example embodiments of the network apparatus 10 and/or probe apparatus 20 are described in more detail below with respect to FIGS. 2A and 2B.

II. Example Operation

Methods, apparatus, and computer program products are provided in accordance with various embodiments in order to provide a route segment set encoded in a map version agnostic manner, provide (e.g., transmit) an encoded route segment set in a bandwidth efficient manner, and to generate a decoded route and use the decoded route, wherein the decoded route was generated based on a route segment set that was encoded in a map version agnostic manner. For example, a mobile apparatus may store a mobile version of a digital map and a network apparatus may store a network version of a digital map. The mobile version and the network version of the digital map may be the same version or different versions of the digital map. Thus, the route must be provided in a manner that, if the network version is a different version of the digital map than the mobile version, the mobile apparatus can still decode and use the route. Segment identifiers that identify segments (e.g., traversable map elements (TMEs)) of the digital map may change between different versions of the map. Thus, providing the route simply as a list of segment identifiers (or an encoded set of segment identifiers) determined based on the network version of the digital map may result in problems when the mobile apparatus attempts to decode the route using the mobile version of the digital map. Moreover, the network 50 may be a bandwidth limited network and/or the mobile apparatus 20 may have limited connectivity to the network 50 as the mobile apparatus 20 moves around. Thus, the size of the payload of the route response may be minimized and/or maintained at a reasonable size, in various embodiments.

Various embodiments provide for encoding a route segment set using map version agnostic identifiers configured to identify the route segments of the route segment set defined by the route, such that the encoded route segment set may be transmitted as a bit array. In various embodiments, the encoding may be performed such that the resulting bloom filter is the smallest bloom filter that is satisfied by route segments of the route segment set being encoded (e.g., the members of the bloom filter are coded map version agnostic identifiers of the segments of the route determined in response to the route request) and that is not satisfied by adjacent segments of the route (e.g., coded map version agnostic identifiers of adjacent segments are not members of the bloom filter and therefore are not members of the route segment set). Various embodiments provide for the determining and encoding (e.g., by a network apparatus) route segment sets for shortest distance routes, shortest expected travel time routes, multiple way point routes, routes with additional traffic information/data, routes to points of interest (POIs) identified in a POI search, parking cruise routes, and/or the like. Various embodiments provide for the decoding and use (e.g., by a mobile apparatus) route segments sets for shortest distance routes, shortest expected travel time routes, multiple way point routes, routes with additional traffic information/data, routes to POIs identified in a POI search, parking cruise routes, and/or the like.

A. Shortest Distance and Shortest Expected Travel Time Routes

In various embodiments, a shortest distance route, a shortest expected travel time route, or various other types of routes (e.g., a toll avoided route, highway avoided route, and/or the like) may be generated. For example, a mobile apparatus 20 may generate (e.g., possibly based on user input received via the user interface 28) and provide a route request for a shortest distance route or shortest expected travel time route from a starting location to a target location. The network apparatus 10 may receive the route request, determine a route based on the route request, encode a route segment set defined by the route using a bloom filter and map version agnostic identifiers configured to identify the route segments of the route, and provide a route response comprising the bloom filter encoding the route segment set corresponding to the route. The mobile apparatus 20 may receive the route response comprising the bloom filter, generate a decoded route based on the bloom filter, and provide the decoded route and/or control a vehicle 5 such that the vehicle traverses the decoded route.

i. Exemplary Operation of a Network Apparatus

FIG. 3 provides a flowchart illustrating operations performed, such as by the network apparatus 10 to provide a route response, in accordance with an example embodiment. Starting at block 302, a route request is received. For example, the network apparatus 10 may receive a route request. For example, the network apparatus 10 may comprise means, such as processor 12, memory 14, communications interface 16, and/or the like for receiving a route request. In various embodiments, the route request may comprise a mobile apparatus identifier identifying the mobile apparatus that provided the route request, map version agnostic information/data identifying a starting location, map version agnostic information/data identifying a target location, one or more parameters for the route (e.g., shortest distance, shortest expected travel time, avoid tolls, avoid highways, driving route, biking route, walking route, and/or the like), and/or the like. In various embodiments, the information/data identifying the starting location and the target location are independent of a version of the digital map. In an example embodiment, the information/data identifying the starting location is provided as the midpoint and z-level of a mobile version segment corresponding to the current location/position of the mobile apparatus and/or a user provided origin for the route. The midpoint of a segment is the coordinate pair (e.g., latitude and longitude) of the point that is approximately halfway down the segment, where the ends of the road segment are defined by intersections or nodes. For example, the midpoint of a segment is a point in the middle of the segment between the two intersections that define the ends of the segment. The z-level of a segment describes the relative location of roads that are stacked. For most segments, the z-level is 0 (e.g., unstacked and/or on ground level); however, for tunnels the z-level might be negative and for stacked roads/bridges z-level might be positive. For example, the information/data identifying the target location for the route may be provided as the midpoint and z-level of a mobile version segment corresponding to a user provided and/or selected destination of the route and/or a predicted destination of the route.

At block 304, the start segment and target segment of the network version of the digital map are identified. For example, the network apparatus 10 may identify the start segment and the target segment of the network version of the digital map. For example, the network apparatus 10 may comprise means, such as processor 12, memory 14, and/or the like for identifying the start segment and identifying the target segment of the network version of the digital map. For example, the information/data identifying the starting location may be map-matched (e.g., using a map matching algorithm, engine, and/or the like) based on the network version of the digital map to identify the starting segment of the network version of the digital map. For example, the information/data identifying the target location may be map-matched (e.g., using a map matching algorithm, engine, and/or the like) based on the network version of the digital map to identify the target segment of the network version of the digital map. In various embodiments, the information/data identifying the starting segment and/or target segment may be map-matched to the network version of the digital map such that an error up to a preset error in the matching of the midpoint corresponding to the starting/target location to the midpoint of the corresponding segment of the network version of the digital map. The starting segment of the network version of the digital map is also referred to as the network version starting segment herein. Similarly, the target segment of the network version of the digital map is also referred to as the network version target segment herein. The z-level corresponding to the starting location and/or the target location may be used for tie breaking in the case where the starting location and/or target location corresponds to a tunnel, bridge, stacked roads, and/or the like. If the network apparatus cannot exactly match (e.g., within the preset error) a start segment and/or target segment of the network version of the digital map to the information/data identifying the start and/or target location, the route response may include a flag indicating such.

At block 306, a route is determined from the starting segment to the target segment. For example, the network apparatus 10 may determine a navigable route from the starting segment to the target segment using the network version of the digital map. For example, the network apparatus 10 may comprise means, such as processor 12, memory 14, and/or the like for determining a navigable route from the starting segment to the target segment using the network version of the digital map. A variety of route determining algorithms may be used in various embodiments. In various embodiments, a route determining algorithm that uses cost values is used to determine the route. For example, a best-first algorithm may be used to determine a route from the starting segment to the target segment. For example, a modified Dijkstra's algorithm may be used to determine the route from the starting segment to the target segment. In an example embodiment, the route may be designated as an ordered list or set of route segments. For example, to determine the route, an ordered list or set of route segments (and/or segment identifiers of the network version of the digital map identifying the route segments) may be generated. The route segments of the ordered list or set of route segments define a route segment set (e.g., a set including only the route segments of the route but that may not include the order information/data of the ordered list or set of route segments).

In an example embodiment, the cost value assigned to a segment may be the length of the segment, the expected time to traverse the segment, a traffic level indicator, and/or the like. For example, if the route request indicated a parameter corresponding to a shortest distance route, the cost value assigned to each segment is the length of the segment. In an example embodiment, the length of a segment is determined based on a segment record stored in a geographic database storing the map information/data of the network version of the digital map. In another example, if the route request indicated a parameter corresponding to a shortest expected travel time route, the cost value assigned to each segment is the expected traversal time of the segment. In an example embodiment, the expected traversal time of a segment is determined based on a length of the segment and an expected travel speed along the segment. In an example embodiment, the length of the segment is determined based on a segment record stored in a geographic database storing the map information/data of the network version of the digital map. In an example embodiment, the expected travel speed along the segment is determined based on current traffic information/data and/or historical traffic information/data corresponding to the segment. In an example embodiment, the current traffic information/data may be determined based on probe information/data corresponding to the segment and/or a traffic report provided by a traffic management office. In an example embodiment, the historical traffic information/data may be stored in association with an epoch or time period of a day, week, month, year, and/or the like in the segment record corresponding to the segment and stored in the geographic database storing the map information/data of the network version of the digital map. In still another example, the cost value assigned to each segment may be a traffic level indicator determined based on current and/or historical traffic information/data. For example, the cost value assigned to a segment could be the inverse of the free flow ratio for the segment based on current and/or historical traffic information/data. In an example embodiment, the free flow ratio along a segment is the ratio of a travel speed along the segment (e.g., as determined based on current and/or historical traffic information/data) divided by a free flow speed for the segment.

At block 308, a bloom filter encoding the route segment set defined by the route from the starting segment to the target segment is produced. For example, the network apparatus 10 may produce a bloom filter encoding the route segment set defined by the route from the starting segment to the target segment. For example, the network apparatus 10 may comprise means, such as processor 12, memory 14, and/or the like, for producing a bloom filter encoding the route segment set defined by the route from the starting segment to the target segment. For example, map information/data corresponding to the route segments may be accessed from the geographic database. One or more map version agnostic elements of the map information/data corresponding to a route segment may be used to generate a map version agnostic identifier for the route segment. In various embodiments, the one or more map version agnostic elements of the map information/data and the order in which map version agnostic elements are combined to generate the map version agnostic identifier is pre-established and/or defined. For example, the mobile apparatus 20 and the network apparatus 10 are both configured to generate map version agnostic identifiers in the same pre-established and/or defined way (e.g., using the same elements of map information/data combined in the same order). For example, the map version agnostic identifier may be generated using a map version agnostic identifier algorithm and the mobile apparatus 20 and the network apparatus 10 may use the same map version agnostic identifier algorithm. The set of the map version agnostic identifiers identifying the route segments of the route segment set in a map version agnostic manner are then coded using one or more coding functions and added to a bloom filter. In an example embodiment, the one or more coding functions include one or more hashing functions. For example, the one or more coding functions may include a deterministic hashing function such as a secure hash algorithm (SHA), MD5 message-digest algorithm, and/or the like. Thus, a bloom filter may be produced that encodes the map version agnostic identifiers of each of the route segments of the route.

At block 310, a route response is generated and provided such that the mobile apparatus 20 receives the route response. For example, the network apparatus 10 may generate and provide a route response such that the mobile apparatus 20 receives the route response. For example, the network apparatus 10 may comprise means, such as processor 12, memory 14, communication interface 16, and/or the like for generating and providing (e.g., transmitting) a route response such that the mobile apparatus 20 receives the route response. In various embodiments, the route response comprises the bloom filter (e.g., as a bit array). In an example embodiment, the route response comprises information/data identifying a network version starting location and information/data identifying a network version target location. In various embodiments, the information/data identifying the network version starting location and network version target location is map version agnostic. For example, in an example embodiment, the information/data identifying the network version starting location is the midpoint of (or other point along) the network version starting segment and the z-level of the network version starting segment, and the information/data identifying the network version target segment is the midpoint of (or other point along) the network version target segment and the z-level of the network version target segment. In an example embodiment, generating the route response includes determining a length of the route. For example, the length of each route segment may be summed to determine a length of the route. The length of the route may then be included in the route response, in an example embodiment.

ii. Producing a Bloom Filter Encoding a Route

As noted above, the network apparatus 10 produces a bloom filter encoding the route segment set defined by the route and provides the bloom filter such that the mobile apparatus 20 receives the bloom filter for use in decoding the route (e.g., determining or generating a decoded route). FIG. 4 provides a flowchart illustrating operations performed, such as by the network apparatus 10 to produce a bloom filter, in accordance with an example embodiment.

Starting at block 402, after a route comprising one or more route segments is determined from the starting segment to the target segment (e.g., a route segment set is defined), map version agnostic information/data for each of the route segments is accessed. For example, the network apparatus 10 may access map version agnostic information/data for each of the route segments. For example, the network apparatus 10 may comprise means, such as processor 12, memory 14, and/or the like for accessing map version agnostic information/data for each of the route segments. For example, the network apparatus 10 may store (e.g., in memory 14) a geographic database storing the map information/data of the network version of the digital map. A segment record corresponding to a route segment may be accessed and map version agnostic information/data may be extracted therefrom. In an example embodiment, elements of the segment record to be accessed are pre-established and/or defined. For example, the map version agnostic identifier may be generated using a map version agnostic identifier algorithm and the mobile apparatus 20 and the network apparatus 10 may use the same map version agnostic identifier algorithm. For example, the map version agnostic map information/data accessed may include a road name, segment length, a direction of travel of a segment, a functional class of a segment, speed limit, segment midpoint, and/or the like, in various embodiments.

At block 404, a set S of map version agnostic route segment identifiers are generated for each route segment of the route segment set. For example, the network apparatus 10 may generate a set S of map version agnostic route segment identifiers. For example, the network apparatus 10 may comprise means, such as the processor 12, memory 14, and/or the like, for generating a set S of map version agnostic route segment identifiers. For example, the accessed map version agnostic information/data corresponding to a route segment may be combined in a pre-established and/or defined manner to generate a map version agnostic identifier configured to identify the route segment. For example, a map version agnostic identifier for each route segment of the route segment set (e.g. each route segment of the route) may be generated and added to the set S of map version agnostic route segment identifiers. For example, in an example embodiment, the map version agnostic identifier may be a text string generated by concatenating a functional class indicator and a travel direction to a road name.

At block 406, the elements of the set S of map version agnostic route segment identifiers (e.g., the map version agnostic identifier for each route segment) are coded using one or more coding functions and added to the bloom filter. For example, the network apparatus 10 may code the elements of the set S of map version agnostic route segment identifiers using one or more coding functions and adding the coded version(s) of the elements of the set S to the bloom filter. For example, the network apparatus 10 may comprise means, such as processor 12, memory 14, and/or the like, for coding each of the elements of the set S of map version agnostic route segment identifiers using one or more coding functions and adding the coded version(s) of the elements of the set S to the bloom filter. For example, each coding function may receive a map version agnostic identifier as input and provide as output a coded version of the map version agnostic identifier. In various embodiments, the coded version of the map version agnostic identifier is an index value corresponding to an index of the bloom filter. In an example embodiment, the bloom filter is initiated as a bit array of size m with all m bits of the bit array set to zero. In various embodiments, m is a positive integer. In an example embodiment, the bloom filter is initiated with a size that is relatively small (e.g., m equal to the number of route segments in the route segment set and/or the number of elements in the set S) such that the probability of false positives is arbitrarily high. The coded version of the map version agnostic identifier is added to the bloom filter by setting a bit of the bit array of the bloom filter corresponding to the index value equal to 1. Each map version agnostic identifier of the set S is coded with k coding functions and the corresponding k coded versions of the map version agnostic identifier are added to the bloom filter. In various embodiments, k is a positive integer.

At block 408, the adjacent segments of the route are identified and map version agnostic information/data corresponding to each of the adjacent segments of the route is accessed. In various embodiments, an adjacent segment is a segment that intersects a route but that is not part of the route. For example, an adjacent segment is directly connected to a route segment, but is not a route segment (e.g., is associated with a same intersection or node as a route segment but is not a member of the route segment set). For example, FIG. 6B shows a route in bold line that comprises route segments A, B, D, Z, and L and having adjacent segments C, E, J, K, and M. For example, each adjacent segment shares a defining node or intersection 606 with a route segment, but is not itself a route segment. For example, the network apparatus 10 may identify the adjacent segments of the route and access map version agnostic information/data for each of the adjacent segments. For example, the network apparatus 10 may comprise means, such as processor 12, memory 14, and/or the like for identifying the adjacent segments of a route and accessing map version agnostic information/data for each of the adjacent segments.

For example, the network apparatus 10 may store (e.g., in memory 14) a geographic database storing the map information/data of the network version of the digital map. A segment record corresponding to an adjacent segment may be accessed and map version agnostic information/data may be extracted therefrom. In an example embodiment, elements of the adjacent record to be accessed are pre-established and/or defined and are the same elements that were accessed for the route segments. For example, the map version agnostic map information/data accessed may include a road name, segment length, a direction of travel of a segment, a functional class of a segment, speed limit, segment midpoint, and/or the like, in various embodiments.

At block 410, a set T of map version agnostic adjacent segment identifiers are generated. For example, the network apparatus 10 may generate a set T of map version agnostic adjacent segment identifiers. For example, the network apparatus 10 may comprise means, such as the processor 12, memory 14, and/or the like, for generating a set T of map version agnostic adjacent segment identifiers. For example, the accessed map version agnostic information/data corresponding to an adjacent segment may be combined in a pre-established and/or defined manner to generate a map version agnostic identifier configured to identify the adjacent segment. For example, a map version agnostic identifier for each adjacent segment of the route may be generated and added to the set T of map version agnostic adjacent segment identifiers. For example, in an example embodiment, the map version agnostic identifier may be a text string generated by concatenating a functional class indicator and a travel direction to a road name. In various embodiments, the map version agnostic identifiers for the adjacent segments are generated using the same combination of elements of map version agnostic map information/data as the map version agnostic identifiers for the route segments.

At block 412, it is determined if any of the elements of T satisfy the bloom filter. For example, the network apparatus 10 may determine if any of the elements of T satisfy the bloom filter. For example, the network apparatus 10 may comprise means, such as processor 12, memory 14, and/or the like for determining if any of the elements of T satisfy the bloom filter. For example, each element of the set T of map version agnostic adjacent segment identifiers may be coded with the k coding functions to generate k coded versions of each map version agnostic identifier for each adjacent segment. It may be determined whether, for any of the map version agnostic identifiers of the set T, all k of the coded versions of the map version agnostic identifier are present in the bloom filter. For example, it may be determined whether all k of the indexes of the bloom filter corresponding to the k coded versions of the map version agnostic identifier of any of the adjacent segments of the route correspond to the value of 1 in the bit array of the bloom filter.

When it is determined that none of the elements of T satisfy the bloom filter, the process continues to block 414. For example, when the bloom filter does not provide a false positive for any of the adjacent segments (e.g., indicating that none of the adjacent segment are part of the route), the process continues to block 414. At block 414, the produced bloom filter is provided such that the route response comprising the bloom filter may be generated. For example, the network apparatus 10 may provide the bloom filter such that the route response comprising the bloom filter may be generated. For example, the network apparatus 10 may comprise means, such as processor 12, memory 14, and/or the like for providing the bloom filter such that the route response comprising the bloom filter may be generated. For example, a bloom filter producing module operating on and/or being executed by the network apparatus 10 may produce the bloom filter and then, at block 414, provide the bloom filter to a route response generation module operating on and/or being executed by the network apparatus 10.

When it is determined that at least one element of T satisfies the bloom filter, the process continues to block 416. For example, when the bloom filter provides a false positive for at least one of the adjacent segments (e.g., indicating that the at least one adjacent segment may be part of the route), the process continues to block 416. At block 416, a larger bloom filter is generated. For example, the bloom filter at block 406 may be of size m (e.g., be a bit array of m bits). At block 416, a bloom filter of size m+n (e.g., a bit array of m+n bits) may be generated. As used herein, n is a positive integer. In an example embodiment, n is 1, such that the minimum sized bloom filter that does not provide a false positive for any of the adjacent segments of the route is generated. For example, using j coding functions, the elements of the set S of map version agnostic route segment identifiers (e.g., the map version agnostic identifier for each route segment) are coded using one or more encoding functions and added to the larger bloom filter. As used herein, j is a positive integer. The set of j coding functions may be the same set or a different set of coding functions as the k coding functions used to generate the original bloom filter. For example, the network apparatus 10 may generate a larger bloom filter based on the coded elements of the set S using the j coding functions. For example, the network apparatus 10 may comprise means, such as processor 12, memory 14, and/or the like, for generating a larger bloom filter based on the coded elements of the S using the j coding functions.

As should be understood, once the bloom filter of size m+n is generated, the process returns to block 412 to determine if any of the elements of set T of the map version agnostic adjacent segment identifiers satisfy the bloom filter. For example, it is determined if the bloom filter indicates that any of the adjacent segments may be part of the route. Responsive to determining that the (larger) bloom filter does not indicate that any of the adjacent segments may be part of the route, the process will then continue to block 414 and the produced bloom filter will be provided. Responsive to determining that the (larger) bloom filter does indicate that at least one of the adjacent segments may be part of the route, the process returns to block 416 and a larger bloom filter is generated. For example, a bloom filter of size m+n+p, where p is a positive integer, may be generated. In an example embodiment, p is 1. The process continues until the produced bloom filter indicates that none of the adjacent segments are part of the route (e.g., none of the elements of set T satisfy the bloom filter) and the produced bloom filter is provided at block 414.

iii. Exemplary Operation of a Mobile Apparatus

In various embodiments, a mobile apparatus 20 provides (e.g., transmits) a route request. A network apparatus 10 receives the route request, generates a route, encodes a route segment set defined by the route, and provides a route response. The mobile apparatus 20 receives the route response and then generates a decoded route based on a bloom filter provided by the route response. The mobile apparatus 20 may then use the decoded route to perform one or more navigation functions. Some non-limiting examples of navigation functions include providing a route (e.g., via a user interface), localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

FIG. 5 provides a flowchart illustrating operations performed, such as by the mobile apparatus 20 to request, receive, and decode a route segment set encoded by a bloom filter, in accordance with an example embodiment. Starting at block 502, a route request is generated and provided such that the network apparatus 10 receives the route request. For example, the mobile apparatus 20 may generate and provide (e.g., transmit) a route request. For example, the mobile apparatus 20 may comprise means, such as processor 22, memory 24, communications interface 26, user interface 28, location sensor 29, and/or the like, for generating and providing a route request.

In various embodiments, the route request may comprise a mobile apparatus identifier identifying the mobile apparatus 20 that generated and provided the route request, map version agnostic information/data identifying a starting location, map version agnostic information/data identifying a target location, one or more parameters for the route (e.g., shortest distance, shortest expected travel time, avoid tolls, avoid highways, driving route, biking route, walking route, and/or the like), and/or the like. In various embodiments, the information/data identifying the starting location and the target location are independent of a version of the digital map.

For example, a user may interact with the user interface 28 and request a route. For example, the user may, operate the user interface 28 to indicate an origin of the route, a destination of the route, and/or one or more parameters for the route (e.g., shortest distance, shortest expected travel time, avoid tolls, avoid highway, driving route, biking route, walking route, and/or the like). The user may then operate the user interface 28 to submit the user provided and/or selected information/data and to initiate the generation of the route request. In an example embodiment, the origin of the route is the current location of the mobile apparatus 20 as determined by on one or more location sensors 29 of the mobile apparatus. In another example, a mobile apparatus 20 may determine that the mobile apparatus 20 is moving and/or that a trip is expected to begin (e.g., based on historical information/data corresponding to the user and/or the mobile apparatus 20). The mobile apparatus 20 may determine a current location of the mobile apparatus (e.g., via the location sensor(s) 29) and determine a predicted destination of the route (based on past trips, information/data stored in a digital calendar corresponding to a user of the mobile apparatus 20, based on planned trips, and/or the like). The mobile apparatus 20 may then automatically initiate the generation of a route request.

As noted above, the mobile apparatus 20 may receive (e.g., via user interface 28 and/or from location sensor 29) an origin of the route. The mobile apparatus 20 may then map match the origin of the route to a segment of the mobile version of the digital map. This mobile version starting segment (e.g., a segment of a mobile version of the digital map to which the origin has been map-matched) is used to determine the map version agnostic information/data identifying the starting location. In an example embodiment, the information/data identifying the starting location is provided as the midpoint and z-level of the mobile version starting segment. The midpoint of a segment is the coordinate pair (e.g., latitude and longitude) of the point that is approximately halfway down the segment, where the ends of the road segment are defined by intersections or nodes. For example, the midpoint of a segment is a point in the middle of the segment between the two intersections that define the ends of the segment. The z-level of a segment describes the relative location of roads that are stacked. For most segments, the z-level is 0 (e.g., unstacked and/or on ground level); however, for tunnels the z-level might be negative and for stacked roads/bridges z-level might be positive. The mobile apparatus may further map match the destination for the route to a segment of the mobile version of the digital map. This mobile version target segment (e.g., a segment of the mobile version of the digital map to which the destination has been map-matched) is used to determine the map version agnostic information/data identifying the target location. For example, the information/data identifying the target location for the route may be provided as the midpoint and z-level of a mobile version target segment.

At block 504, a route response is received. For example, the network apparatus 10 may generate and provide a route response, in response to the route request, and provide the route response such that the mobile apparatus 20 receives the route response. For example, the mobile apparatus 20 may receive the route response. For example, the mobile apparatus 20 may comprise means, such as processor 22, memory 24, communications interface 26, and/or the like for receiving the route response. In various embodiments, the route response comprises the bloom filter (e.g., as a bit array). In an example embodiment, the route response comprises information/data identifying a network version starting location and information/data identifying a network version target location. In various embodiments, the information/data identifying the network version starting location and network version target location is map version agnostic. For example, in an example embodiment, the information/data identifying the network version starting location is the midpoint of (or other point along) the network version starting segment and the z-level of the network version starting segment, and the information/data identifying the network version target segment is the midpoint of (or other point along) the network version target segment and the z-level of the network version target segment. In an example embodiment, the route response includes a route length indicating the length (e.g., in miles, kilometers, feet, meters, and/or the like) for the encoded route segment set defined by the route.

At block 506, a decoded starting segment and decoded target segment are identified. For example, the mobile apparatus 20 may identify and/or determine a decoded starting segment and a decoded target segment using the mobile version of the digital map. For example, the mobile apparatus 20 may comprise means, such as processor 22, memory 24, and/or the like, for identifying and/or determining a decoded starting segment and a decoded target segment using the mobile version of the digital map. For example, the map version agnostic information/data identifying the network version starting location may be map-matched using the mobile version of the digital map to identify a decoded starting segment corresponding to the network version starting location. Similarly, the map version agnostic information/data identifying the network version target location may be map-matched using the mobile version of the digital map to identify a decoded target location corresponding to the network version target location.

At block 508, map information/data from the mobile version of the digital map for assigning cost values to segments of the mobile version of the digital map is accessed. For example, the mobile apparatus 20 may access map information/data from a geographic database storing map information/data of the mobile version of the digital map from memory 24.

In various embodiments, the cost value assigned to a segment is determined based on whether the segment satisfies the bloom filter. For example, if a coded map version agnostic identifier corresponding to a first segment satisfies the bloom filter, the first segment is assigned a minimal cost value. For example, the first segment may be assigned a cost value of zero. However, if the coded map version agnostic identifier corresponding to the first segment does not satisfy the bloom filter, the first segment is assigned a positive cost value (e.g., based on the length of the segment, expected time of traversal for the segment, a current or expected traffic level for the segment, and/or the like). Thus, accessing map information/data for use in assigning cost values to segments further includes accessing map information/data from the mobile version of the digital map that may be used for determining if a segment satisfies the bloom filter. For example, a segment record corresponding to a segment may be accessed and map version agnostic information/data may be extracted therefrom. In an example embodiment, elements of the segment record to be accessed for generating a map version agnostic identifier for the segment are pre-established and/or defined. In particular, the elements of the segment record to be accessed for use in generating a map version agnostic identifier are the same elements of the network version of the digital map used by the network apparatus to generate the map version agnostic identifiers that were coded to produce the bloom filter. For example, the map version agnostic identifier may be generated using a map version agnostic identifier algorithm and the mobile apparatus 20 and the network apparatus 10 may use the same map version agnostic identifier algorithm. For example, the map version agnostic map information/data accessed may include a road name, segment length, a direction of travel of a segment, a functional class of a segment, speed limit, segment midpoint, and/or the like, in various embodiments.

The map version agnostic map information/data corresponding to a segment may then be used to generate a map version agnostic identifier for the segment. For example, the accessed map version agnostic information/data corresponding to a segment may be combined in a pre-established and/or defined manner (e.g., in the same manner as the generation of the map version agnostic identifiers where generated by the network apparatus 10) to generate a map version agnostic identifier configured to identify the segment. The map version agnostic identifier may then be used to determine if the corresponding segment satisfies the bloom filter. If the segment satisfies the bloom filter, the segment is assigned a minimal (e.g., zero) cost value. If the segment does not satisfy the bloom filter, the segment may be assigned a cost value based on map information/data. For example, the accessed map information/data may include map information/data that may be used to assign a cost value to a segment of the mobile version of the digital map. In an example embodiment, the cost value assigned to a segment may be the length of the segment, the expected time to traverse the segment, a traffic level indicator, and/or the like, as described above.

In an example embodiment, block 508 may be performed concurrently with block 510 such that the map information/data for assigning a cost value to a first segment is accessed when a route determining algorithm is expanded to the first segment. For example, map information/data for assigning a cost value to a first segment may be accessed and the cost value assigned to the first segment based thereon, in response to a route determining algorithm considering whether the first segment is part of the decoded route.

At block 510, a decoded route is determined by identifying the lowest cost route from the decoded starting segment to the decoded target segment is determined. For example, the mobile apparatus 20 may determine a decoded route by determining the lowest cost route from the decoded starting segment to the decoded target segment. For example, the mobile apparatus 20 may comprise means, such as processor 22, memory 24, and/or the like, for determining a decoded route by determining the lowest cost route from the decoded starting segment to the decoded target segment. For example, the lowest cost route may be determined based on the cost value assigned to segments between the decoded starting segment and the decoded target segment. In various embodiments, a best-first algorithm may be used to determine the decoded route. In an example embodiment, a version of Dijkstra's algorithm or another cost minimization algorithm may be used to determine the decoded route.

FIG. 6A illustrates a route 600 from network version starting segment 602 to network version target segment 604. The route segments of the route 600 are separated by intersections and/or nodes 606. FIG. 6B illustrates a portion of the road network 650 as represented by the mobile version of the digital map with the corresponding cost values indicated. The route 600 is included as bold lines between the decoded starting segment 652 and the decoded target segment 654. Segment Z is shown as a dashed line without an assigned cost value as segment Z is not present in the mobile version of the digital map (e.g., the mobile version of the digital map does not comprise a segment record corresponding to segment Z). The segments are separated by intersections and/or nodes 656 of the mobile version of the digital map. As can be seen from FIGS. 6A and 6B, the segments of the mobile version of the digital map that satisfy the bloom filter are assigned a minimal (e.g., zero) cost value. In the illustrated embodiment, the segments of the mobile version of the digital map that do not satisfy the bloom filter are assigned a cost value that is equal to the length of the segment. The segments of the mobile version of the digital map that correspond to the adjacent segments of the route (according to the network version of the digital map) do not satisfy the bloom filter and are therefore assigned positive cost values. As should be understood, the cost value assigned to a segment will always be zero or larger (i.e., not negative). Therefore, any algorithm used to determine the lowest cost route will be biased toward selecting the segments of the mobile version of the digital map that correspond to the route segments of the network version of the digital map. For example, for the route illustrated in FIGS. 6A and 6B, the lowest cost route from the decoded starting segment 652 to the decoded target segment 654 includes segment A, segment B, segment D, segment J, segment K, and segment L having a total cost of 30 m. If the mobile version of the digital map included segment Z, the lowest cost route from the decoded starting segment 652 to the decoded target segment 654 includes segment A, segment B, segment D, segment Z, and segment L having a total cost of 0. However, the route including segment A, segment B, segment E, segment N, segment M, and segment L would not be selected as the decoded route as it is not the lowest cost route from the decoded starting segment 652 to the decoded target segment 654. Thus, various embodiments provide for the determination of a decoded route using a map version that is different from the map version used to encode the route segment set defined by the route that allows for automatic and efficient self-healing of the route for disparities between the map version used encode the route segment set and the map version used to generate the decoded route.

Continuing with FIG. 5, at block 512, it is determined if the decoded route satisfies one or more quality measures. In an example embodiment, the one or more quality measures comprise the length of the decoded route being similar to the route length provided as part of the route response. For example, a decoded route length may be determined and compared to the route length provided by the route response. In an example embodiment, the decoded route length is determined by summing the length of each segment in the decoded route based on the mobile version of the digital map. For example, it may be determined if the decoded route length and the route length satisfy a similarity threshold requirement. In an example embodiment, the ratio of the decoded route length and the route length may be compared to a similarity range to determine if the decoded route length and the route length satisfy a similarity threshold requirement. For example, if the ratio of the decoded route length to the route length is in within the similarity range, it may be determined that the decoded route is an acceptable route. If the ratio of the decoded route length to the route length is not within the similarity range, it may be determined that the decoded route is not an acceptable route. In various embodiments, the similarity range is a predetermined range. In some example embodiments, the similarity range is 0.7 to 1.3, 0.75 to 1.25, 0.8 to 1.2, 0.85 to 1.15, 0.9 to 1.1, and/or 0.95 to 1.05. For example, the mobile apparatus 20 may determine if the decoded route length and the route length satisfy a similarity threshold requirement. For example, the mobile apparatus 20 may comprise means, such as processor 22, memory 24, and/or the like, for determining if the decoded route length and the route length satisfy the similarity threshold requirement.

In an example embodiment, the one or more quality measures may include determining whether the number of elements in the bloom filter that the mobile apparatus 20 cannot resolve satisfies a quality threshold requirement. For example, as shown in FIGS. 6A and 6B, the route 600 generated by the network apparatus 10 may comprise segment Z. However, segment Z is not present in the mobile version of the digital map (e.g., the mobile version of the digital map does not comprise a segment record corresponding to segment Z). Thus, the mobile apparatus 20 cannot resolve segment Z from the bloom filter. In an example embodiment, the mobile apparatus 20 may determine that an unresolved element of the bloom filter exists because, for the example of route 600, segment D is not the decoded target segment for the decoded route 650, but a segment that leaves segment D and that satisfies the bloom filter cannot be identified based on the mobile version of the digital map. As routes must be continuous, there must be a segment of the network version of the digital map leaves segment D (e.g., is also associated with intersection 680) that does satisfy the bloom filter. However this segment is not a part of the mobile version of the digital map, in the illustrated scenario and therefore is identified as an element of the bloom filter that cannot be resolved by the mobile apparatus 20. When the number of elements of the bloom filter that cannot be resolved by the mobile apparatus 20 fails to satisfy a quality threshold requirement (e.g., exceeds a quality threshold number), it may be determined that the decoded route fails to satisfy a quality measure.

When it is determined that the decoded route satisfies the one or more quality measures (e.g., the decoded route length and the route length satisfy the similarity threshold requirement), the process continues to block 514 and the route is accepted. For example, the mobile apparatus 20 may accept the route and use the route to complete one or more navigation functions. For example, the mobile apparatus 20 may comprise means, such as processor 22, memory 24, communications interface 26, user interface 28, sensors 29, and/or the like, for (responsive to determining that the decoded route satisfies the one or more quality measures) accepting the decoded route and using the decoded route to perform one or more navigation functions. Some non-limiting examples of navigation functions include providing a route (e.g., via a user interface), localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like. In an example embodiment, as the mobile apparatus 20 traverses the decoded route, if it is determined that the mobile apparatus 20 is traversing a segment that is not part of the decoded route and/or does not satisfy the bloom filter, the mobile apparatus 20 may automatically request a new route from the network apparatus 10.

When it is determined that the decoded route does not satisfy at least one quality measure (e.g., the decoded route length and the route length do not satisfy the similarity threshold requirement), the process continues to block 516. At block 516, the route is rejected and a new route is requested. For example, the mobile apparatus 20 may rejected the route and request a new route. For example, the mobile apparatus 20 may comprise means, such as processor 22, memory 24, communications interface 26, and/or the like for (responsive to determining that the decoded route fails to satisfy at last one quality measure) rejecting the route and requesting a new route. In an example embodiment, the request for the new route may provide information/data that may be used by the network apparatus 10 to identify the elements of the bloom filter that could not be resolved by the mobile apparatus 20 such that the network apparatus 10 may avoid using the corresponding segments in a new route. For example, the information/data that may be used by the network apparatus 10 to identify the elements of the bloom filter that could not be resolved by the mobile apparatus 20 may include a map version agnostic identifier for the segment immediately preceding and/or immediately succeeding the unresolved element, information/data identifying a node and/or intersection corresponding to the unresolved element, and/or the like. For example, the mobile apparatus 20 may generate an updated and/or modified route request and provide (e.g., transmit) the updated and/or modified route request such that the network apparatus 10 receives the updated and/or modified route request. In response to the updated and/or modified route request, the network apparatus 10 may generate a new route, encode a route segment set defined by the same or the new route with a larger bloom filter (e.g., a bit array having more bits than the previously provided bloom filter) and/or the like. The network apparatus 10 may then provide an updated and/or modified route response comprising the route segment set defined by the new route encoded as a bloom filter, the route segment set defined by the previous route encoded with a larger bloom filter, and/or the like. The mobile apparatus 20 receives the updated and/or modified route response and determines an updated and/or modified decoded route. In an example embodiment, the mobile apparatus 20 determines if the updated and/or modified decoded route satisfies one or more quality measures to determine if the updated and/or modified decoded route is to be accepted or rejected and a new route is to be requested.

B. Multiple Stop Routes

In various embodiments, a multiple stop route may be requested. For example, a user may interact with a mobile apparatus 20 (e.g., via user interface 28) to provide a list of errands to be run, stops to be made and/or the like. The mobile apparatus 20 may generate and provide a multiple stop route request based on the user provided information. A network apparatus 10 may receive the multiple stop route request, determine an optimal tour of the multiple stops, determine a route for each leg of the multiple stop route, encode the route segment set defined by each leg of the multiple stop route using a bloom filter, and provide a multiple stop route response that includes the bloom filter for each leg of the multiple stop route. The mobile apparatus 20 may then determine a decoded route for each leg of the multiple stop route based on the corresponding bloom filter. FIG. 7 provides a flowchart illustrating operations performed, such as by the network apparatus 10 to provide a multiple stop route response, in accordance with an example embodiment and FIG. 8 provides a flowchart illustrating operations performed, such as by the mobile apparatus 20 to decode legs of a multiple stop route based on a received multiple stop route response, in accordance with an example embodiment.

i. Exemplary Operation of a Network Apparatus

Starting at block 702 of FIG. 7, a multiple stop route request is received. For example, the network apparatus 10 may receive a multiple stop route request. For example, the network apparatus 10 may comprise means, such as processor 12, memory 14, communications interface 16, and/or the like for receiving a multiple stop route request. In various embodiments, the multiple stop route request may comprise a mobile apparatus identifier identifying the mobile apparatus 20 that provided the multiple stop route request, map version agnostic information/data identifying a starting location, map version agnostic information/data identifying a target location, map version agnostic information/data identifying each stop location, one or more parameters for the route (e.g., shortest distance, shortest expected travel time, avoid tolls, avoid highways, driving route, biking route, walking route, and/or the like), and/or the like. In various embodiments, the information/data identifying the starting location, the target location, and each of the stop locations is independent of a version of the digital map. In an example embodiment, the information/data identifying the starting location is provided as the midpoint and z-level of a mobile version segment corresponding to the current location/position of the mobile apparatus and/or a user provided origin for the route. The midpoint of a segment is the coordinate pair (e.g., latitude and longitude) of the point that is approximately halfway down the segment, where the ends of the road segment are defined by intersections or nodes. For example, the midpoint of a segment is a point in the middle of the segment between the two intersections that define the ends of the segment. The z-level of a segment describes the relative location of roads that are stacked. For most segments, the z-level is 0 (e.g., unstacked and/or on ground level); however, for tunnels the z-level might be negative and for stacked roads/bridges z-level might be positive. For example, the information/data identifying the target location for the route may be provided as the midpoint and z-level of a mobile version segment corresponding to a user provided and/or selected destination of the route and/or a predicted destination of the route. In various embodiments, the information/data identifying the stop location(s) for the route may be provided as the midpoint and z-level of a mobile version segment corresponding to a user requested stop, a POI name (e.g., the name of a particular store), a geolocation for the stop (e.g., latitude and longitude), a street address for the stop, and/or other map version agnostic information/data identifying a stop location. In an example embodiment, the multiple stop route request may further include one or more order conditions. For example, the multiple stop route request may indicate that a particular stop needs to be completed first (e.g., dropping a child off at daycare), a particular stop needs to be completed last (e.g., picking up perishables at the grocery store or a farmer's market), a particular stop needs to be completed around or by particular time (e.g., picking a child up from soccer practice), and/or the like.

At block 704, the starting segment, target segment, and waypoint segment(s) of the network version of the digital map are identified. For example, the network apparatus 10 may identify the starting segment, target segment, and way point segment(s) of the network version of the digital map. For example, the network apparatus 10 may comprise means, such as processor 12, memory 14, and/or the like for identifying the starting segment, target segment, and way point segment(s) of the network version of the digital map. For example, the information/data identifying the starting location may be map-matched (e.g., using a map matching algorithm, engine, and/or the like) based on the network version of the digital map to identify the starting segment of the network version of the digital map (also referred to as the network version starting segment herein). For example, the information/data identifying the target location may be map-matched (e.g., using a map matching algorithm, engine, and/or the like) based on the network version of the digital map to identify the target segment of the network version of the digital map (also referred to as the network version target segment herein). For example, the information/data identifying each stop location may be map-matched (e.g., using a map matching algorithm, engine, and/or the like) based on the network version of the digital map to identify a corresponding waypoint segment of the network version of the digital map (also referred to as a network version waypoint segment herein). In various embodiments, the information/data identifying the information/data identifying the starting location, target location, and/or stop location(s) may be map-matched to the network version of the digital map such that an error up to a preset error in the matching of the midpoint corresponding to the starting/target/stop location to the midpoint of the corresponding segment of the network version of the digital map. The z-level corresponding to the starting location, target location, and/or stop location(s) may be used for tie breaking in the case where the starting location, target location, and/or stop location(s) corresponds to a tunnel, bridge, stacked roads, and/or the like. If the network apparatus cannot exactly match (e.g., within the preset error) a network version start segment, network version target segment, and/or network version waypoint segment(s) of the to the information/data identifying the start location, target location, and/or stop location(s), the multiple stop route response may include a flag indicating such.

At block 706, a route starting at the network version starting segment, passing through each of the network version waypoint segments, and ending at the network version target segment is determined. For example, the network apparatus 10 may determine a route starting at the network version starting segment, passing through each of the network version waypoint segments, and ending at the network version target segment. For example, the network apparatus 10 may comprise means, such as processor 12, memory 14, and/or the like, for determining a route starting at the network version starting segment, passing through each of the network version waypoint segments, and ending at the network version target segment. In various embodiments, the route is determined in accordance with any order conditions provided in the multiple stop route request.

A variety of route determining algorithms may be used, in various embodiments, to determine a route starting at the network version starting segment, passing through each of the network version waypoint segments, and ending at the network version target segment. In various embodiments, a route determining algorithm that uses cost values is used to determine the route. For example, a best-first algorithm may be used to determine a route starting at the network version starting segment, passing through each of the network version waypoint segments, and ending at the network version target segment. For example, a modified Dijkstra's algorithm or another cost minimization algorithm may be used to determine the route starting at the network version starting segment, passing through each of the network version waypoint segments, and ending at the network version target segment. In an example embodiment, the route may be designated as an ordered list or set of route segments for each leg of the route (e.g., between the network version starting segment and the first network version waypoint segment, between consecutive network version waypoint segments, and/or between the final network version waypoint segment and the network version target segment) and an ordered list of destinations for each leg. For example a route segment set may be defined for each leg. For example, to determine the route, an ordered list or set of route segments for each leg (and/or segment identifiers of the network version of the digital map identifying the route segments) and an ordered list of destinations for each leg may be generated.

At block 708, a bloom filter is produced for each leg of the route. For example, a bloom filters that each encode a route segment set corresponding to an individual leg of the route may be produced. For example, the network apparatus 10 may produce a bloom filter corresponding to each leg of the route, wherein the bloom filter encodes the route segments set corresponding to the associated leg of the route. For example, the network apparatus 10 may comprise means, such as processor 12, memory 14, and/or the like for producing a bloom filter corresponding to each leg of the route, wherein the bloom filter encodes the route segments set corresponding to the associated leg of the route. In various embodiments, each leg may be encoded into a separate bloom filter. For example, for a route having α network waypoint segments (e.g., a intermediary stops between the origin and the final destination of the route), α+1 bloom filters are produced. In various embodiments, the bloom filters are produced in a manner similar to that described with respect to FIG. 4.

At block 710, a multiple stop route response is generated and provided. For example, the network apparatus 10 may generate and provide a multiple stop route request. For example, the network apparatus 10 may comprise means, such as processor 12, memory 14, communications interface 16, and/or the like, for generating and providing (e.g., transmitting) a multiple stop route request. In various embodiments, the route response comprises the bloom filter (e.g., as a bit array). In an example embodiment, the route response comprises an ordered list of stops or waypoints. For example, the ordered list of stops or waypoints may include information/data identifying a network version starting location, each network version waypoint location (in the ordered they are to be visited along the multiple stop route) and a network version target location. In various embodiments, the information/data identifying the network version starting location, each network version waypoint location, and network version target location is map version agnostic. For example, in an example embodiment, the information/data identifying the network version starting location is the midpoint of (or other point along) the network version starting segment and the z-level of the network version starting segment. Similarly, the information/data identifying a network version waypoint location may be the midpoint of (or other point along) the corresponding network version waypoint segment and the z-level of the corresponding network version waypoint segment. In an example embodiment, the information/data identifying the network version target segment is the midpoint of (or other point along) the network version target segment and the z-level of the network version target segment. In an example embodiment, generating the multiple stop route response includes determining a length of each leg of the route. For example, the length of each route segment of a leg may be summed to determine a length of the corresponding leg of the route. The length of each leg of the route may then be included in the route response, in an example embodiment. For example, the ordered list of stops or waypoints may include a length for each leg of the route. In an example embodiment a total length of the route may be determined and provided as part of the multiple stop route response in addition to and/or in place of the length of each leg of the route.

ii. Exemplary Operation of a Mobile Apparatus

Starting at block 802 of FIG. 8, a multiple stop route request is generated and provided such that the network apparatus 10 receives the multiple stop route request. For example, the mobile apparatus 20 may generate and provide (e.g., transmit) a multiple stop route request. For example, the mobile apparatus 20 may comprise means, such as processor 22, memory 24, communications interface 26, user interface 28, location sensor 29, and/or the like, for generating and providing a multiple stop route request.

In various embodiments, the multiple stop route request may comprise a mobile apparatus identifier identifying the mobile apparatus 20 that generated and provided the multiple stop route request, map version agnostic information/data identifying a starting location, map version agnostic information/data identifying a target location, map version agnostic information/data identifying one or more intermediate stops, one or more parameters for the route (e.g., shortest distance, shortest expected travel time, avoid tolls, avoid highways, driving route, biking route, walking route, and/or the like), one or more order conditions corresponding to requirements or preferences regarding the order or timing with which intermediate stops of the route should be made, and/or the like. In various embodiments, the information/data identifying the starting location, one or more intermediate stops, and the target location are independent of a version of the digital map.

For example, a user may interact with the user interface 28 and request a multiple stop route. For example, the user may operate the user interface 28 to indicate an origin of the route, one or more intermediate stops of the route, a destination of the route, one or more order conditions, and/or one or more parameters for the route (e.g., shortest distance, shortest expected travel time, avoid tolls, avoid highway, driving route, biking route, walking route, and/or the like). The user may then operate the user interface 28 to submit the user provided and/or selected information/data and to initiate the generation of the multiple stop route request. In an example embodiment, the origin of the route is the current location of the mobile apparatus 20 as determined by on one or more location sensors 29 of the mobile apparatus. In another example, a mobile apparatus 20 may determine that the mobile apparatus 20 is moving and/or that a trip is expected to begin. The mobile apparatus 20 may determine a current location of the mobile apparatus (e.g., via the location sensor(s) 29) and determine a predicted destination of the route (based on past trips, information/data stored in a digital calendar corresponding to a user of the mobile apparatus 20, based on planned trips, and/or the like). The mobile apparatus 20 may then automatically initiate the generation of a route request.

As noted above, the mobile apparatus 20 may receive (e.g., via user interface 28 and/or from location sensor 29) an origin of the route. The mobile apparatus 20 may then map match the origin of the route to a segment of the mobile version of the digital map. This mobile version starting segment (e.g., a segment of a mobile version of the digital map to which the origin has been map-matched) is used to determine the map version agnostic information/data identifying the starting location. In an example embodiment, the information/data identifying the starting location is provided as the midpoint and z-level of the mobile version starting segment. The midpoint of a segment is the coordinate pair (e.g., latitude and longitude) of the point that is approximately halfway down the segment, where the ends of the road segment are defined by intersections or nodes. For example, the midpoint of a segment is a point in the middle of the segment between the two intersections that define the ends of the segment. The z-level of a segment describes the relative location of roads that are stacked. For most segments, the z-level is 0 (e.g., unstacked and/or on ground level); however, for tunnels the z-level might be negative and for stacked roads/bridges z-level might be positive. The mobile apparatus may further map match the destination for the route to a segment of the mobile version of the digital map. This mobile version target segment (e.g., a segment of the mobile version of the digital map to which the destination has been map-matched) is used to determine the map version agnostic information/data identifying the target location. For example, the information/data identifying the target location for the route may be provided as the midpoint and z-level of a mobile version target segment. In various embodiments, the information/data identifying the stop location(s) for the route may be provided as the midpoint and z-level of a mobile version segment corresponding to a user requested stop, a POI name (e.g., the name of a particular store), a geolocation for the stop (e.g., latitude and longitude), a street address for the stop, and/or other map version agnostic information/data identifying a stop location.

At block 804, a multiple stop route response is received. For example, the network apparatus 10 may generate and provide a multiple stop route response, in response to the multiple stop route request, and provide the multiple stop route response such that the mobile apparatus 20 receives the multiple stop route response. For example, the mobile apparatus 20 may receive the multiple stop route response. For example, the mobile apparatus 20 may comprise means, such as processor 22, memory 24, communications interface 26, and/or the like for receiving the multiple stop route response. In various embodiments, the multiple stop route response comprises a bloom filter (e.g., as a bit array) for each leg of the route. In an example embodiment, the multiple stop route response comprises an ordered list of stops or waypoints. For example, the ordered list of stops or waypoints may include information/data identifying a network version starting location, each network version waypoint location (in the ordered they are to be visited along the multiple stop route) and a network version target location. The ordered list of stops or waypoints may further include a length for each leg of the route. In an example embodiment, the multiple stop route response includes a total length of the route in addition to and/or in place of the length of each leg of the route.

At block 806, a decoded starting segment, one or more decoded waypoint segments, and a decoded target segment are identified. For example, the mobile apparatus 20 may identify and/or determine a decoded starting segment, one or more decoded waypoint segments, and a decoded target segment using the mobile version of the digital map. For example, the mobile apparatus 20 may comprise means, such as processor 22, memory 24, and/or the like, for identifying and/or determining a decoded starting segment, one or more decoded waypoint segments and a decoded target segment using the mobile version of the digital map. For example, the map version agnostic information/data identifying the network version starting location may be map-matched using the mobile version of the digital map to identify a decoded starting segment corresponding to the network version starting location. For example, the map version agnostic information/data identifying each of the network version stop locations may be map-matched using the mobile version of the digital map to identify a corresponding decoded waypoint segment. Similarly, the map version agnostic information/data identifying the network version target location may be map-matched using the mobile version of the digital map to identify a decoded target location corresponding to the network version target location.

At block 808, map information/data from the mobile version of the digital map for assigning cost values to segments of the mobile version of the digital map is accessed. For example, the mobile apparatus 20 may access map information/data from a geographic database storing map information/data of the mobile version of the digital map from memory 24.

In various embodiments, a decoded leg route is determined for each leg of the route independently. For example, the multiple stop route response includes a first leg bloom filter and a second leg bloom filter. The first leg bloom filter is used, in conjunction with the corresponding beginning segment (e.g., the decoded starting segment or one of the one or more decoded waypoint segments) corresponding to the origin of the first leg and ending segment (e.g., one of the one or more decoded waypoint segments or the decoded target segment) corresponding to the destination of the first leg, to determine the first decoded leg route. The second leg bloom filter is used, in conjunction with the corresponding beginning segment corresponding to the origin of the second leg and the ending segment corresponding to the destination of the second leg, to determine the second decoded leg route. The first decoded leg route and the second decoded leg route are determined independent of one another. Thus, the determination of each decoded leg route may be performed independently and a cost value is assigned to a first segment during the determination of the first decoded leg route may be different from a cost value assigned to the first segment during the determination of the second decoded leg route.

In various embodiments, the cost value assigned to a segment during the determination of a particular decoded leg route is determined based on whether the segment satisfies the bloom filter corresponding to the particular leg of the route. For example, if a coded map version agnostic identifier corresponding to a first segment satisfies the bloom filter corresponding to a particular leg of the route, the first segment is assigned a minimal cost value for the determination of the particular decoded leg route. For example, the first segment may be assigned a cost value of zero. However, if the coded map version agnostic identifier corresponding to the first segment does not satisfy the bloom filter corresponding to the particular leg of the route, the first segment is assigned a positive cost value (e.g., based on the length of the segment, expected time of traversal for the segment, a current or expected traffic level for the segment, and/or the like) for the determination of the particular decoded leg route.

Thus, accessing map information/data for use in assigning cost values to segments during the determination of one or more decoded leg routes of the route includes accessing map information/data from the mobile version of the digital map that may be used for determining if a segment satisfies one or more bloom filters provided as part of the multiple stop route response. For example, a segment record corresponding to a segment may be accessed and map version agnostic information/data may be extracted therefrom. In an example embodiment, elements of the segment record to be accessed for generating a map version agnostic identifier for the segment are pre-established and/or defined. In particular, the elements of the segment record to be accessed for use in generating a map version agnostic identifier are the same elements of the network version of the digital map used by the network apparatus to generate the map version agnostic identifiers that were coded to produce the bloom filters. For example, the map version agnostic identifier may be generated using a map version agnostic identifier algorithm and the mobile apparatus 20 and the network apparatus 10 may use the same map version agnostic identifier algorithm. For example, the map version agnostic map information/data accessed may include a road name, segment length, a direction of travel of a segment, a functional class of a segment, speed limit, segment midpoint, and/or the like, in various embodiments.

The map version agnostic map information/data corresponding to a segment may then be used to generate a map version agnostic identifier for the segment. For example, the accessed map version agnostic information/data corresponding to a route segment may be combined in a pre-established and/or defined manner (e.g., in the same manner as the generation of the map version agnostic identifiers where generated by the network apparatus 10) to generate a map version agnostic identifier configured to identify the segment. The map version agnostic identifier may then be used to determine if the corresponding segment satisfies one or more of the bloom filters provided in the multiple stop route response. If the segment satisfies a bloom filter for a particular leg of the route, the segment is assigned a minimal (e.g., zero) cost value when determining the particular decoded leg route. If the segment does not satisfy the bloom filter for the particular leg of the route, the segment may be assigned a cost value based on map information/data for determining the particular decoded leg route. For example, the accessed map information/data may include map information/data that may be used to assign a cost value to a segment of the mobile version of the digital map. In an example embodiment, the cost value assigned to a segment may be the length of the segment, the expected time to traverse the segment, a traffic level indicator, and/or the like, as described above.

In an example embodiment, block 808 may be performed concurrently with block 810 such that the map information/data for assigning a cost value to a first segment is accessed when a route determining algorithm is expanded to the first segment. For example, map information/data for assigning a cost value to a first segment may be accessed and the cost value assigned to the first segment based thereon, in response to a route determining algorithm considering whether the first segment is part of the decoded route or a particular decoded leg route.

At block 810, a decoded leg route is determined for each leg of the multiple stop route. For example, a particular decoded leg route is determined for the particular leg of the multiple stop route by identifying the lowest cost route from the beginning segment (e.g., the decoded starting segment or one of the one or more decoded waypoint segments) corresponding to the origin of the particular leg and ending segment (e.g., one of the one or more decoded waypoint segments or the decoded target segment) corresponding to the destination of the particular leg. For example, the mobile apparatus 20 may determine a decoded leg route for each leg of the route by determining the lowest cost route from the beginning segment to the ending segment for that leg. For example, the mobile apparatus 20 may comprise means, such as processor 22, memory 24, and/or the like, for determining a decoded leg route for each leg of the route by determining the lowest cost route from the beginning segment to the ending segment of that route. For example, the lowest cost route for a leg may be determined based on the cost value assigned (based on the bloom filter for that leg) to segments between the beginning segment and the ending segment of the leg. In various embodiments, a best-first algorithm may be used to determine each of the decoded leg routes. In an example embodiment, a version of Dijkstra's algorithm may be used to determine each of the decoded leg routes. A decoded route is then generated by ordering the decoded leg routes based on the ordered list of stops or waypoints provided by the multiple stop route response.

At block 812, it is determined if the decoded route and/or if each decoded leg route satisfies one or more quality measures. In an example embodiment, the one or more quality measures comprise the total length of the decoded route (e.g., the sum of the lengths of each of the decoded leg routes) being similar to the total route length provided as part of the multiple stop route response (and/or determined by summing the leg lengths provided in the multiple stop route response). For example, a decoded route length may be determined and compared to the total route length provided by the multiple stop route response. In an example embodiment, the decoded route length is determined by summing the length of each segment in each of the decoded leg routes based on the mobile version of the digital map. For example, it may be determined if the decoded route length and the total route length satisfy a similarity threshold requirement. In an example embodiment, the ratio of the decoded route length and the total route length may be compared to a similarity range to determine if the decoded route length and the total route length satisfy a similarity threshold requirement. For example, if the ratio of the decoded route length to the total route length is in within the similarity range, it may be determined that the decoded route is an acceptable route. If the ratio of the decoded route length to the total route length is not within the similarity range, it may be determined that the decoded route is not an acceptable route.

In various embodiments, the similarity range is a predetermined range. In some example embodiments, the similarity range is 0.7 to 1.3, 0.75 to 1.25, 0.8 to 1.2, 0.85 to 1.15, 0.9 to 1.1, and/or 0.95 to 1.05. For example, the mobile apparatus 20 may determine if the decoded route length and the total route length satisfy a similarity threshold requirement. For example, the mobile apparatus 20 may comprise means, such as processor 22, memory 24, and/or the like, for determining if the decoded route length and the total route length satisfy the similarity threshold requirement. In various embodiments, rather than and/or in addition to determining if the decoded route length and the total route length satisfy the similarity threshold requirement, it may be determined if the length of each decoded leg route and the corresponding length of the leg provided in the multiple stop route response satisfy a similarity threshold requirement.

In an example embodiment, the one or more quality measures may include determining whether the number of elements in the bloom filter that the mobile apparatus 20 cannot resolve satisfies a quality threshold requirement. When the number of elements of the bloom filter that cannot be resolved by the mobile apparatus 20 fails to satisfy a quality threshold requirement (e.g., exceeds a quality threshold number), it may be determined that the decoded route fails to satisfy a quality measure.

When it is determined that the decoded route and/or each of the decoded leg routes satisfy the one or more quality measures (e.g., the decoded route length and the route length satisfy a similarity threshold requirement, the length of each of the decoded leg routes and the corresponding length of the leg provided in the multiple stop route response satisfy a similarity threshold requirement), the process continues to block 814 and the route is accepted. For example, the mobile apparatus 20 may accept the decoded route and use the decoded route to complete one or more navigation functions. For example, the mobile apparatus 20 may comprise means, such as processor 22, memory 24, communications interface 26, user interface 28, sensors 29, and/or the like, for (responsive to determining that the decoded route satisfies the one or more quality measures) accepting the decoded route and using the decoded route to perform one or more navigation functions. Some non-limiting examples of navigation functions include providing a route (e.g., via a user interface), localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

When it is determined that the decoded route does not satisfy at least one quality measure (e.g., the decoded route length and the route length do not satisfy the similarity threshold requirement, the length of at least one of the decoded leg routes and the corresponding length of the leg provided in the multiple stop route response do not satisfy a similarity threshold requirement), the process continues to block 816. At block 816, the route and/or one or more legs of the route are rejected and a new route is requested. For example, the mobile apparatus 20 may rejected the route and/or one or more legs of the route and request a new route. For example, the mobile apparatus 20 may comprise means, such as processor 22, memory 24, communications interface 26, and/or the like for (responsive to determining that the decoded route fails to satisfy at last one quality measure) rejecting the route and/or one or more legs of the route and requesting a new route. For example, the mobile apparatus 20 may generate an updated and/or modified multiple stop route request and provide (e.g., transmit) the updated and/or modified multiple stop route request such that the network apparatus 10 receives the updated and/or modified multiple stop route request. In response to the updated and/or modified multiple stop route request, the network apparatus 10 may generate a new route or new legs of the route, encode a route segment set defined by the same or the new route with a larger bloom filter for at least one of the legs (e.g., a bit array having more bits than the previously provided bloom filter for the at least one of the legs) and/or the like. The network apparatus 10 may then provide an updated and/or modified multiple stop route response comprising a plurality of bloom filters (e.g., one bloom filter for each leg of the route), and/or the like. The mobile apparatus 20 receives the updated and/or modified multiple stop route response and determines an updated and/or modified decoded route. In an example embodiment, the mobile apparatus 20 determines if the updated and/or modified decoded route satisfies one or more quality measures to determine if the updated and/or modified decoded route is to be accepted or rejected and a new route is to be requested.

C. Routes with Additional Traffic Information/Data

In various embodiments, a route may be provided with additional traffic information/data. For example, the additional traffic information/data may include an approximate delay time for traveling along adjacent segments of a route. For example, the additional traffic information/data may give at least a first order detour cost for taking a detour along an adjacent segment of the route. In various embodiments, the additional traffic information/data may be used by a mobile apparatus 20 when assigning a cost value to one or more segments during the determination of a decoded route by determining a lowest cost route. In various embodiments, the additional traffic information/data may be used to provide information/data to a user regarding traffic the user may experience if the user deviates from the route. For example, the additional traffic information/data may be used to display a traffic heat map (e.g., via the user interface 28). FIG. 9 provides a flowchart illustrating operations performed, such as by the network apparatus 10 to provide a route response including additional traffic information/data, in accordance with an example embodiment. FIG. 10 is a flowchart illustrating operations performed, such as by the mobile apparatus 20 to decode and use additional traffic information/data, in accordance with an example embodiment.

i. Exemplary Operation of a Network Apparatus

In various embodiments, a network apparatus may generate and provide additional traffic information/data as part of a route response for various types of route responses. For example, additional traffic information/data may be generated and provided along with a shortest distance, shortest travel time route, and/or the like. Similarly, additional traffic information/data may be generated and provided along with a multiple stop route, routes to POIs identified based on a proximity search, a parking cruise route, and/or other routes.

Starting at block 902 of FIG. 9, a route request is received. For example, the network apparatus 10 may receive a route request. For example, the network apparatus 10 may comprise means, such as processor 12, memory 14, communications interface 16, and/or the like for receiving a route request. In various embodiments, the route response may be a multiple stop route request, POI request, parking cruise request, and/or the like. In various embodiments, the route request may comprise a mobile apparatus identifier identifying the mobile apparatus that provided the route request, map version agnostic information/data identifying a starting location, map version agnostic information/data identifying a target location, one or more parameters for the route (e.g., shortest distance, shortest expected travel time, avoid tolls, avoid highways, driving route, biking route, walking route, include delay bloom filters, and/or the like), and/or the like. In various embodiments, the information/data identifying the starting location and the target location are independent of a version of the digital map. In an example embodiment, the information/data identifying the starting location is provided as the midpoint and z-level of a mobile version segment corresponding to the current location/position of the mobile apparatus and/or a user provided origin for the route. The midpoint of a segment is the coordinate pair (e.g., latitude and longitude) of the point that is approximately halfway down the segment, where the ends of the road segment are defined by intersections or nodes. For example, the midpoint of a segment is a point in the middle of the segment between the two intersections that define the ends of the segment. The z-level of a segment describes the relative location of roads that are stacked. For most segments, the z-level is 0 (e.g., unstacked and/or on ground level); however, for tunnels the z-level might be negative and for stacked roads/bridges z-level might be positive. For example, the information/data identifying the target location for the route may be provided as the midpoint and z-level of a mobile version segment corresponding to a user provided and/or selected destination of the route and/or a predicted destination of the route. The route request may include various other types of (map version agnostic) information/data as appropriate for the type of route request (e.g., multiple stop route request, POI request, parking cruise request, and/or the like).

At block 904, the route may be determined and a route bloom filter encoding the route segment set defined by the route may be produced. In the case where the route request is a multiple stop route request, a plurality of route bloom filters may be produced, with each route bloom filter encoding a leg of the multiple stop route. For example, the network apparatus 10 may determine a route and produce a route bloom filter encoding the route segment set defined by the route. For example, the network apparatus 10 may comprise means, such as processor 12, memory 14, and/or the like, for determining a route and producing a route bloom filter encoding route segment set defined by the route. For example, a network version starting segment and network version target segment may be identified based on the information/data identifying the starting location and the target location for the route. A route between the network version starting segment and the network version target segment may be determined. The route segment set defined by the route may then be encoded in a route bloom filter. For example, a route bloom filter encoding the route segment set defined by the route may be produced as described above with respect to FIG. 4.

At block 906, traffic information/data may be accessed for one or more delay segments. As used herein, the term delay segments is used to identify the set of segments for which additional traffic information/data is provided in the route response. In various embodiments, the delay segments comprise the adjacent segments for the route. For example, the adjacent segments for a route may be identified during the determination of the route and/or producing of a bloom filter encoding the route segment set defined by the route. In an example embodiment, the delay segments further comprise connected segments, wherein connected segments are segments that are directly connected to the adjacent routes (e.g., share a node or intersection with an adjacent route) that are not route segments (e.g., not a member of the route segment set).

In various embodiments, the traffic information/data may be current traffic information/data and/or historical/archived traffic information/data. In various embodiments, the traffic information/data is current traffic information/data corresponding to real time or near real time traffic conditions. In various embodiments, the traffic information/data is historical/archived traffic information/data associated with an epoch that corresponds to request time. In various embodiments, an epoch is a particular time period of a day, week, month, year, and/or the like. In various embodiments, the request time corresponds to the time at which the route is expected to be traversed. For example, if the route is expected to be traversed directly (e.g., as soon as the route is provided to the user and/or the like), the request time may be the current time (e.g., the time at which the traffic information/data is being accessed). In another example, if the route is expected to be traversed at a point of time in the future (e.g., as indicated in the route request), the request time may be the time at which the route is expected to be traversed (e.g., as indicated in the route request).

In various embodiments, the accessed traffic information/data corresponding to each delay segment may correspond to a travel speed along at least a portion of the corresponding delay segment. For example, the accessed traffic information/data may provide a representative speed of traffic along the corresponding segment, a free flow ratio for the segment, a traversal time for the segment and/or the like based on current probe information/data and/or based on historical/archived traffic information/data corresponding to the appropriate epoch for the request time. For example, the network apparatus 10 may access traffic information/data corresponding to the delay segments. For example, the network apparatus 10 may comprise means, such as processor 12, memory 14, communications interface 16, and/or the like, for accessing traffic information/data corresponding to the delay segments.

At block 908, the delay along each delay segment is determined based on the corresponding accessed traffic information/data. For example, the network apparatus 10 may determine a delay along each delay segment based on the corresponding accessed traffic information/data. For example, the network apparatus 10 may comprise means, such as processor 12, memory 14, and/or the like for determining a delay along each delay segment based on the corresponding accessed traffic information/data. As used herein the term delay corresponds to the difference in time for traversing a segment under free flow conditions (e.g., traveling at the speed limit and/or another free flow speed) and the expected time for traversing the segment based on the traffic information/data. For example, based on the accessed traffic information/data corresponding to a delay segment, an expected time for traversing the delay segment may be determined. For example, if the accessed traffic information/data provides a travel speed along the delay segment, the length of the delay segment, according to the network version of the digital map, may be divided by the travel speed along the delay segment to determine the expected time for traversing the delay segment. The delay for the delay segment may then be determined by subtracting the time for traversing the delay segment under free flow conditions (e.g., the length of the segment divided by the free flow speed for the delay segment) from the expected time for traversing the delay segment under the current and/or expected traffic conditions (e.g., based on the traffic information/data). For example, the delay for a delay segment may be the additional number of minutes needed to traverse the segment under the current and/or expected traffic conditions compared to free flow conditions.

At block 910, the delay segments are binned based on the corresponding delay. For example, a plurality of delay groups may be defined where each delay group corresponds to a range of delays. In an example embodiment, four delay groups are defined with a first group corresponding to delays in a first range (e.g., zero to two minutes), a second group corresponding to delays in a second range (e.g., three minutes to eight minutes), a third group corresponding to delays in a third range (e.g., nine minutes to fifteen minutes), and a fourth group corresponding to delays in a fourth range (e.g., longer than fifteen minutes). Each delay segment is assigned to a delay group based on the delay determined for the delay segment. For example, if a first delay determined for a first delay segment is one minute and a second delay determined for a second delay segment is ten minutes, the first delay segment is assigned to the first group from the above example (e.g., a one minute delay is within the range of zero to two minutes) and the second delay segment is assigned to the third group from the above example. In another example embodiment, three delay groups are defined with each delay group corresponding to a particular range of delays and the delay segments are assigned to delay groups based on the corresponding determined delay. Various numbers of delay groups and delay ranges may be defined in various embodiments. For example, the network apparatus 10 may assign each delay segment to a delay group based on the delay determined for the delay segment being within the delay range associated with the delay group. For example, the network apparatus 10 may comprise means, such as processor 12, memory 14, and/or the like, for assigning each delay segment to a delay group based on the delay determined for the delay segment being within the delay range associated with the delay group.

At block 912, a delay bloom filter is produced for each delay group. For example, the network apparatus 10 may produce a delay bloom filter encoding each delay group. For example, the network apparatus 10 may comprise means, such as processor 12, memory 14, and/or the like for producing a plurality of delay bloom filters, with each delay bloom filter encoding a delay group. For example, map version agnostic map information/data for each delay segment may be accessed from the network version of the digital map and a map version agnostic identifier for each delay segment may be generated. The map version agnostic identifier for each delay segment within a delay group may then be encoded into a delay bloom filter. It may then be determined if any of the delay segments that were assigned to a different delay group satisfy the delay bloom filter. For example, it may be determined if a second delay segment assigned to a second group satisfies a first delay bloom filter encoding the map version agnostic identifiers of the delay segments assigned to a first group. If the second delay segment assigned to the second group satisfies the first delay bloom filter corresponding to the first group, the size of the first delay bloom filter may be increased (e.g., from $m_1$ to $m_1+1$). For example, a larger first delay bloom filter may be generated. In an example embodiment, each delay bloom filter may be incrementally increased in size until the only delay segments that satisfy the delay bloom filter are the delay segments assigned to the corresponding delay group. In an example embodiment, the delay filters are produced in a manner similar to that described above with respect to FIG. 4.

At block 914, a route response is generated and provided. In various embodiments, the route response comprises route information/data and the delay bloom filers. For example, the route information/data may comprise the route bloom filter(s), information/data identifying a starting segment of the route, information/data identifying a target segment of the route, and/or the like. For example, the network apparatus 10 generates and provides a route response including route information/data and the delay bloom filters. For example, the network apparatus 10 may comprise means, such as processor 12, memory 14, communications interface 16, and/or the like, for generating and providing a route response including the route information/data and the delay bloom filters. For example, the network apparatus 10 may provide (e.g., transmit) the route response such that the mobile apparatus 20 corresponding to the mobile apparatus identifier provided in the route request receives the route response. In an example embodiment, the route and delay bloom filters are provided as an array. For example, the route response may comprise an array populated with the bit arrays of the route and delay bloom filters. For example, in an embodiment wherein three delay bloom filters are produced, the array may comprise the route bloom filter in a zeroth position of the array, a first delay bloom filter corresponding to a first delay range in a first position of the array, a second delay bloom filter corresponding to a second delay range in a second position of the array, and a third delay bloom filter corresponding to a third delay range in a third position of the array. If the ranges of delays are preset, the route response may not include the ranges of delays and the range of delays corresponding to the delay bloom filters may be determined (e.g., by the mobile apparatus 20) based on the position of the delay bloom filters within the array provided in the route response.

ii. Exemplary Operation of a Mobile Apparatus

In various embodiments, a mobile apparatus 20 may receive a route response comprising one or more delay bloom filters (e.g., in addition to a route bloom filter). In various embodiments, the mobile apparatus 20 may use the one or more delay bloom filters to determine a delay or delay range for one or more segments near a route. In various embodiments, the determined delays and/or delay ranges may be used to provide a visualization (e.g., via user interface 28) of delays near a route. In an example embodiment, the determined delays and/or delay ranges may be used in the decoding of the route (e.g., to assign cost values to segments when decoding the route segment set encoded in the route bloom filter).

Starting at block 1002, a route request is generated and provided such that the network apparatus 10 receives the route request. For example, the mobile apparatus 20 may generate and provide (e.g., transmit) a route request. For example, the mobile apparatus 20 may comprise means, such as processor 22, memory 24, communications interface 26, user interface 28, location sensor 29, and/or the like, for generating and providing a route request. In various embodiments, the route request may comprise a mobile apparatus identifier identifying the mobile apparatus 20 that generated and provided the route request, map version agnostic information/data identifying a starting location, map version agnostic information/data identifying a target location, one or more parameters for the route (e.g., shortest distance, shortest expected travel time, avoid tolls, avoid highways, driving route, biking route, walking route, include delay bloom filters, and/or the like), and/or the like. In various embodiments, the information/data identifying the starting location and the target location are independent of a version of the digital map.

For example, a user may interact with the user interface 28 and request a route. For example, the user may, operate the user interface 28 to indicate an origin of the route, a destination of the route, and/or one or more parameters for the route (e.g., shortest distance, shortest expected travel time, avoid tolls, avoid highway, driving route, biking route, walking route, and/or the like). The user may then operate the user interface 28 to submit the user provided and/or selected information/data and to initiate the generation of the route request. In an example embodiment, the origin of the route is the current location of the mobile apparatus 20 as determined by on one or more location sensors 29 of the mobile apparatus. In another example, a mobile apparatus 20 may determine that the mobile apparatus 20 is moving and/or that a trip is expected to begin. The mobile apparatus 20 may determine a current location of the mobile apparatus (e.g., via the location sensor(s) 29) and determine a predicted destination of the route (based on past trips, information/data stored in a digital calendar corresponding to a user of the mobile apparatus 20, based on planned trips, and/or the like). The mobile apparatus 20 may then automatically initiate the generation of a route request.

As noted above, the mobile apparatus 20 may receive (e.g., via user interface 28 and/or from location sensor 29) an origin of the route. The mobile apparatus 20 may then map match the origin of the route to a segment of the mobile version of the digital map. This mobile version starting segment (e.g., a segment of a mobile version of the digital map to which the origin has been map-matched) is used to determine the map version agnostic information/data identifying the starting location. In an example embodiment, the information/data identifying the starting location is provided as the midpoint and z-level of the mobile version starting segment. The midpoint of a segment is the coordinate pair (e.g., latitude and longitude) of the point that is approximately halfway down the segment, where the ends of the road segment are defined by intersections or nodes. For example, the midpoint of a segment is a point in the middle of the segment between the two intersections that define the ends of the segment. The z-level of a segment describes the relative location of roads that are stacked. For most segments, the z-level is 0 (e.g., unstacked and/or on ground level); however, for tunnels the z-level might be negative and for stacked roads/bridges z-level might be positive. The mobile apparatus may further map match the destination for the route to a segment of the mobile version of the digital map. This mobile version target segment (e.g., a segment of the mobile version of the digital map to which the destination has been map-matched) is used to determine the map version agnostic information/data identifying the target location. For example, the information/data identifying the target location for the route may be provided as the midpoint and z-level of a mobile version target segment.

At block 1004, a route response is received. For example, the network apparatus 10 may generate and provide a route response in response to the route request, and provide the route response such that the mobile apparatus 20 receives the route response. For example, the mobile apparatus 20 may receive the route response. For example, the mobile apparatus 20 may comprise means, such as processor 22, memory 24, communications interface 26, and/or the like for receiving the route response. In various embodiments, the route response comprises route information/data and one or more delay bloom filters. For example, in various embodiments, the route response comprises a route bloom filter and one or more delay bloom filters (e.g., as an array of bit arrays). In an example embodiment, the route response comprises information/data identifying a network version starting location and information/data identifying a network version target location. In various embodiments, the information/data identifying the network version starting location and network version target location is map version agnostic. For example, in an example embodiment, the information/data identifying the network version starting location is the midpoint of (or other point along) the network version starting segment and the z-level of the network version starting segment, and the information/data identifying the network version target segment is the midpoint of (or other point along) the network version target segment and the z-level of the network version target segment. In an example embodiment, the route response includes a route length indicating the length (e.g., in miles, kilometers, feet, meters, and/or the like) for the encoded route segment set.

At block 1006, the route is decoded. For example, the mobile apparatus 20 may decode the route segment set encoded by the route bloom filter(s) provided by the route response. For example, the mobile apparatus 20 may comprise means, such as processor 22, memory 24, and/or the like, for decoding the route segment set encoded by the route bloom filter(s) provided by the route response.

For example, a decoded starting segment and decoded target segment are identified. For example, the mobile apparatus 20 may identify and/or determine a decoded starting segment and a decoded target segment using the mobile version of the digital map. For example, the mobile apparatus 20 may comprise means, such as processor 22, memory 24, and/or the like, for identifying and/or determining a decoded starting segment and a decoded target segment using the mobile version of the digital map. For example, the map version agnostic information/data identifying the network version starting location may be map-matched using the mobile version of the digital map to identify a decoded starting segment corresponding to the network version starting location. Similarly, the map version agnostic information/data identifying the network version target location may be map-matched using the mobile version of the digital map to identify a decoded target location corresponding to the network version target location.

In various embodiments, map information/data from the mobile version of the digital map for assigning cost values to segments of the mobile version of the digital map is accessed. For example, the mobile apparatus 20 may access map information/data from a geographic database storing map information/data of the mobile version of the digital map from memory 24.

In various embodiments, the cost value assigned to a segment is determined based on whether the segment satisfies the route bloom filter and/or one of the delay bloom filters. For example, if a coded map version agnostic identifier corresponding to a first segment satisfies the route bloom filter, the first segment is assigned a minimal cost value. For example, the first segment may be assigned a cost value of zero. However, if the coded map version agnostic identifier corresponding to the first segment does not satisfy the route bloom filter, the first segment is assigned a positive cost value (e.g., based on the length of the segment, expected time of traversal for the segment, a current or expected traffic level for the segment, a delay or delay range determined for the segment based on a delay bloom filter, and/or the like). Thus, accessing map information/data for use in assigning cost values to segments further includes accessing map information/data from the mobile version of the digital map that may be used for determining if a segment satisfies the route bloom filter and/or one of the delay bloom filters. For example, a segment record corresponding to a segment may be accessed and map version agnostic information/data may be extracted therefrom. In an example embodiment, elements of the segment record to be accessed for generating a map version agnostic identifier for the segment are pre-established and/or defined. In particular, the elements of the segment record to be accessed for use in generating a map version agnostic identifier are the same elements of the network version of the digital map used by the network apparatus 10 to generate the map version agnostic identifiers that were coded to produce the route bloom filter(s) and the delay bloom filters. For example, the map version agnostic identifier may be generated using a map version agnostic identifier algorithm and the mobile apparatus 20 and the network apparatus 10 may use the same map version agnostic identifier algorithm. For example, the map version agnostic map information/data accessed may include a road name, segment length, a direction of travel of a segment, a functional class of a segment, speed limit, segment midpoint, and/or the like, in various embodiments.

The map version agnostic map information/data corresponding to a segment may then be used to generate a map version agnostic identifier for the segment. For example, the accessed map version agnostic information/data corresponding to a route segment may be combined in a pre-established and/or defined manner (e.g., in the same manner as the generation of the map version agnostic identifiers where generated by the network apparatus 10) to generate a map version agnostic identifier configured to identify the segment. The map version agnostic identifier may then be used to determine if the corresponding segment satisfies the route bloom filter and/or one of the delay bloom filters. If the segment satisfies the route bloom filter, the segment is assigned a minimal (e.g., zero) cost value. If the segment does not satisfy the route bloom filter, the segment may be assigned a cost value based on map information/data and/or a delay or delay range corresponding to one of the delay bloom filters (e.g., if the segment satisfies the one of the delay bloom filters). For example, the accessed map information/data may include map information/data that may be used to assign a cost value to a segment of the mobile version of the digital map. In an example embodiment, the cost value assigned to a segment may be the length of the segment, the expected time to traverse the segment, a traffic level indicator, and/or the like, as described above.

In various embodiments, decoded route is determined by identifying the lowest cost route from the decoded starting segment to the decoded target segment is determined. For example, the mobile apparatus 20 may determine a decoded route by determining the lowest cost route from the decoded starting segment to the decoded target segment. For example, the mobile apparatus 20 may comprise means, such as processor 22, memory 24, and/or the like, for determining a decoded route by determining the lowest cost route from the decoded starting segment to the decoded target segment. For example, the lowest cost route may be determined based on the cost value assigned to segments between the decoded starting segment and the decoded target segment. In various embodiments, a best-first algorithm may be used to determine the decoded route. In an example embodiment, a version of Dijkstra's algorithm may be used to determine the decoded route.

In various embodiments, it is determined if the decoded route satisfies one or more quality measures. In an example embodiment, the one or more quality measures comprise the length of the decoded route being similar to the route length provided as part of the route response. For example, a decoded route length may be determined and compared to the route length provided by the route response. In an example embodiment, the decoded route length is determined by summing the length of each segment in the decoded route based on the mobile version of the digital map. For example, it may be determined if the decoded route length and the route length satisfy a similarity threshold requirement. In an example embodiment, the ratio of the decoded route length and the route length may be compared to a similarity range to determine if the decoded route length and the route length satisfy a similarity threshold requirement. For example, if the ratio of the decoded route length to the route length is in within the similarity range, it may be determined that the decoded route is an acceptable route. If the ratio of the decoded route length to the route length is not within the similarity range, it may be determined that the decoded route is not an acceptable route. In various embodiments, the similarity range is a predetermined range. In some example embodiments, the similarity range is 0.7 to 1.3, 0.75 to 1.25, 0.8 to 1.2, 0.85 to 1.15, 0.9 to 1.1, and/or 0.95 to 1.05. For example, the mobile apparatus 20 may determine if the decoded route length and the route length satisfy a similarity threshold requirement. For example, the mobile apparatus 20 may comprise means, such as processor 22, memory 24, and/or the like, for determining if the decoded route length and the route length satisfy the similarity threshold requirement.

In an example embodiment, the one or more quality measures may include determining whether the number of elements in the bloom filter that the mobile apparatus 20 cannot resolve satisfies a quality threshold requirement. When the number of elements of the bloom filter that cannot be resolved by the mobile apparatus 20 fails to satisfy a quality threshold requirement (e.g., exceeds a quality threshold number), it may be determined that the decoded route fails to satisfy a quality measure.

When it is determined that the decoded route satisfies the one or more quality measures (e.g., the decoded route length and the route length satisfy the similarity threshold requirement), the route is accepted. For example, the mobile apparatus 20 may accept the route and use the route to complete one or more navigation functions. For example, the mobile apparatus 20 may comprise means, such as processor 22, memory 24, communications interface 26, user interface 28, sensors 29, and/or the like, for (responsive to determining that the decoded route satisfies the one or more quality measures) accepting the decoded route and using the decoded route to perform one or more navigation functions. Some non-limiting examples of navigation functions include providing a route (e.g., via a user interface), localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

When it is determined that the decoded route does not satisfy at least one quality measure (e.g., the decoded route length and the route length do not satisfy the similarity threshold requirement), the route is rejected and a new route is requested. For example, the mobile apparatus 20 may rejected the route and request a new route. For example, the mobile apparatus 20 may comprise means, such as processor 22, memory 24, communications interface 26, and/or the like for (responsive to determining that the decoded route fails to satisfy at last one quality measure) rejecting the route and requesting a new route. For example, the mobile apparatus 20 may generate an updated and/or modified route request and provide (e.g., transmit) the updated and/or modified route request such that the network apparatus 10 receives the updated and/or modified route request. In response to the updated and/or modified route request, the network apparatus 10 may generate a new route, encode a route segment set defined by the same or the new route with a larger route bloom filter (e.g., a bit array having more bits than the previously provided bloom filter) and/or the like. The network apparatus 10 may then provide an updated and/or modified route response comprising a route segment set defined by the new route encoded as a route bloom filter, a route segment set defined by the previous route encoded with a larger route bloom filter, and/or the like. The mobile apparatus 20 receives the updated and/or modified route response and determines an updated and/or modified decoded route. In an example embodiment, the mobile apparatus 20 determines if the updated and/or modified decoded route satisfies one or more quality measures to determine if the updated and/or modified decoded route is to be accepted or rejected and a new route is to be requested.

At block 1008, the adjacent segments for the decoded route are identified and the corresponding delay bloom filter is identified. For example, the mobile apparatus 20 may identify the adjacent segments for the decoded route and determine the delay bloom filter satisfied by each of the adjacent segments. For example, the mobile apparatus 20 may comprise means, such as processor 22, memory 24, and/or the like, for identifying the adjacent segments for the decoded route and determining the delay bloom filter satisfied by each of the adjacent segments. For example, the adjacent segments for the decoded route may be identified by determining the segments that are defined by and/or that are directly connected to the same intersections or nodes as the route segments of the decoded route. A map version agnostic identifier for each adjacent segment may be generated, and the delay bloom filter that the map version agnostic identifier satisfies is determined.

At block 1010, the delay range for each adjacent segment for the route is determined. For example, the mobile apparatus 20 may determine the delay range for each adjacent segment for the route based on the corresponding delay bloom filter. For example, the mobile apparatus 20 may comprise means, such as processor 22, memory 24, and/or the like, for determining the delay range for each adjacent segment for the route based on the corresponding delay bloom filter. For example, if a first adjacent segment for the route satisfies a first delay bloom filter, it is determined that the delay range corresponding to the first adjacent segment is a first range associated with the first delay bloom filter. In an example embodiment, the route response includes an indication of the first range. In an example embodiment, the delay ranges are preset and the position of the first delay bloom filter within the bloom filter array included in the route response provides an indication of the present delay range associated with the first delay bloom filter.

At block 1012, the decoded route and delay information/data is provided. For example, the decoded route and delay information/data may be displayed via a display (e.g., of the user interface 28). For example, the mobile apparatus 20 may provide the decoded route and the delay information/data. For example, the mobile apparatus 20 may comprise means, such as processor 22, memory 24, user interface 28, and/or the like, for providing the decoded route and delay information/data. In various embodiments, the delay information/data may be an indication of the delay range associated with one or more adjacent segments for the route. For example, FIG. 11 provides an example view of an IUI of the user interface 28 showing the decoded route 1100 from the decoded starting segment 1102 to the decoded target segment 1104. The adjacent segments 1110 (e.g., 1110A-E) are displayed in a manner such that the delay range corresponding to the adjacent segments may be determined. For example, the adjacent segments 1110C and 1110E may be associated with the shortest delay range (e.g., zero to five minutes and/or the like) and may be shown in green and/or another manner that visually illustrates that the delay associated with adjacent segments 1110C and 1110E is relatively small. For example, the adjacent segments 1110B and 1110D may be associated with a middle delay range (e.g., five to ten minutes and/or the like) and may be shown in yellow/orange and/or another manner that visually illustrates that the delay associated with adjacent segments 1110B and 1110D is a moderate delay. For example, the adjacent segment 1110A may be associated with the longest delay range (e.g., longer than ten minutes, and/or the like) and may be shown in red and/or another manner that visually illustrates that the adjacent segment 1110A is relatively large. For example, a user may view the display of the decoded route and delay information/data and determine, if the user wishes to take a detour from the decoded route, which adjacent segments to avoid (e.g., due to long delays along the adjacent segments) and which adjacent segments are associated with a shorter delay.

D. POI Proximity Search

In various embodiments, a user may wish to search for POIs near the user's current location or near a particular location. For example, the user may wish to find a pizzeria near the user's current location. The user may interact with the mobile apparatus 20 (e.g., via the user interface 28) to request information/data regarding pizzerias nearby. The mobile apparatus 20 may generate a POI route request comprising the user's location and the query criteria (e.g., pizzeria) and provide the POI route request such that the network apparatus 10 receives the POI route request. The network apparatus 10 may identify one or more POIs meeting the query criteria (e.g., POIs that are associated with POI information/data indicating that the POI is a pizzeria) that are nearest the user's location based on the distance of a route from the user's location to the POI, the expected time of travel from the user's location to the POI (e.g., based on traffic information/data and/or the like), and/or the like. The network apparatus 10 may generate a POI route response including a bloom filter encoding the route segment set defined by the routes from the user's current location to each of the identified POIs. The POI route response may also include information/data regarding one or more of the POIs, and/or the like. The POI route response may be provided by the network apparatus 10 such that the mobile apparatus receives the POI route response. The mobile apparatus 20 may provide the information/data regarding one or more of the POIs to the user (e.g., via the user interface 28) and decode a route to at least one of the one or more POIs (e.g., in response to the user selecting the at least one POI). FIG. 12 provides a flowchart illustrating operations performed, such as by the network apparatus 10 to provide a POI route response, in accordance with an example embodiment. FIG. 13 provides a flowchart illustrating operations performed, such as by the mobile apparatus 20 to provide a user with a results of a POI search, in accordance with an example embodiment.

i. Exemplary Operation of a Network Apparatus

Starting at block 1202, a POI request is received. For example, a network apparatus 10 may receive a POI request. For example, a network apparatus 10 may comprise means, such as processor 12, memory 14, communications interface 16, and/or the like for receiving a POI request. In various embodiments, the POI request may comprise a mobile apparatus identifier identifying the mobile apparatus that provided the route request, map version agnostic information/data identifying a starting location, query criteria, one or more parameters for the route (e.g., shortest distance, shortest expected travel time, avoid tolls, avoid highways, driving route, biking route, walking route, additional traffic information/data, and/or the like), and/or the like. In various embodiments, the information/data identifying the starting location is independent of a version of the digital map. In an example embodiment, the information/data identifying the starting location is provided as the midpoint and z-level of a mobile version segment corresponding to the current location/position of the mobile apparatus and/or a user provided origin for the route. In various embodiments, the query criteria is an indication of a type of POI the user is interested in, one or more aspects of a POI the user is interested in, and/or the like. For example, the query criteria may indicate that the user is interested in a pizzeria that is currently open.

At block 1204, the start segment of the network version of the digital map is identified. For example, the network apparatus 10 may identify the starting segment of the network version of the digital map. For example, the network apparatus 10 may comprise means, such as processor 12, memory 14, and/or the like for identifying the starting segment of the network version of the digital map. For example, the information/data identifying the starting location may be map-matched (e.g., using a map matching algorithm, engine, and/or the like) based on the network version of the digital map to identify the starting segment of the network version of the digital map. In various embodiments, the information/data identifying the starting segment may be map-matched to the network version of the digital map such that an error up to a preset error in the matching of the midpoint corresponding to the starting location to the midpoint of the corresponding segment of the network version of the digital map. The z-level corresponding to the starting location may be used for tie breaking in the case where the starting location corresponds to a tunnel, bridge, stacked roads, and/or the like. If the network apparatus cannot exactly match (e.g., within the preset error) a network version starting segment to the information/data identifying the starting location, the POI route response may include a flag indicating such.

At block 1206, a route determination algorithm is initiated at the network version starting segment. For example, the network apparatus 10 may initiate a route determination algorithm at the network version starting segment. For example, the network apparatus 10 may comprise means, such as processor 12, memory 14, and/or the like, for initiating a route determination algorithm at the network version starting segment. For example, the route determination algorithm may be best-first algorithm, such as a Dijkstra's algorithm, and/or another cost minimization algorithm.

At block 1208, the route determination algorithm is expanded to a new segment. For example, the network apparatus 10 may expand the route determination algorithm to a new segment. For example, the network apparatus 10 may comprise means, such as processor 12, memory 14, and/or the like for expanding the route determination to a new segment. For example, the route determination algorithm is expanded to a new segment that is directly connected to a segment that has already been considered in the algorithm. For example, two segments are directly connected if they are both defined by and/or are directly connected to the same intersection or node. Thus, when the route determination algorithm is expended to the new segment, the state of the route determination algorithm includes a route from the network version starting segment to the new segment. In an example embodiment, the route determination algorithm does not expand to a new segment if the entirety of the new segment is further from the network version starting segment than a maximum distance (e.g., user provided maximum distance; maximum distance determined based on whether the route is a driving route, walking route, biking route, etc.; and/or the like). The maximum distance may be a Euclidean distance (e.g., as the crow flies) or a graph distance (e.g., distance along the route from the network version starting segment to the POI).

At block 1210, it is determined if any POIs that are associated with the new segment match the query criteria. For example, the POIs associated with the new segment may be identified. For example, any POI records in the geographical database storing the map information/data of the network version of the digital map may be searched (e.g., using a segment identifier configured to identify the new segment) to identify any POIs associated with the new segment. It may then be determined if any of the POIs identified as being associated with the new segment match the query criteria. For example, the query criteria may include a POI type indicating a type of POI to be identified (e.g., coffee shop, restaurant, gas station, grocery store, ice cream shop, and/or the like), one or more keywords (e.g., pizza, Korean food, self-service gas pumps, and/or the like), a time of interest (e.g., now, 5 pm, etc.), a maximum distance from the start segment and/or a point on the start segment (e.g., Euclidean distance, graph distance, driving distance, etc.), and/or the like. In an example embodiment, a POI matches the query criteria if at least one element of the query criteria are met. For example, if the query criteria includes the POI type ice cream shop, than any POI along the new segment associated with the POI type ice cream shop may be identified as matching the query criteria. In an example embodiment, determining whether a POI matches the query criteria may include determining whether the POI is located with a maximum distance (e.g., user provided maximum distance; maximum distance determined based on whether the route is a driving route, walking route, biking route, etc.; and/or the like). The maximum distance may be a Euclidean distance (e.g., as the crow flies) or a graph distance (e.g., distance along the route from the starting segment to the POI). In an example embodiment, a POI matches the query criteria if each element of the query criteria are met. For example, if the query criteria includes the POI type ice cream shop, the keyword strawberry, and a time of interest of now, only a POI that is associated with the POI type ice cream shop, associated with the keyword strawberry, and is currently open will be identified as matching query criteria. In an example embodiment, a POI matches the query criteria if at least one element of the POI type or keyword are included in and/or indicated by the POI information/data corresponding to the POI and the POI information/data indicates that the POI is and/or will be open at the time of interest. For example, the network apparatus 10 may determine if any POIs associated with the new segment match the query criteria. For example, the network apparatus 10 may comprise means, such as processor 12, memory 14, and/or the like, for determining if any POIs associated with the new segment match the query criteria.

When it is determined that none of the POIs associated with the new segment match the query criteria, the process returns to block 1208 and the route determination algorithm is expanded to another new segment that is directly connected to segments already considered by the route determination algorithm (e.g., directly connected to the previous new segment).

When it is determined that a POI associated with the new segments matches the query criteria, the process continues to block 1212. At block 1212, the identified POI that is associated with the new segment and matches the query criteria is added to a POI list. The POI list includes all of the identified POIs corresponding to the POI request. A route from the network version starting segment to the identified POI is extracted from a state of the route determination algorithm. For example, a shortest distance and/or shortest travel time route from the network version starting segment to the identified POI is extracted from a state of the route determination algorithm. For example, the network apparatus 10 may add the identified POI (e.g., a POI identifier configured to identify the identified POI) to a list of POIs corresponding to the POI request and extract a route from the network version starting segment to the identified POI from a state of the route determination algorithm. For example, the network apparatus 10 may comprise means, such as processor 12, memory 14, and/or the like, for adding the identified POI (e.g., a POI identifier configured to identify the identified POI) to a list of POIs corresponding to the POI request and extracting a route from the network version starting segment to the identified POI from a state of the route determination algorithm. For example, the route may be an ordered list of segment identifiers identifying the route segments extending between the network version starting segment and the identified POI.

At block 1214, it is determined if the number of identified POIs in the list of POIs has reached and/or surpassed a particular number N. For example, the POI request may indicate that the particular number N of POIs should be returned in response to the request. In another example, the particular number N of POIs may be preset. For example, the particular number N may be five, ten, fifteen, twenty, and/or the like. For example, the network apparatus 10 may determine if the number of identified POIs in the list of POIs has reached and/or surpassed a particular number N. for example, the network apparatus 10 may comprise means, such as processor 12, memory 14, and/or the like for determining whether the number of identified POIs in the list of POIs has reached and/or surpassed the particular number N.

In an example embodiment, it may be determined whether all segments within a maximum distance (e.g., Euclidean distance, graph distance, driving distance, and/or the like) have been considered. When it is determined that all of the segments within the maximum distance have been considered, the process may continue to block 1216, even if the number of identified POIs in the list of POIs has not yet reached and/or surpassed the particular number N. when it is determined that not all of the segments within the maximum distance have been considered, the process may continue to block 1208.

When it is determined that the number of identified POIs in the list of POIs has not yet reached and/or surpassed the particular number N, the process returns to block 1208 and the route determination algorithm is expanded to another new segment that is directly connected to segments already considered by the route determination algorithm (e.g., directly connected to the previous new segment).

When it is determined that the number of identified POIs in the list of POIs has reached and/or surpassed the particular number N, the process continues to block 1216. At block 1216, a bloom filter encoding the route segment set corresponding to routes from the network version starting segment to each of the identified POIs of the POI list is produced. For example, one route segment set may be defined that includes only the route segments of each route from the network version starting segment to one of the identified POIs. For example, one bloom filter may be used to encode the route segment set comprising route segments of routes to each of the particular number N of identified POIs. For example, map information/data may be accessed from the geographical database storing map information/data of the network version of the digital map such that a map version agnostic identifier may be generated for each route segment of the routes from the network version starting segment to the identified POIs. The map version agnostic identifiers may be coded (e.g., using k coding functions) and the resulting coded map version agnostic identifiers are added to the bloom filter. For example, a bloom filter encoding the route segment set defined by the route segments of each of the routes from the network version starting segment to the identified POIs is produced. In an example embodiment, the bloom filter may be produced in a manner similar to that described with respect to FIG. 4. For example, the network apparatus 10 may produce a bloom filter encoding the route segment set defined by the routes from the network version starting segment to each of the identified POIs. For example, the network apparatus 10 may comprise means, such as processor 12, memory 14, and/or the like, for producing a bloom filter encoding the route segment set defined by the routes from the network version stating segment to each of the identified POIs.

At block 1218, a POI route response is generated and provided. For example, the network apparatus 10 may generate and provide (e.g., transmit) a POI route response. For example, the network apparatus 10 may comprise means, such as processor 12, memory 14, communications interface 16, and/or the like for generating and providing the POI route response such that the mobile apparatus 20 receives the route response. In various embodiments, the POI route response comprises the bloom filter (e.g., as a bit array). In an example embodiment, the POI route response comprises information/data identifying a network version starting location. In various embodiments, the information/data identifying the network version starting location is map version agnostic. For example, in an example embodiment, the information/data identifying the network version starting location is the midpoint of (or other point along) the network version starting segment and the z-level of the network version starting segment. In various embodiments, the POI route response includes a POI table or list. In an example embodiment, the POI table or list includes a length of the route from the network version starting segment to the corresponding POI, information/data identifying the corresponding POI (e.g., name of the POI, a street address for the POI, a geolocation (e.g., latitude and longitude) of the POI, and/or the like), one or more ratings for the corresponding POI, information/data identifying a target location for each POI, and/or the like. In an example embodiment, information/data identifying the target location for a POI may be map version agnostic information/data identifying the network version segment associated with the POI. For example, information/data identifying the target location for a POI may be a midpoint of (or other point along) the network version target segment corresponding to the POI and the z-level of the network version target segment corresponding to the POI.

ii. Exemplary Operation of a Mobile Apparatus

Starting at block 1302, a POI request is generated and provided such that the network apparatus 10 receives the POI request. For example, the mobile apparatus 20 may generate and provide (e.g., transmit) a POI request. For example, the mobile apparatus 20 may comprise means, such as processor 22, memory 24, communications interface 26, user interface 28, location sensor 29, and/or the like, for generating and providing a POI request.

In various embodiments, the POI request may comprise a mobile apparatus identifier identifying the mobile apparatus that provided the route request, map version agnostic information/data identifying a starting location, query criteria, one or more parameters for the route (e.g., shortest distance, shortest expected travel time, avoid tolls, avoid highways, driving route, biking route, walking route, additional traffic information/data, and/or the like), and/or the like. In various embodiments, the information/data identifying the starting location is independent of a version of the digital map. In an example embodiment, the information/data identifying the starting location is provided as the midpoint and z-level of a mobile version segment corresponding to the current location/position of the mobile apparatus and/or a user provided origin for the route. In various embodiments, the query criteria is an indication of a type of POI the user is interested in, one or more aspects of a POI the user is interested in, and/or the like. For example, the query criteria may indicate that the user is interested in a pizzeria that is currently open.

For example, a user may interact with the user interface 28 and request a POI search. For example, the user may operate the user interface 28 to indicate (e.g., provide, select, and/or the like) an origin of the search, one or more elements of query criteria (e.g., a POI type, keyword(s), time of interest, and/or the like), and/or one or more parameters for the route (e.g., shortest distance, shortest expected travel time, avoid tolls, avoid highway, driving route, biking route, walking route, and/or the like). The user may then operate the user interface 28 to submit the user provided and/or selected information/data and to initiate the generation of the POI request. In an example embodiment, the origin of the route is the current location of the mobile apparatus 20 as determined by one or more location sensors 29 of the mobile apparatus.

As noted above, the mobile apparatus 20 may receive (e.g., via user interface 28 and/or from location sensor 29) an origin of the POI search. The mobile apparatus 20 may then map match the origin of the POI search to a segment of the mobile version of the digital map. This mobile version starting segment (e.g., a segment of a mobile version of the digital map to which the origin has been map-matched) is used to determine the map version agnostic information/data identifying the starting location. In an example embodiment, the information/data identifying the starting location is provided as the midpoint and z-level of the mobile version starting segment. The midpoint of a segment is the coordinate pair (e.g., latitude and longitude) of the point that is approximately halfway down the segment, where the ends of the road segment are defined by intersections or nodes. For example, the midpoint of a segment is a point in the middle of the segment between the two intersections that define the ends of the segment. The z-level of a segment describes the relative location of roads that are stacked. For most segments, the z-level is 0 (e.g., unstacked and/or on ground level); however, for tunnels the z-level might be negative and for stacked roads/bridges z-level might be positive.

At block 1304, a POI route response is received. For example, the network apparatus 10 may generate and provide a POI route response, in response to the POI request, and provide the POI route response such that the mobile apparatus 20 receives the POI route response. For example, the mobile apparatus 20 may receive the POI route response. For example, the mobile apparatus 20 may comprise means, such as processor 22, memory 24, communications interface 26, and/or the like for receiving the POI route response. In various embodiments, the POI route response comprises bloom filter (e.g., as a bit array) encoding a route segment set defined by routes from the network version starting segment to each of the POIs identified in the POI search. In an example embodiment, the POI route response comprises information/data identifying a network version starting location. In various embodiments, the information/data identifying the network version starting location is map version agnostic. For example, in an example embodiment, the information/data identifying the network version starting location is the midpoint of (or other point along) the network version starting segment and the z-level of the network version starting segment. In various embodiments, the POI route response includes a POI table or list. In an example embodiment, the POI table or list includes a length of the route from the network version starting segment to the corresponding POI, information/data identifying the corresponding POI (e.g., name of the POI, a street address for the POI, a geolocation (e.g., latitude and longitude) of the POI, and/or the like), one or more ratings for the corresponding POI, information/data identifying a target location for each POI, and/or the like. In an example embodiment, information/data identifying the target location for a POI may be map version agnostic information/data identifying the network version segment associated with the POI. For example, information/data identifying the target location for a POI may be a midpoint of (or other point along) the network version target segment corresponding to the POI and the z-level of the network version target segment corresponding to the POI.

At block 1306, a decoded starting segment and decoded target segment for each POI of the POI table or list are identified. For example, the mobile apparatus 20 may identify and/or determine a decoded starting segment and a decoded target segment for each POI using the mobile version of the digital map. For example, the mobile apparatus 20 may comprise means, such as processor 22, memory 24, and/or the like, for identifying and/or determining a decoded starting segment and a decoded target segment for each POI using the mobile version of the digital map. For example, the map version agnostic information/data identifying the network version starting location may be map-matched using the mobile version of the digital map to identify a decoded starting segment corresponding to the network version starting location. Similarly, the map version agnostic information/data identifying the network version target location for each POI of the POI table or list may be map-matched using the mobile version of the digital map to identify a decoded target location corresponding to the network version target location for each POI.

At block 1308, map information/data is accessed from the mobile version of the digital map for assigning cost values to segments of the mobile version of the digital map. For example, the mobile apparatus 20 may access map information/data from a geographic database storing map information/data of the mobile version of the digital map from memory 24.

In various embodiments, the cost value assigned to a segment is determined based on whether the segment satisfies the bloom filter. For example, if a coded map version agnostic identifier corresponding to a first segment satisfies the bloom filter, the first segment is assigned a minimal cost value. For example, the first segment may be assigned a cost value of zero. However, if the coded map version agnostic identifier corresponding to the first segment does not satisfy the bloom filter, the first segment is assigned a positive cost value (e.g., based on the length of the segment, expected time of traversal for the segment, a current or expected traffic level for the segment, and/or the like). Thus, accessing map information/data for use in assigning cost values to segments further includes accessing map information/data from the mobile version of the digital map that may be used for determining if a segment satisfies the bloom filter. For example, a segment record corresponding to a segment may be accessed and map version agnostic information/data may be extracted therefrom. In an example embodiment, elements of the segment record to be accessed for generating a map version agnostic identifier for the segment are pre-established and/or defined. In particular, the elements of the segment record to be accessed for use in generating a map version agnostic identifier are the same elements of the network version of the digital map used by the network apparatus to generate the map version agnostic identifiers that were coded to produce the bloom filter. For example, the map version agnostic identifier may be generated using a map version agnostic identifier algorithm and the mobile apparatus 20 and the network apparatus 10 may use the same map version agnostic identifier algorithm. For example, the map version agnostic map information/data accessed may include a road name, segment length, a direction of travel of a segment, a functional class of a segment, speed limit, segment midpoint, and/or the like, in various embodiments.

The map version agnostic map information/data corresponding to a segment may then be used to generate a map version agnostic identifier for the segment. For example, the accessed map version agnostic information/data corresponding to a segment may be combined in a pre-established and/or defined manner (e.g., in the same manner as the generation of the map version agnostic identifiers where generated by the network apparatus 10) to generate a map version agnostic identifier configured to identify the segment. The map version agnostic identifier may then be used to determine if the corresponding segment satisfies the bloom filter. If the segment satisfies the bloom filter, the segment is assigned a minimal (e.g., zero) cost value. If the segment does not satisfy the bloom filter, the segment may be assigned a cost value based on map information/data. For example, the accessed map information/data may include map information/data that may be used to assign a cost value to a segment of the mobile version of the digital map. In an example embodiment, the cost value assigned to a segment may be the length of the segment, the expected time to traverse the segment, a traffic level indicator, and/or the like, as described above.

In an example embodiment, block 1308 may be performed concurrently with block 1310 such that the map information/data for assigning a cost value to a first segment is accessed when a route determining algorithm is expanded to the first segment. For example, map information/data for assigning a cost value to a first segment may be accessed and the cost value assigned to the first segment based thereon, in response to a route determining algorithm considering whether the first segment is part of the decoded route.

At block 1310, a decoded route for each POI of the POI table or list is determined by identifying the lowest cost route from the decoded starting segment to the decoded target segment corresponding to the POI is determined. For example, the mobile apparatus 20 may determine a decoded route to each of the POIs of the POI table or list by determining the lowest cost route from the decoded starting segment to the decoded target segment corresponding to the POI. For example, the mobile apparatus 20 may comprise means, such as processor 22, memory 24, and/or the like, for determining a decoded route by determining the lowest cost route to each of the POIs of the POI table or list from the decoded starting segment to the decoded target segment corresponding to the POI. For example, the lowest cost route corresponding to a POI may be determined based on the cost value assigned to segments between the decoded starting segment and the decoded target segment corresponding to the POI. In various embodiments, a best-first algorithm may be used to determine the decoded route. In an example embodiment, a version of Dijkstra's algorithm may be used to determine the decoded route.

In various embodiments, the POI table and/or list includes information/data regarding a particular number N POIs. In an example embodiment, a decoded route is determined to each of the particular number N POIs. For example, N routes may be decoded based on the bloom filter. In an example embodiment, the POIs may be presented to the user (e.g., via the user interface 28) prior to determining the decoded route(s) and a decoded route is determined responsive to receiving user input selecting one of the POIs from the particular number N POIs. In such an embodiment, a decoded route may only be determined for the user-selected POI.

At block 1312, it is determined if the decoded routes satisfy one or more quality measures. In an example embodiment, the one or more quality measures comprise the length of a first decoded route corresponding to a first POI being similar to the route length provided as part of the POI table or list corresponding to the first POI. For example, a decoded route length corresponding to a first POI may be determined and compared to the route length provided by the POI route response corresponding to the first POI. In an example embodiment, the decoded route length is determined by summing the length of each segment in the decoded route based on the mobile version of the digital map. For example, it may be determined if the decoded route length and the route length corresponding to the same POI satisfy a similarity threshold requirement. In an example embodiment, the ratio of the decoded route length and the route length may be compared to a similarity range to determine if the decoded route length and the route length satisfy a similarity threshold requirement. For example, if the ratio of the decoded route length to the route length corresponding to the same POI is in within the similarity range, it may be determined that the decoded route is an acceptable route. If the ratio of the decoded route length to the route length corresponding to the same POI is not within the similarity range, it may be determined that the decoded route is not an acceptable route. In various embodiments, the similarity range is a predetermined range. In some example embodiments, the similarity range is 0.7 to 1.3, 0.75 to 1.25, 0.8 to 1.2, 0.85 to 1.15, 0.9 to 1.1, and/or 0.95 to 1.05. For example, the mobile apparatus 20 may determine if the decoded route length corresponding to the first POI and the route length corresponding to the first POI satisfy a similarity threshold requirement. For example, the mobile apparatus 20 may comprise means, such as processor 22, memory 24, and/or the like, for determining if the decoded route length and the route length corresponding to the same POI satisfy the similarity threshold requirement.

In an example embodiment, the one or more quality measures may include determining whether the number of elements in the bloom filter that the mobile apparatus 20 cannot resolve satisfies a quality threshold requirement. When the number of elements of the bloom filter that cannot be resolved by the mobile apparatus 20 fails to satisfy a quality threshold requirement (e.g., exceeds a quality threshold number), it may be determined that the decoded route fails to satisfy a quality measure.

When it is determined that the decoded route satisfies the one or more quality measures (e.g., the decoded route length corresponding to a POI and the route length corresponding to the POI satisfy the similarity threshold requirement) for each POI, the process continues to block 1314 and information/data regarding one or more POIs of the POI table or list is provided to a user of the mobile apparatus 20 (e.g., via the user interface 28). For example, the mobile apparatus 20 may provide information/data regarding one or more POIs of the POI table or list to a user. For example, the mobile apparatus 20 may comprise means, such as processor 22, memory 24, communications interface 26, user interface 28, sensors 29, and/or the like, for (responsive to determining that the decoded route satisfies the one or more quality measures) providing information/data regarding one or more POIs of the POI table or list to a user. In an example embodiment, the mobile apparatus 20 may filter the POIs provided to the user based on distance from the user's location. For example, the decoded route length corresponding to a POI and/or the route length corresponding to the POI (e.g., provided as part of the POI route response) may be used to filter the POIs provided to the user based on a distance criteria (e.g., Euclidean distance, graph distance, driving distance, and/or the like).

FIG. 14 provides an example POI search result IUI 1400 provided via a user interface 28, in an example embodiment. The POI search result IUI 1400 comprises a map portion 1402, showing the location of one or more POIs of the POI table or list based on map visualization information/data of the mobile version of the digital map. For example, a POI location indicator 1408 may indicate the location of a POI on the map. For example, a user location indicator 1406 may indicate the current location of the mobile apparatus 20 on the map. In an example embodiment, the POI search result IUI 1400 comprises a POI results listing portion 1404. In an example embodiment, the POI results listing portion 1404 provides an overview of information/data regarding one or more POIs of the POI table or list. For example, the overview of information/data regarding one or more POIs may include a POI name (e.g., the name of an establishment or other POI), a cost level indicator, a rating, a travel distance of the corresponding (decoded) route, a travel time of the corresponding (decoded) route, and/or the like, for each of the one or more POIs. In an example embodiment, a user may select a first POI from the one or more POIs by selecting the information/data regarding the first POI in the POI results listing portion 1404 and/or by selecting the POI location indicator 1408 of the map portion 1402 of the POI search result IUI 1400.

Responsive to receiving user input selecting one of the one or more POIs, the mobile apparatus 20 may use the decoded route corresponding to the user-selected POI to perform one or more navigation functions. Some non-limiting examples of navigation functions include providing a route (e.g., via a user interface), localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

When it is determined that at least one of decoded routes does not satisfy at least one quality measure (e.g., the decoded route length and the route length corresponding to the same POI do not satisfy the similarity threshold requirement), the process continues to block 1316 of FIG. 13. At block 1316, the at least one route is rejected and a new POI route response is requested. For example, the mobile apparatus 20 may rejected the route and request a new POI route response. For example, the mobile apparatus 20 may comprise means, such as processor 22, memory 24, communications interface 26, and/or the like for (responsive to determining that the decoded route fails to satisfy at last one quality measure) rejecting the route and requesting a new POI route response. For example, the mobile apparatus 20 may generate an updated and/or modified POI request and provide (e.g., transmit) the updated and/or modified POI request such that the network apparatus 10 receives the updated and/or modified POI request. In response to the updated and/or modified POI request, the network apparatus 10 may generate a new route to at least one POI, encode a route segment set defined by the same set of routes or the new or modified set of routes with a larger bloom filter (e.g., a bit array having more bits than the previously provided bloom filter) and/or the like. The network apparatus 10 may then provide an updated and/or modified POI route response comprising the new bloom filter, and/or the like. The mobile apparatus 20 receives the updated and/or modified POI route response and determines an updated and/or modified decoded route to at least one POI. In an example embodiment, the mobile apparatus 20 determines if the updated and/or modified decoded route to the at least one POI satisfies one or more quality measures to determine if the updated and/or modified decoded route is to be accepted or rejected and another updated and/or modified POI request is to be generated and provided.

E. Parking Cruise Route

In various embodiments, a user may interact with a mobile apparatus 20 (e.g., via the user interface 28) to request a parking cruise route. In an example embodiment, the mobile apparatus 20 may automatically request a parking cruise route when the mobile apparatus 20 is approaching the destination of a route. In various embodiments, a parking cruise route is a route along which it is expected that parking may be found. In various embodiments, a parking cruise route is a route along which it is expected that on-road parking may be found. In an example embodiment, it is expected that parking will be found along the parking cruise route within a maximum distance of a destination, maximum walking time from the destination, maximum cruising time, and/or the like. FIG. 15 provides a flowchart illustrating operations performed, such as by the network apparatus 10 to provide a parking cruise route response, in accordance with an example embodiment. FIG. 16 provides a flowchart illustrating operations performed, such as by the mobile apparatus 20 to decode and use a parking cruise route, in accordance with an example embodiment.

i. Exemplary Operation of a Network Apparatus

Starting at block 1502 of FIG. 15, a parking cruise request is received. For example, a network apparatus 10 may receive a parking cruise request. For example, a network apparatus 10 may comprise means, such as processor 12, memory 14, communications interface 16, and/or the like for receiving a parking cruise request. In various embodiments, the parking cruise request may comprise a mobile apparatus identifier identifying the mobile apparatus that provided the route request, a parking time (e.g., the time at which parking is desired), map version agnostic information/data identifying a starting location, a maximum distance from a destination, a maximum walking time from a destination, a maximum cruising time (e.g., time expected for a parking spot to be found), a destination near which parking is desired, and/or the like. In various embodiments, the information/data identifying the starting location is independent of a version of the digital map. In an example embodiment, the information/data identifying the starting location is provided as the midpoint and z-level of a mobile version segment corresponding to the current location/position of the mobile apparatus and/or a user provided origin for the route. In various embodiments, the destination near which the user would like to park is provided in a map version agnostic manner. For example, the destination may be provided as geolocation (e.g., latitude and longitude).

At block 1504, the network version start segment is identified. For example, the network apparatus 10 may identify the network version starting segment. For example, the network apparatus 10 may comprise means, such as processor 12, memory 14, and/or the like for identifying the network version starting segment. For example, the information/data identifying the starting location may be map-matched (e.g., using a map matching algorithm, engine, and/or the like) based on the network version of the digital map to identify the network version starting segment. In various embodiments, the information/data identifying the starting location may be map-matched to the network version of the digital map such that an error up to a preset error in the matching of the midpoint corresponding to the starting location to the midpoint of the corresponding segment of the network version of the digital map is tolerated. The z-level corresponding to the starting location may be used for tie breaking in the case where the starting location corresponds to a tunnel, bridge, stacked roads, and/or the like. If the network apparatus cannot exactly match (e.g., within the preset error) a network version starting segment to the information/data identifying the starting location, the POI route response may include a flag indicating such.

At block 1506, parking information/data and traffic information/data for segments in the vicinity of the destination are accessed. For example, parking and traffic information/data may be accessed (e.g., from a geographic database stored in the memory 14 that stores map information/data corresponding to a network version of a digital map) for segments within the maximum distance from the destination. For example, the network apparatus 10 may access parking and traffic information/data for segments in the vicinity of the destination. For example, the network apparatus 10 may comprising means, such as processor 12, memory 14, communications interface 16, and/or the like, for accessing parking and traffic information/data for segments in the vicinity of the destination. For example, the parking information/data may indicate the probability of finding parking (e.g., on-road parking) on the corresponding segment during a particular epoch (e.g., time window of a day, week, month, year, and/or the like). In an example embodiment, the traffic information/data may provide a travel speed and/or indication thereof (e.g., free flow ratio, and/or the like) along the corresponding segment during a particular epoch. The parking and/or traffic information/data may be accessed corresponding to a particular epoch that corresponds to the parking time. In various embodiments, a variety of other information/data regarding the segments within the vicinity of the destination may be accessed from the network version of the digital map, including, for example, a segment length.

At block 1508, a route determination algorithm is imitated at the network version starting segment. For example, the network apparatus 10 may initiate a route determination algorithm at the network version starting segment. For example, the network apparatus 10 may comprise means, such as processor 12, memory 14, and/or the like, for initiating a route determination algorithm at the network version starting segment. For example, the route determination algorithm may be best-first algorithm, such as a Dijkstra's algorithm, and/or the like. In various embodiments, the route determination algorithm is configured to find a lowest cost route.

At block 1510, the route determination algorithm is expanded to a new segment. For example, the network apparatus 10 may expand the route determination algorithm to a new segment. For example, the network apparatus 10 may comprise means, such as processor 12, memory 14, and/or the like for expanding the route determination to a new segment. For example, the route determination algorithm is expanded to a new segment that is directly connected to a segment that has already been considered in the algorithm. For example, two segments are directly connected if they are both defined by and/or are directly connected to the same intersection or node. Thus, when the route determination algorithm is expended to the new segment, the state of the route determination algorithm includes a route from the network version starting segment to the new segment.

At block 1512, it is determined if the cost of traversing a route from the network version starting segment to the new segment is greater than a maximum cost value. In an example embodiment, the maximum cost value is the maximum distance from the destination and the cost of traversing a first segment is the length of the segment. In an example embodiment, the maximum cost value is the expected time before finding parking when traversing the route from the network version starting segment to the new segment. For example, the cost for traversing a first segment may be $$\frac{\ell}{(\min(v_c, v_t))} *(1-P),$$

where $\ell$ is the length of the first segment, P is probability of finding parking along the first segment at the parking time (e.g., the time that it is expected the user will be seeking parking), $v_c$ is a cruising cap speed (e.g., the speed it is expected a user would drive when searching for a parking spot) and $v_t$ is the traffic speed along the first segment at the parking time. For example, P may be determined based on the accessed parking information/data corresponding to the first segment and $v_t$ may be determined based on the accessed traffic information/data corresponding to the first segment. For example, the cost of a route may be determined by summing the cost value for each segment of the route. For example, the network apparatus 10 may determine if the cost of traversing a route from the network version starting segment to the new segment is greater than the maximum cost. For example, the network apparatus 10 may comprise means, such as processor 12, memory 14, and/or the like, for determining whether the cost of traversing a route from the network version starting segment to the new segment is greater than the maximum cost. In various embodiments, the maximum cost may be determined based on an element of the parking cruise request or may be a predetermined value.

When it is determined that the cost of traversing the route from the network version starting segment to the new segment is greater than the maximum cost, the process returns to block 1508 and the route determination begins another exploration of the map starting at the network version starting segment. In particular, if the cost of traversing the route from the network version starting segment to the new segment is greater than the maximum cost, it is expected that parking will not be found along the route within the maximum distance of the destination, within a maximum walking time from the destination, or within a maximum cruising time. The route determination algorithm will then attempt to find a new route with a higher probability of parking.

When it is determined that the cost of traversing the route from the network version starting segment to the new segment is not greater than the maximum cost, the process continues to block 1514. At block 1514, it is determined whether the probability of finding parking along the route from the network version starting segment to the new segment is approximately one hundred percent. For example, the network apparatus 10 may determine if it is likely that parking will be found along the route from the network version starting segment to the new segment. For example, the network apparatus 10 may comprise means, such as processor 12, memory 14, and/or the like, for determining whether it is likely that parking will be found along the route from the network version starting segment to the new segment. For example, it may be determined if the likelihood that parking will be found along the route from the network version starting segment to the new segment (during the particular epoch) satisfies a threshold probability requirement. In an example embodiment, a route satisfies a threshold probability requirement when the likelihood that parking will be found along the route exceeds a threshold probability. In various embodiments, the threshold probability is 80%, 85%, 90%, 95%, 99%, and/or the like.

When it is determined that the route from the network version starting segment to the new segment does not satisfy the threshold probability requirement, the process returns to block 1510 and the route determination algorithm is expanded to another new segment that is directly connected to segments already considered by the route determination algorithm (e.g., directly connected to the previous new segment).

When it is determined that the route from the network version starting segment to the new segment does satisfy the threshold probability requirement, the new segment is set as the network version target segment for the parking cruise route and the process continues to block 1516. At block 1516, the parking cruise route is extracted from a state of the route determination algorithm. For example, the route from the network version starting segment to the new segment is extracted from the state of the route determination algorithm as the parking cruise route. For example, the network apparatus 10 may extract the route from the network version starting segment to the new segment is extracted from the state of the route determination algorithm as the parking cruise route. For example, the network apparatus 10 may comprise means, such as processor 12, memory 14, and/or the like for extracting route from the network version starting segment to the new segment is extracted from the state of the route determination algorithm as the parking cruise route. A route segment set is defined based one the parking cruise route and the route segments thereof.

At block 1518, a bloom filter encoding the route segment set defined by the parking cruise route is produced. For example, the network apparatus 10 may produce a bloom filter encoding the route segment set defined by the parking cruise route. For example, the network apparatus 10 may comprise means, such as processor 12, memory 14, and/or the like, for producing a bloom filter encoding the route segment set defined by the parking cruise route. For example, map version agnostic identifiers may be generated for each route segment of the parking cruise route. The map version agnostic identifiers of the route segments may then be coded (e.g., using the k coding functions) and used to build a bloom filter. The bloom filter may then be tested to ensure that none of the adjacent segments of the parking cruise route satisfy the bloom filter. For example, a bloom filter encoding the route segment set for the parking cruise route may be produced as described above with respect to FIG. 4.

At block 1520, a parking cruise route response may be generated and provided. In an example embodiment, the parking cruise route response includes the bloom filter encoding the route segment set defined by the parking cruise route. For example, the network apparatus 10 may generate and provide a parking cruise route response including the bloom filter encoding the route segment set defined by the parking cruise route. For example, the network apparatus 10 may comprise means, such as processor 12, memory 14, communications interface 16, and/or the like for generating and providing (e.g., transmitting) a parking cruise route response including the bloom filter encoding the route segment set defined by the parking cruise route. In an example embodiment, the parking cruise route response may further include a route length of the parking cruise route, information/data identifying a network version starting location of the route, information/data identifying a network version target location of the route, and/or the like. As should be understood, the information/data identifying the network version starting and target locations of the parking cruise route is map version agnostic. For example, in an example embodiment, the information/data identifying the network version starting location is the midpoint of (or other point along) the network version starting segment and the z-level of the network version starting segment, and the information/data identifying the network version target segment is the midpoint of (or other point along) the network version target segment and the z-level of the network version target segment. In various embodiments, the parking cruise route response is provided such that the mobile apparatus 20 that provided the parking cruise request (e.g., as indicated by the mobile apparatus identifier provided in the parking cruise request) receives the parking cruise route response.

ii. Exemplary Operation of a Mobile Apparatus

Starting at block 1602 of FIG. 16, a parking cruise request is generated and provided such that the network apparatus 10 receives the parking cruise request. For example, the mobile apparatus 20 may generate and provide (e.g., transmit) a parking cruise request. For example, the mobile apparatus 20 may comprise means, such as processor 22, memory 24, communications interface 26, user interface 28, location sensor 29, and/or the like, for generating and providing a parking cruise request. In various embodiments, the parking cruise request may comprise a mobile apparatus identifier identifying the mobile apparatus 20, map version agnostic information/data identifying a starting location, a maximum distance from a destination, a maximum walking time from a destination, a maximum cruising time (e.g., time expected for a parking spot to be found), a destination near which parking is desired, a parking time (e.g., the time at which parking is desired), and/or the like. In various embodiments, the information/data identifying the starting location is independent of a version of the digital map. In an example embodiment, the information/data identifying the starting location is provided as the midpoint and z-level of a mobile version segment corresponding to the current location/position of the mobile apparatus and/or a user provided origin for the route. In various embodiments, the destination near which the user would like to park is provided in a map version agnostic manner. For example, the destination may be provided as geolocation (e.g., latitude and longitude), address (e.g., a street address), a street name, a POI name (e.g., city hall, Aden's Famous Ice Cream), and/or the like.

For example, a user may interact with the user interface 28 and request a parking cruise route. For example, the user may, operate the user interface 28 to indicate (e.g., provide, select, and/or the like) a destination near which parking is desired, a maximum distance from a destination, a maximum walking time from a destination, a maximum cruising time (e.g., time expected for a parking spot to be found), a parking time, and/or the like. The user may then operate the user interface 28 to submit the user provided and/or selected information/data and to initiate the generation of the parking cruise request. In an example embodiment, the origin of the route is the current location of the mobile apparatus 20 as determined by one or more location sensors 29 of the mobile apparatus. In an example, embodiment, one or more of the parking time, maximum distance from a destination, a maximum walking time from a destination, or a maximum cruising time (e.g., time expected for a parking spot to be found) may be automatically determined based on user preferences (e.g., stored in a user profile corresponding to the user or stored by the mobile apparatus 20). In an example embodiment, the mobile apparatus 20 may automatically generate and provide (e.g., transmit) a parking cruise request when the mobile apparatus 20 is approaching a destination (e.g., without user input or only with user input confirming that a parking cruise request should be generated). For example, the mobile apparatus 20 (e.g., based on location information/data determined by location sensor 29) may determine that the mobile apparatus 20 is within a threshold distance and/or a threshold travel time of the destination and, responsive thereto, generate and provide a parking cruise request.

As noted above, the mobile apparatus 20 may receive (e.g., via user interface 28 and/or from location sensor 29) an origin of the parking cruise route. The mobile apparatus 20 may then map match the origin of the parking cruise route to a segment of the mobile version of the digital map. This mobile version starting segment (e.g., a segment of a mobile version of the digital map to which the origin has been map-matched) is used to determine the map version agnostic information/data identifying the starting location. In an example embodiment, the information/data identifying the starting location is provided as the midpoint and z-level of the mobile version starting segment. The midpoint of a segment is the coordinate pair (e.g., latitude and longitude) of the point that is approximately halfway down the segment, where the ends of the road segment are defined by intersections or nodes. For example, the midpoint of a segment is a point in the middle of the segment between the two intersections that define the ends of the segment. The z-level of a segment describes the relative location of roads that are stacked. For most segments, the z-level is 0 (e.g., unstacked and/or on ground level); however, for tunnels the z-level might be negative and for stacked roads/bridges z-level might be positive.

At block 1604, a parking cruise route response is received. For example, the network apparatus 10 may generate and provide a parking cruise route response, in response to the parking cruise request, and provide the parking cruise route response such that the mobile apparatus 20 receives the parking cruise route response. For example, the mobile apparatus 20 may receive the parking cruise route response. For example, the mobile apparatus 20 may comprise means, such as processor 22, memory 24, communications interface 26, and/or the like for receiving the parking cruise route response. In an example embodiment, the parking cruise route response includes a bloom filter (e.g., as a bit array) encoding the route segment set defined by the parking cruise route determined by the network apparatus 10. In an example embodiment, the parking cruise route response may further include a route length of the parking cruise route, information/data identifying a network version starting location of the route, information/data identifying a network version target location of the route, and/or the like. As should be understood, the information/data identifying the network version starting and target locations of the parking cruise route is map version agnostic. For example, in an example embodiment, the information/data identifying the network version starting location is the midpoint of (or other point along) the network version starting segment and the z-level of the network version starting segment, and the information/data identifying the network version target segment is the midpoint of (or other point along) the network version target segment and the z-level of the network version target segment.

At block 1606, a decoded starting segment and decoded target segment for the parking cruise route are identified. For example, the mobile apparatus 20 may identify and/or determine a decoded starting segment and a decoded target segment for the parking cruise route using the mobile version of the digital map. For example, the mobile apparatus 20 may comprise means, such as processor 22, memory 24, and/or the like, for identifying and/or determining a decoded starting segment and a decoded target segment for the parking cruise route using the mobile version of the digital map. For example, the map version agnostic information/data identifying the network version starting location may be map-matched using the mobile version of the digital map to identify a decoded starting segment corresponding to the network version starting location. Similarly, the map version agnostic information/data identifying the network version target location may be map-matched using the mobile version of the digital map to identify a decoded target location corresponding to the network version target location.

At block 1608, traffic and/or parking information/data is accessed. For example, the mobile apparatus 20 may access traffic and/or parking information/data. For example, the network apparatus 20 may comprise means, such as processor 22, memory 24, and/or the like, for accessing traffic and/or parking information/data. In various embodiments, the traffic and/or parking information/data is accessed for segments near and/or between the decoded starting segment and the decoded target segment for an epoch corresponding to the parking time. For example, the parking information/data may indicate the probability of finding parking (e.g., on-road parking) on the corresponding segment during a particular epoch (e.g., time window of a day, week, month, year, and/or the like) corresponding to the parking time. In an example embodiment, the traffic information/data may provide a travel speed and/or indication thereof (e.g., free flow ratio, and/or the like) along the corresponding segment during a particular epoch corresponding to the parking time. In various embodiments, the traffic and/or parking information/data is accessed from a geographic database (e.g., stored in memory 24) storing map information/data of the mobile version of the digital map. For example, the traffic and/or parking information/data accessed for a first segment may include P, the probability of finding parking along the first segment during an epoch corresponding to the parking time (e.g., the time that it is expected the user will be seeking parking), and $v_t$, the traffic speed along the first segment during an epoch corresponding to the parking time.

At block 1610, map information/data from the mobile version of the digital map for generating map version agnostic identifiers for segments is accessed. For example, the mobile apparatus 20 may access map information/data from a geographic database storing map information/data of the mobile version of the digital map from memory 24.

In various embodiments, the cost value assigned to a segment is determined based on whether the segment satisfies the bloom filter. For example, if a coded map version agnostic identifier corresponding to a first segment satisfies the bloom filter, the first segment is assigned a minimal cost value. For example, the first segment may be assigned a cost value of zero. However, if the coded map version agnostic identifier corresponding to the first segment does not satisfy the bloom filter, the first segment is assigned a positive cost value (e.g., based on the length of the segment, expected time of traversal for the segment, a current or expected traffic level for the segment, the probability of finding parking along the segment, and/or the like). Thus, map information/data for generating map version agnostic identifiers for segments may be accessed from the mobile version of the digital map for use in determining whether a segment satisfies the bloom filter. For example, a segment record corresponding to a segment may be accessed and map version agnostic information/data may be extracted therefrom. In an example embodiment, elements of the segment record to be accessed for generating a map version agnostic identifier for the segment are pre-established and/or defined. In particular, the elements of the segment record to be accessed for use in generating a map version agnostic identifier are the same elements of the network version of the digital map used by the network apparatus to generate the map version agnostic identifiers that were coded to produce the bloom filter. For example, the map version agnostic identifier may be generated using a map version agnostic identifier algorithm and the mobile apparatus 20 and the network apparatus 10 may use the same map version agnostic identifier algorithm. For example, the map version agnostic identifier may be generated using a map version agnostic identifier algorithm and the mobile apparatus 20 and the network apparatus 10 may use the same map version agnostic identifier algorithm. For example, the map version agnostic map information/data accessed may include a road name, segment length, a direction of travel of a segment, a functional class of a segment, speed limit, segment midpoint, and/or the like, in various embodiments.

The map version agnostic map information/data corresponding to a segment may then be used to generate a map version agnostic identifier for the segment. For example, the accessed map version agnostic information/data corresponding to a segment may be combined in a pre-established and/or defined manner (e.g., in the same manner as the generation of the map version agnostic identifiers where generated by the network apparatus 10) to generate a map version agnostic identifier configured to identify the segment. The map version agnostic identifier may then be used to determine if the corresponding segment satisfies the bloom filter. If the segment satisfies the bloom filter, the segment is assigned a minimal (e.g., zero) cost value. If the segment does not satisfy the bloom filter, the segment may be assigned a cost value based on map information/data (e.g., length of the segment, probability of finding (on-road) parking along the segment during an epoch corresponding to the parking time, travel speed along the segment during an epoch corresponding to the parking time, and/or the like). In an example embodiment, the cost value assigned to a segment may be the length of the segment divided by the travel speed along the segment during an epoch corresponding to the parking time (e.g., $\ell/v_t$). In an example embodiment, the cost value assigned to a segment may be the length of the segment divided by the travel speed along the segment during an epoch corresponding to the parking time and multiplied by one minus the probability of finding (on-road) parking along the segment during the epoch corresponding to the parking time (e.g., $$\frac{\ell}{v_t} * (1 - P)).$$

In an example embodiment, blocks 1608 and 1610 may be performed concurrently with block 1612 such that the traffic, parking, and/or map information/data for generating a map version agnostic identifier and assigning a cost value to a first segment is accessed when a route determining algorithm is expanded to the first segment. For example, traffic, parking, and/or map information/data for assigning a cost value to a first segment (e.g., including the map version agnostic information/data used to generate a map version agnostic identifier for use in determining if the first segment satisfies the bloom filter) may be accessed and the cost value assigned to the first segment based thereon, in response to a route determining algorithm considering whether the first segment is part of the decoded route.

At block 1612, a decoded route is determined by identifying the lowest cost route from the decoded starting segment to the decoded target segment is determined. For example, the mobile apparatus 20 may determine a decoded route by determining the lowest cost route from the decoded starting segment to the decoded target segment. For example, the mobile apparatus 20 may comprise means, such as processor 22, memory 24, and/or the like, for determining a decoded route by determining the lowest cost route from the decoded starting segment to the decoded target segment. For example, the lowest cost route may be determined based on the cost value assigned to segments between the decoded starting segment and the decoded target segment. In various embodiments, a best-first algorithm may be used to determine the decoded route. In an example embodiment, a version of Dijkstra's algorithm or another cost minimization algorithm may be used to determine the decoded route.

At block 1614, it is determined if the decoded route satisfies one or more quality measures. In an example embodiment, the one or more quality measures comprise the length of the decoded route being similar to the route length provided as part of the route response. For example, a decoded route length may be determined and compared to the route length provided by the route response. In an example embodiment, the decoded route length is determined by summing the length of each segment in the decoded route based on the mobile version of the digital map. For example, it may be determined if the decoded route length and the route length satisfy a similarity threshold requirement. In an example embodiment, the ratio of the decoded route length and the route length may be compared to a similarity range to determine if the decoded route length and the route length satisfy a similarity threshold requirement. For example, if the ratio of the decoded route length to the route length is within the similarity range, it may be determined that the decoded route is an acceptable route. If the ratio of the decoded route length to the route length is not within the similarity range, it may be determined that the decoded route is not an acceptable route. In various embodiments, the similarity range is a predetermined range. In some example embodiments, the similarity range is 0.7 to 1.3, 0.75 to 1.25, 0.8 to 1.2, 0.85 to 1.15, 0.9 to 1.1, and/or 0.95 to 1.05. For example, the mobile apparatus 20 may determine if the decoded route length and the route length satisfy a similarity threshold requirement. For example, the mobile apparatus 20 may comprise means, such as processor 22, memory 24, and/or the like, for determining if the decoded route length and the route length satisfy the similarity threshold requirement.

In an example embodiment, the one or more quality measures may include determining whether the number of elements in the bloom filter that the mobile apparatus 20 cannot resolve satisfies a quality threshold requirement. When the number of elements of the bloom filter that cannot be resolved by the mobile apparatus 20 fails to satisfy a quality threshold requirement (e.g., exceeds a quality threshold number), it may be determined that the decoded route fails to satisfy a quality measure.

When it is determined that the decoded route satisfies the one or more quality measures (e.g., the decoded route length and the route length satisfy the similarity threshold requirement), the process continues to block 1616 and the route is accepted. For example, the mobile apparatus 20 may accept the route and use the route to complete one or more navigation functions. For example, the mobile apparatus 20 may comprise means, such as processor 22, memory 24, communications interface 26, user interface 28, sensors 29, and/or the like, for (responsive to determining that the decoded route satisfies the one or more quality measures) accepting the decoded route and using the decoded route to perform one or more navigation functions. Some non-limiting examples of navigation functions include providing a route (e.g., via a user interface), localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like. For example, the mobile apparatus 20 may provide the decoded route to a user such that the user may control the vehicle along at least a portion of the decoded route in search of parking. In an example embodiment, when the mobile apparatus 20 determines that the vehicle 5 is traversing the decoded route, the mobile apparatus 20 may cause one or more sensors 29 of the vehicle 5 to operate in a parking mode to automatically identify available parking spaces along the decoded route and provide a user perceivable alert when an available parking space is identified. For example, the mobile apparatus 20 may control the vehicle 5 in a parking cruise mode to traverse at least a portion of the decoded route in search of parking and may (automatically) park the vehicle 5 in an (automatically) identified parking space. In an example embodiment, when the vehicle 5 is parked, the mobile apparatus 20 may provide a communication such that the communication is received by the network apparatus 10 indicating the location where parking was found such that the network apparatus 10 may maintain updated parking information/data.

When it is determined that the decoded route does not satisfy at least one quality measure (e.g., the decoded route length and the route length do not satisfy the similarity threshold requirement), the process continues to block 1618. At block 1618, the route is rejected and a new parking cruise route is requested. For example, the mobile apparatus 20 may reject the route and request a new parking cruise route. For example, the mobile apparatus 20 may comprise means, such as processor 22, memory 24, communications interface 26, and/or the like for (responsive to determining that the decoded route fails to satisfy at last one quality measure) rejecting the route and requesting a new parking cruise route. For example, the mobile apparatus 20 may generate an updated and/or modified parking cruise request and provide (e.g., transmit) the updated and/or modified parking cruise request such that the network apparatus 10 receives the updated and/or modified parking cruise request. In response to the updated and/or modified parking cruise request, the network apparatus 10 may generate a new parking cruise route, encode a route segment set defined by the same or the new parking cruise route with a larger bloom filter (e.g., a bit array having more bits than the previously provided bloom filter) and/or the like. The network apparatus 10 may then provide an updated and/or modified parking cruise route response comprising a route segment set defined by the new parking cruise route encoded as a bloom filter, a route segment set defined by the previous parking cruise route encoded with a larger bloom filter, and/or the like. The mobile apparatus 20 receives the updated and/or modified parking cruise route response and determines an updated and/or modified decoded route. In an example embodiment, the mobile apparatus 20 determines if the updated and/or modified decoded route satisfies one or more quality measures to determine if the updated and/or modified decoded route is to be accepted or rejected and a new parking cruise route is to be requested.

F. Technical Advantages

Various embodiments provide for the encoding and decoding of a route segment set defined by a route in a map version agnostic manner. Various embodiments provide for the transmission of an encoded route segment set in a bandwidth efficient manner. For example, various embodiments provide for encoding a route segment set using map version agnostic identifiers that are encoded into a bloom filter, such that the encoded route segment set may be transmitted as a bit array. In various embodiments, the encoding may be performed such that the resulting bloom filter is the smallest bloom filter that is satisfied by route segments of the route segment set being encoded (e.g., the members of the bloom filter are coded map version agnostic identifiers configured to identify the route segments of the route segment set being encoded) and that is not satisfied by adjacent segments of the route (e.g., coded map version agnostic identifiers configured to identify adjacent segments are not members of the route segment set). As used herein, an adjacent segment is a segment that intersections a route, but that is not part of the route. Moreover, as the segment identifiers that are coded to generate the coded route segment identifiers are map version agnostic, the network version of the digital map stored by the network apparatus 10 and the mobile version of the digital map stored by the mobile apparatus 20 may be different versions of the digital map. Additionally, the use of a cost minimization algorithm by the mobile apparatus to determine a decoded route, wherein segments that satisfy the bloom filter are assigned a minimal cost, allows the mobile apparatus to automatically "heal" any issues in decoding the route due to differences in the mobile version and the network version of the digital map. Thus, various embodiments provide an efficient self-healing decoding of routes by a mobile apparatus.

Moreover, the determination of the decoded route by the mobile apparatus using a bloom filter is considerably more efficient than determining a decoded route based on comparing spatial/physical link similarities between links. Indeed, the determination of the decoded route using a bloom filter does not involve map-matching beyond the identification of the decoded start segment and the decoded target segment or the use of higher geometrical functions. Rather, determination of the decoded route using the bloom filter, as described herein, comprises the use of Boolean comparisons (e.g., equal or not equal) at a data level. For example, the mobile apparatus may determine if a particular segment satisfies a bloom filter via a Boolean comparison.

Various embodiments of the present invention therefore provide technical solutions to the technical problems of the bandwidth efficient communication of routes between apparatuses that have access to different versions of a digital map.

III. Example Apparatus

The network apparatus 10 and/or mobile apparatus 20 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the network apparatus 10 and/or mobile apparatus 20 may be embodied in other types of computing devices, such as a server, a personal computer, a computer workstation, a laptop computer, a plurality of networked computing devices or the like, that are configured to update one or more map tiles, analyze probe points for route planning or other purposes, store and/or provide driving condition information/data, generate and provide sensor quality index tables and/or driving condition tables, and/or the like. In an example embodiment, a mobile apparatus 20 is an in-vehicle navigation system onboard a vehicle 5 or a mobile device and a network apparatus 10 is a server. In an example embodiment, a mobile apparatus 20 is an apparatus configured to provide a user with a route (e.g., via user interface 28) and/or control a vehicle 5 to traverse a route. In this regard, FIG. 2A depicts an example network apparatus 10 and FIG. 2B depicts an example mobile apparatus 20 that may be embodied by various computing devices including those identified above. As shown, the network apparatus 10 of an example embodiment may include, may be associated with, or may otherwise be in communication with a processor 12 and a memory device 14 and optionally a communication interface 16 and/or a user interface 18. Similarly, a mobile apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the mobile apparatus to determine a location of mobile apparatus and/or determine one or more features of the corresponding vehicle's 5 surroundings), and/or other components configured to perform various operations, procedures, functions, or the like described herein. In various embodiments, the one or more sensors 29 are onboard the same vehicle 5 as the mobile apparatus 20.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10 and/or probe apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10 and/or mobile apparatus 20 may include a user interface 18, 28 that may, in turn, be in communication with the processor 12, 22 to provide output to the user, such as one or more routes through a road network, one or more notifications regarding traffic conditions along at least a portion of a route, and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The network apparatus 10 and/or mobile apparatus 20 may optionally include a communication interface 16, 26. The communication interface 16, 26 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10 and/or mobile apparatus 20 of an example embodiment, a navigation system may also include or have access to a geographic database. For example, in various embodiments, a network apparatus 10 and/or mobile apparatus 20 may comprise a component (e.g., memory 14, 24, and/or another component) that stores a digital map (e.g., in the form of a geographic database) comprising a first plurality of data records, each of the first plurality of data records representing a corresponding TME, wherein at least some of said first plurality of data records map information/data (e.g., the updated map information/data) indicating current traffic conditions along the corresponding TME. For example, the geographic database may include a variety of data (e.g., map information/data) utilized in various navigation functions such as constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment, segment, link, or traversable map element (TME) data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to TMEs, links, lanes, road segments, travel lanes of road segments, nodes, intersection, and/or the like and/or the corresponding data records (e.g., to add or update updated map information/data including, for example, current traffic conditions along a corresponding TME), a localization layer (e.g., comprising localization features) and/or the corresponding data records, and/or the like.

In an example embodiment, the TME data records are links, lanes, or segments, e.g., maneuvers of a maneuver graph, representing roads, travel lanes of roads, streets, or paths, as can be used in the calculated route or recorded route information for determination of one or more personalized routes. The intersection data records are ending points corresponding to the respective links or segments of the road segment data records. The TME data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The TMEs, road/link segments, segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10 and/or mobile apparatus 20 in accordance with an example embodiment may determine the time to traverse a route that includes one or more turns at respective intersections more accurately.

IV. Apparatus, Methods, and Computer Program Products

As described above, FIGS. 3, 4, 5, 7, 8, 9, 10, 12, 13, 15, 16 illustrate flowcharts of a network apparatus 10 and/or mobile apparatus 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining a route from a network version starting segment to a network version target location based on map data of a network version of a digital map, the route comprising a list of route segments to be traveled from the network version starting segment to the network version target segment, the route determined by a network apparatus comprising at least one processor, a memory storing the network version of the digital map, and a communication interface;
   accessing map version agnostic information identifying each segment of the list of route segments from the network version of the digital map;
   generating a map version agnostic identifier for each route segment of the list of route segments based on the accessed map version agnostic information;
   coding the map version agnostic identifier for each route segment using at least one coding function to generate at least one coded map version agnostic identifier for each route segment;
   generating a bloom filter based on the coded map version agnostic identifiers for each route segment; and
   providing the bloom filter such that a mobile apparatus receives the bloom filter.

2. The method of claim 1, wherein the route is determined in response to receiving a route request providing information identifying the starting location and the target location.

3. The method of claim 2, wherein the information identifying the starting location and the target location are map version agnostic.

4. The method of claim 2, wherein the information identifying the starting location is a geolocation of a point along a mobile version starting segment corresponding to an origin and the information identifying the target location is a geolocation of a point along a mobile version target segment corresponding to a destination.

5. The method of claim 1, wherein generating the bloom filter comprises:
   generating at least one coded map version agnostic identifier for at least one adjacent segment using the at least one coding function; and
   determining whether the at least one coded map version agnostic identifier for the at least one adjacent segment satisfies the bloom filter, wherein an adjacent segment intersects the route and is not a route segment.

6. The method of claim 5, wherein generating the bloom filter further comprises, responsive to determining that an adjacent segment satisfies the bloom filter, increasing the size of the bloom filter until there are no adjacent segments that satisfy the bloom filter.

7. The method of claim 1, wherein the map version agnostic information comprises at least one of road name, segment length, a direction of travel of a segment, a functional class of a segment, or speed limit.

8. The method of claim 1, wherein the at least one coding function comprises a hash function.

9. The method of claim 1, further comprising determining a route length of the route by summing a length of each route segment and providing the route length with the bloom filter.

10. The method of claim 1, wherein the route comprises one or more waypoints between the network version starting segment and the network version target segment, the one or more waypoints defining a plurality of legs of the route, and generating the bloom filter comprises generating a bloom filter for each leg of the route.

11. The method of claim 1, wherein the route is determined using a cost minimization route determination algorithm.

12. The method of claim 11, wherein a cost value assigned to a segment for use by the cost minimization route determination algorithm for determining the route corresponds to at least one of a length of the segment or an expected time to traverse the segment.

13. The method of claim 1, wherein the bloom filter is provided such that a mobile apparatus receives the bloom filter, wherein the mobile apparatus is configured to decode a decoded route based on the bloom filter and a mobile version of the digital map and perform one or more navigation functions based on the decoded route.

14. An apparatus comprising at least one processor, a communications interface configured for communicating via at least one network, and at least one memory storing computer program code and a network version of a digital map, the at least one memory and the computer program code configured to, with the processor, cause the apparatus to at least:
   determine a route from a network version starting segment to a network version target location based on map data of the network version of the digital map, the route comprising a list of route segments to be traveled from the network version starting segment to the network version target segment;
   access map version agnostic information identifying each segment of the list of route segments from the network version of the digital map;
   generate a map version agnostic identifier for each route segment of the list of route segments based on the accessed map version agnostic information;
   code the map version agnostic identifier for each route segment using at least one coding function to generate at least one coded map version agnostic identifier for each route segment;
   generate a bloom filter based on the coded map version agnostic identifiers for each route segment; and
   provide the bloom filter such that a mobile apparatus receives the bloom filter.

15. The apparatus of claim 14, wherein generating the bloom filter comprises:

generating at least one coded map version agnostic identifier for at least one adjacent segment using the at least one coding function;

determining whether the at least one coded map version agnostic identifier for the at least one adjacent segment satisfies the bloom filter, wherein an adjacent segment intersects the route and is not a route segment.

16. The apparatus of claim 15, wherein generating the bloom filter further comprises, responsive to determining that an adjacent segment satisfies the bloom filter, increase the size of the bloom filter until there are no adjacent segments that satisfy the bloom filter.

17. The apparatus of claim 14, wherein the at least one coding function comprises a hash function.

18. The apparatus of claim 14, wherein the at least one memory and the computer program code are further configured to, with the processor, cause the apparatus to at least determine a route length of the route by summing a length of each route segment and provide the route length with the bloom filter.

19. The apparatus of claim 14, wherein the route comprises one or more waypoints between the network version starting segment and the network version target segment, the one or more waypoints defining a plurality of legs of the route, and generating the bloom filter comprises generating a bloom filter for each leg of the route.

20. The apparatus of claim 14, wherein the route is determined using a cost minimization route determination algorithm and a cost value assigned to a segment for use by the cost minimization route determination algorithm for determining the route corresponds to at least one of a length of the segment or an expected time to traverse the segment.

* * * * *